US011263843B2

(12) United States Patent
Shirai et al.

(10) Patent No.: US 11,263,843 B2
(45) Date of Patent: Mar. 1, 2022

(54) INFORMATION PROCESSING APPARATUS, INFORMATION PROCESSING METHOD, AND PROGRAM

(71) Applicant: Sony Corporation, Tokyo (JP)

(72) Inventors: Taizo Shirai, Kanagawa (JP); Akichika Tanaka, Kanagawa (JP); Tatsuhiro Iida, Tokyo (JP); Koichi Sakumoto, Tokyo (JP); Takeo Inagaki, Tokyo (JP); Shinpei Hirano, Tokyo (JP); Tetsuro Tsuji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/655,242

(22) Filed: Oct. 17, 2019

(65) Prior Publication Data
US 2020/0051356 A1 Feb. 13, 2020

Related U.S. Application Data

(63) Continuation of application No. 15/518,829, filed as application No. PCT/JP2015/005838 on Nov. 24, 2015, now Pat. No. 10,553,056.

(30) Foreign Application Priority Data

Dec. 9, 2014 (JP) .............................. JP2014-249217

(51) Int. Cl.
G07C 9/00 (2020.01)
H04W 12/06 (2021.01)
G06F 16/955 (2019.01)

(52) U.S. Cl.
CPC ........ G07C 9/00309 (2013.01); H04W 12/06 (2013.01); G06F 16/9566 (2019.01);
(Continued)

(58) Field of Classification Search
None
See application file for complete search history.

(56) References Cited

U.S. PATENT DOCUMENTS 6,411,195 B1 6/2002 Goldman
8,126,450 B2 2/2012 Howarter et al.
(Continued)

FOREIGN PATENT DOCUMENTS

CN 102915588 A 2/2013
CN 103380445 A 10/2013
(Continued)

OTHER PUBLICATIONS

Japanese Office Action dated Jul. 2, 2019 in Japanese Application No. 2015-234915.
(Continued)

Primary Examiner — Carlos Garcia
(74) Attorney, Agent, or Firm — Xsensus LLP

(57) ABSTRACT

Provided is an information processing apparatus including: a locking control unit configured to execute a first process of processes for causing a locking unit to unlock, on the basis of detection of access of a first communication terminal; and a detection unit configured to detect an unlocking request by a user of the first communication terminal. The locking control unit executes a second process of the processes for causing the locking unit to unlock, when the unlocking request is detected and the first process is completed.

11 Claims, 45 Drawing Sheets

(52) U.S. Cl.
CPC ........... *G07C 2009/0023* (2013.01); *G07C 2009/00642* (2013.01); *G07C 2009/00746* (2013.01); *G07C 2009/00801* (2013.01); *G07C 2209/14* (2013.01); *G07C 2209/63* (2013.01)

(56) References Cited

U.S. PATENT DOCUMENTS

| | | |
|---|---|---|
| 8,430,310 B1 | 4/2013 | Ho et al. |
| 8,768,565 B2 | 7/2014 | Jefferies et al. |
| 9,911,255 B2 * | 3/2018 | Lee .................... G07C 9/20 |
| 9,923,879 B1 | 3/2018 | Ziraknejad et al. |
| 9,947,153 B2 | 4/2018 | Bergerhoff et al. |
| 2007/0294746 A1 | 12/2007 | Sasakura et al. |
| 2010/0075656 A1 | 3/2010 | Howarter et al. |
| 2014/0075186 A1 | 3/2014 | Austen |
| 2014/0143421 A1 | 5/2014 | Fu et al. |
| 2014/0285320 A1 | 9/2014 | Blackmer et al. |
| 2015/0206367 A1 | 7/2015 | Goldman et al. |

FOREIGN PATENT DOCUMENTS

| | | |
|---|---|---|
| EP | 0970288 A1 | 1/2000 |
| EP | 1843237 A2 | 10/2007 |
| EP | 2782075 A2 | 9/2014 |
| JP | 2006-009333 A | 1/2006 |
| JP | 2006-207120 A | 8/2006 |
| JP | 2010-265640 A | 11/2010 |
| JP | 2011-063961 A | 3/2011 |
| WO | 1998/39539 A1 | 9/1998 |
| WO | 2014/006615 A1 | 1/2014 |

OTHER PUBLICATIONS

International Search Report dated Mar. 11, 2016 in PCT/JP2015/005838.

Chinese Office Action dated Jun. 29, 2020 in Chinese Application No. 201580065588.1.

Office Action issued in Chinese Application 201580065588.1 dated Oct. 8, 2019.

* cited by examiner

Fig. 19

| eKeyID | deviceID | LOCK ID | EFFECTIVE PERIOD | eKey LEVEL | RSA PUBLIC KEY | RSA CERTIFICATE OF KEY |
|---|---|---|---|---|---|---|
| 0001 | 1234 | 1020 | ALWAYS | -9 | ... | ... |

40-2 eKey

4000: eKeyID
4002: deviceID
4004: LOCK ID (400 HEADER)
4006: EFFECTIVE PERIOD
4008: eKey LEVEL
4020: RSA PUBLIC KEY
4022: RSA CERTIFICATE OF KEY
402: MAIN BODY

INFORMATION PROCESSING APPARATUS, INFORMATION PROCESSING METHOD, AND PROGRAM

CROSS REFERENCE TO RELATED APPLICATIONS

This application is a continuation of U.S. application Ser. No. 15/518,829, filed Apr. 13, 2017, which is based on PCT filing PCT/JP2015/005838, filed Nov. 24, 2015, and claims the benefit of Japanese Priority Patent Application JP 2014-249217, filed Dec. 9, 2014, the entire contents of each are incorporated herein by reference.

TECHNICAL FIELD

The present disclosure relates to an information processing apparatus, an information processing method, and a program.

BACKGROUND ART

In the past, lock control devices capable of locking and unlocking doors electrically have been developed. For example, PTL 1 discloses a technology that performs an unlocking control in which, when a portable device is placed over an electrical lock, the electrical lock reads key data from the portable device and then matches the read key data to authentication key data.

CITATION LIST

Patent Literature

[PTL 1]
JP 2007-239347A

SUMMARY

Technical Problem

However, in the technology described in PTL 1, only after the portable device is placed over the electrical lock, the electrical lock starts a process for unlocking. Hence, when the process for unlocking takes a long time, a user having the portable device may have to wait for a long time in order to unlock.

Thus, in an embodiment of the present disclosure, there is proposed a novel and improved information processing apparatus, an information processing method, and a program which are capable of decreasing the waiting time of the user at the time an unlocking request. As used herein, according to one or more embodiments of the disclosed subject matter, "an unlocking request" may be generated, while the first communication terminal has access to the lock control device based on, for example, at least one of a vibration or sound satisfying a predetermined condition or a predetermined operation at a second communication terminal different from the first communication terminal.

Solution to Problem

According to an embodiment of the present disclosure, there is provided a lock control device removably provided external to a lock comprising: circuitry configured to detect an unlocking request while a first communication terminal has access to the lock control device, and output a control signal to unlock the lock based on detection of the unlocking request, wherein the unlocking request is generated, while the first communication terminal has access to the lock control device, based on at least one of a vibration or sound satisfying a predetermined condition or a predetermined operation at a second communication terminal different from the first communication terminal. Also provided according to an embodiment of the present disclosure is an information processing apparatus comprising: circuitry configured to detect access of a locking control device removably provided external to a lock, generate an unlocking request while the locking control device has access, and output a signal as the unlocking request to the locking control device.

According to another embodiment of the present disclosure, there is provided a locking control method comprising: detecting, using circuitry, an unlocking request while a first communication terminal has access, the unlocking request being generated, while the first communication terminal has access to the lock control device, based on at least one of a vibration or sound satisfying a predetermined condition or a predetermined operation to a second communication terminal different from the first communication terminal; and outputting, using the circuitry, a control signal to unlock a lock based on said detecting the unlocking request.

According to another embodiment of the present disclosure, there is provided a non-transitory computer-readable storage medium storing computer-readable instructions that, when executed by a computer, cause the computer to perform a method comprising: detecting an unlocking request while a first communication terminal has access, the unlocking request being generated, while the first communication terminal has access to the lock control device, based on at least one of a vibration or sound satisfying a predetermined condition or a predetermined operation to a second communication terminal different from the first communication terminal; and outputting a control signal to unlock a lock based on said detecting the unlocking request.

Advantageous Effects of Invention

As described above, according to an embodiment of the present disclosure, the waiting time of the user of at the time the unlocking request is reduced. Note that the effect described herein is not necessarily restrictive, but may be one of the effects described in embodiments of the present disclosure.

BRIEF DESCRIPTION OF DRAWINGS

FIG. 19 is an explanatory diagram illustrating an exemplary configuration of an eKey according to the same application example.

DESCRIPTION OF EMBODIMENTS

Figure 1:
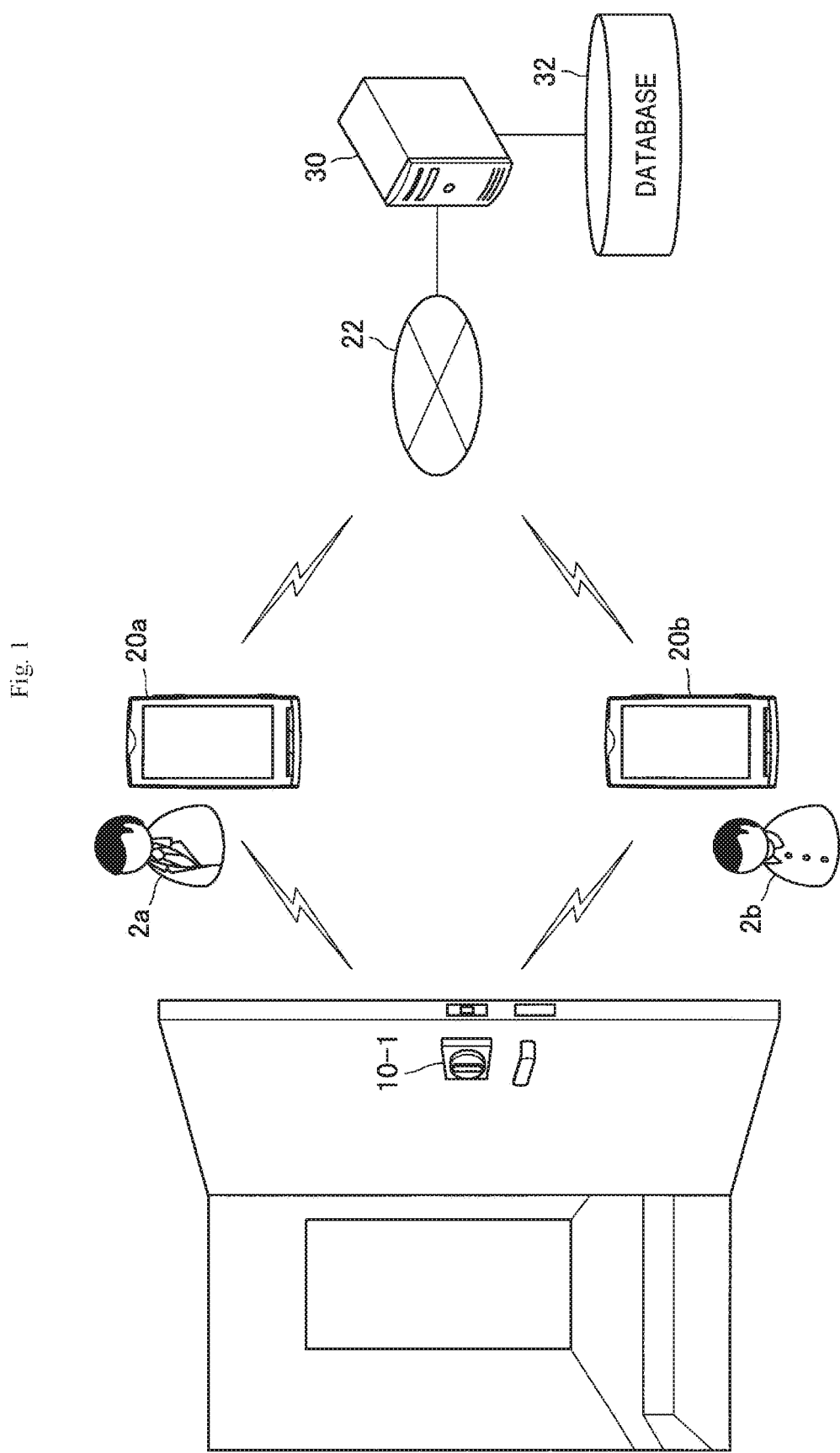
FIG. 1 is an explanatory diagram illustrating an exemplary configuration of an information processing system according to a first embodiment of the present disclosure.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, in the present specification and drawings, a plurality of structural elements that have substantially the same function and structure are sometimes distinguished by adding different alphabets after a same reference numeral. For example, a plurality of configurations having substantially same function and structure are distinguished as appropriate, like the user terminal 20a and the user terminal 20b. However, when a plurality of structural elements that have substantially the same function and structure are needless to be distinguished from each other, only a same reference sign is assigned. For example, when a user terminal 20a and a user terminal 20b are needless to be distinguished particularly, they are simply referred to as user terminal 20.

Also, "Description of Embodiments" will be described in accordance with the item order listed below.
1. First Embodiment
2. Second Embodiment
3. Third Embodiment
4. Fourth Embodiment
5. Fifth Embodiment
6. Sixth Embodiment
7. Seventh Embodiment
8. Exemplary Variant An embodiment of the present disclosure can be embodied in various forms, as described in detail in "1. First Embodiment" to "7. Seventh Embodiment" as one example. First, the first embodiment will be described.

1. First Embodiment

1-1. System Configuration

FIG. 1 is an explanatory diagram illustrating the configuration of an information processing system according to the first embodiment. As illustrated in FIG. 1, the information processing system according to the first embodiment includes a lock control device 10-1, user terminals 20, a communication network 22, a server 30, and a database 32.
(1-1-1. Lock Control Device 10-1)

The lock control device 10-1 is an example of the information processing apparatus in an embodiment of the present disclosure. The lock control device 10-1 is attached to a door at an entrance of a house for example, for the purpose of controlling locking and unlocking. More specifically, the lock control device 10-1 controls locking and unlocking of a locking unit 132 correspond to a thumbturn of a lock. The lock control device 10-1 can have a movable lock interface that is removably coupleable external to, adjacent to, or over a movable component of the lock, such as a thumbturn, to unlock the lock. Of course, the lock control device 10-1 can be attached to or otherwise positioned so as to be operative with movable structures other than entrance doors, such as closet doors (sliding or rotating) or other internal doors, drawers, boxes, cabinets, windows, etc.

Also, this lock control device 10-1 controls unlocking on the basis of an unlocking request received from the user terminal 20 described later.
(1-1-2. User Terminal 20)

The user terminal 20 is an example of a communication terminal in an embodiment of the present disclosure. The user terminal 20 is a terminal that a user 2 possess, and is basically a portable terminal. For example, the user terminal 20 may be a mobile phone such as a smartphone, a tablet terminal, and a device of a watch type.

The user terminal 20 is capable of implementing an application for requesting unlocking of the door, in the lock control device 10-1. Also, the user terminal 20 is capable of communicating with the server 30 via the communication network 22 described later, by wireless communication for example.
(1-1-3. Communication Network 22)

The communication network 22 is a wired or wireless transmission channel of information transmitted from devices connected to the communication network 22. For example, the communication network 22 may include a public line network such as a telephone line network, the Internet, and a satellite communication network, various types of local area networks (LAN) including Ethernet (registered trademark), a wide area network (WAN). Also, the communication network 22 may include a dedicated line network, such as an internet protocol-virtual private network (IP-VPN).
(1-1-4. Server 30)

The server 30 is an example of a management device in an embodiment of the present disclosure. The server 30 is a device for managing a key authentication service configured by a web system, for example. For example, the server 30 newly registers an account of the user 2 on the basis of a request from the user terminal 20, and authenticates when the user terminal 20 logs in to the key authentication service.
(1-1-5. Database 32)

The database 32 is a device for storing various information utilized in the key authentication service, in accordance with an instruction from the server 30. For example, the database 32 stores registration information of the user 2 and the user terminal 20 having an unlocking right, in association with the individual lock control device 10-1.

Note that the information processing system according to the first embodiment is not limited to the above configuration. For example, the database 32 may be stored in the server 30, instead of being configured as an independent device.
(1-1-6. Clarification of Problem)
(1-1-6-1. Problem 1)

In the above, the configuration of the information processing system according to the first embodiment has been described. In the meantime, when the user terminal 20 requests unlocking to the lock control device 10-1, the lock control device 10-1 is to have the capability of authenticating that the user terminal 20 is a rightful terminal having the authority to unlock.

In the first method, the user terminal 20 is authenticated, by registering an ID or a password of the user in the lock control device 10-1, and then matching, by the lock control device 10-1, an ID or a password received at the time of an unlocking request from the user terminal 20.

However, in this first method, when transmitting the ID or the password, there is a risk of ID or password leak, by intercept of another device, for example. Then, when the ID or the password has leaked, the other device can unlock the door.

Also, in the second method, the user terminal 20 is authenticated, by registering a common key in the lock control device 10-1 and the user terminal 20, and then verifying, by the lock control device 10-1, the result obtained by decoding information encrypted with the common key and received by the user terminal 20. In this method, even if the information transmitted and received between the lock control device 10-1 and the user terminal 20 is intercepted, the risk of unlocking the door by another device is reduced. However, in this method, authentication is not performed without registering the same common key in a plurality of devices, increasing the number of devices for managing the key. As a result, there remains a risk of the key being intercepted.
(1-1-6-1. Problem 2)

Also, another problem is described below. It is desirable that the user 2 who is an administrator that manages the key of the lock control device 10-1 (hereinafter, referred to as owner 2a, in some cases) can issue unlockable key information for another user 2 (hereinafter, referred to as guest 2b, in some cases).

In the publicly known technology, there is proposed a method in which the guest 2b registers a his or her own key in the server, and then the owner 2a sets the unlocking authority to the key of the guest 2b registered in the server, as the first method. However, in this method, the owner 2a is unable to set the unlocking right to the guest 2b, when his or her own key has not been registered in the server yet, e.g., when the guest 2b has not installed an appropriate application. Also, in this method, even if the guest 2b wishes to receive the key information, it is sometimes difficult to know which application is to be installed and how the setting of the terminal is to be conducted, for example.

Also, the second method may be such that a key ID issued for the guest 2b by the owner 2a is embedded in a URL (Uniform Resource Locator), and then an e-mail including the installation procedure of the URL and the application is transmitted to the guest 2b. However, in this method, when the key ID described in the e-mail main text is intercept by a third person, the third person can unlock the door.

Thus, in view of the above circumstances, the lock control device 10-1 according to the first embodiment has been created. The lock control device 10-1 according to the first embodiment is capable of authenticating the user terminal 20, without leaking secret information of the user terminal 20. Also, according to the first embodiment, the key information is prevented from leaking, when the owner 2a delivers the key information of the lock control device 10-1 to the guest 2b. In the following, this first embodiment will be described in detail sequentially.

1-2. Configuration (1-2-1. Lock Control Device 10-1)

Figure 2:
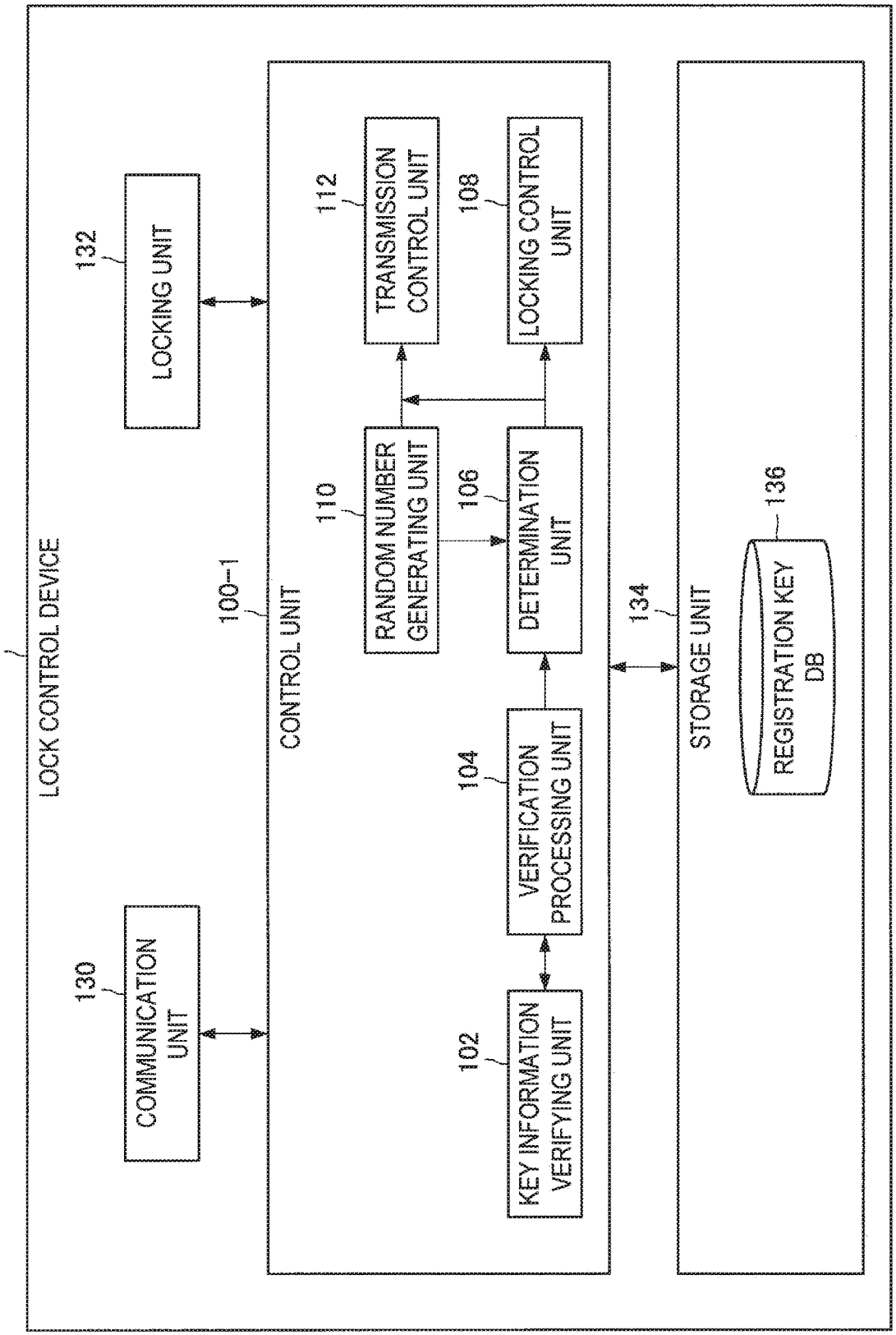
FIG. 2 is a functional block diagram illustrating an exemplary configuration of a lock control device 10-1 according to the same embodiment.

Next, the configuration according to the first embodiment will be described in detail. FIG. 2 is a functional block diagram illustrating the configuration of the lock control device 10-1 according to the first embodiment. As illustrated in FIG. 2, the lock control device 10-1 includes a control unit 100-1, a communication unit 130, a locking unit 132, and a storage unit 134.

(1-2-1-1. Control Unit 100-1)

The control unit 100-1 generally controls the operation of the lock control device 10-1, using hardware, such as a central processing unit (CPU) and a random access memory (RAM) for example, which are built into the lock control device 10-1. Also, as illustrated in FIG. 2, the control unit 100-1 includes a key information verifying unit 102, a verification processing unit 104, a determination unit 106, a locking control unit 108, a random number generating unit 110, and a transmission control unit 112.

(1-2-1-2. Key Information Verifying Unit 102)

The key information verifying unit 102 is an example of a key verifying unit in an embodiment of the present disclosure. The key information verifying unit 102 determines the rightfulness of an eKey received from the user terminal 20. Here, the eKey is an example of key information in an embodiment of the present disclosure.

For example, the key information verifying unit 102 verifies the rightfulness of the public key of the user terminal 20 on the basis of signature information for the public key of the user terminal 20, which is included in the received eKey. More specifically, the key information verifying unit 102 verifies whether or not the public key of the user terminal 20 is rightful, on the basis of the public key of the user terminal 20, and the decoding result, by the verification processing unit 104, of the signature information for the public key of the user terminal 20 which is included in the received eKey.

Also, the key information verifying unit 102 determines whether or not within an effective period, with reference to the effective period of the received eKey.

eKey

Figure 3:
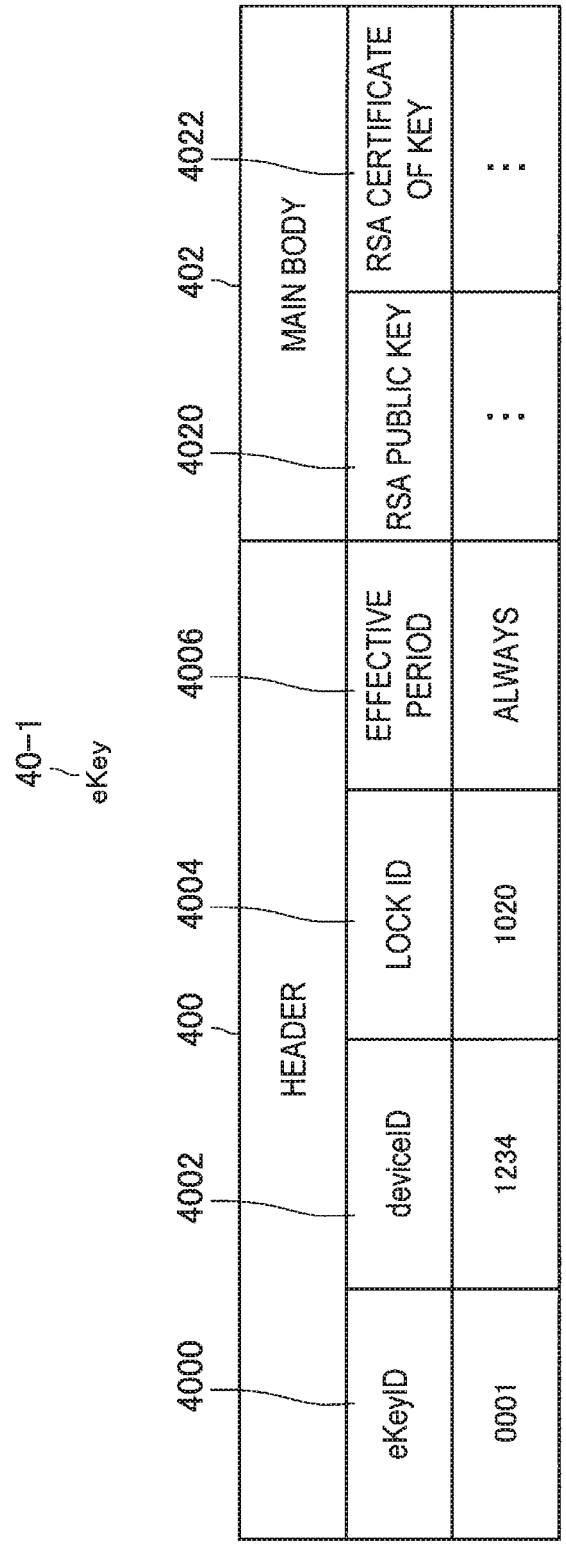
FIG. 3 is an explanatory diagram illustrating an exemplary configuration of an eKey according to the same embodiment.

Here, an exemplary configuration (eKey 40-1) of the eKey according to the first embodiment will be described with reference to FIG. 3. As illustrated in FIG. 3, the eKey 40-1 includes a header 400 and a main body 402, for example. Also, the header 400 includes an eKey ID 4000, a device ID 4002, a lock ID 4004, and an effective period 4006. Also, the main body 402 includes an RSA public key 4020 and an RSA certificate 4022 of the key.

Here, in the eKey ID 4000, the eKey ID corresponding to the eKey 40-1 is recorded. Note that, the eKey ID is an ID decided by the user terminal 20a of the owner 2a which has issued the eKey 40-1, for example. Also, in the device ID 4002, the terminal ID of the user terminal 20 having the eKey 40-1 is recorded. Also, in the lock ID 4004, the ID of the lock control device 10-1 which is authorized to unlock is recorded (in association with the eKey 40-1). Also, in the effective period 4006, the effective period set to the eKey 40-1 is recorded. For example, in the effective period 4006, usable day, day of week, or, time period, and the like are recorded. Note that FIG. 3 illustrates an example in which "ALWAYS", which is the value indicating no limitation of the period, is recorded as the effective period 4006. Also, in the RSA public key 4020, the RSA public key of the user terminal 20 to which the eKey 40-1 is issued is recorded. Also, in the RSA certificate 4022 of the key, the signature information by the user terminal 20a of the owner 2a for the RSA public key of the user terminal 20 to which the eKey 40-1 is issued is recorded. More specifically, in the RSA certificate 4022 of the key, the signature information using a RSA secret key of the user terminal 20a for the RSA public key of the user terminal 20 to which the eKey 40-1 is issued is recorded.

Note that the user terminal 20a of the owner 2a is also capable of issuing the eKey 40-1 for the terminal itself. In this case, in the RSA certificate 4022 of the key, the signature information of the user terminal 20a itself for the RSA public key of the user terminal 20a is recorded.

(1-2-1-3. Verification Processing Unit 104)

The verification processing unit 104 verifies, by a predetermined algorithm, the information generated on the basis of the secret key of the user terminal 20, which is received from the user terminal 20. For example, when the information generated by the secret key of the user terminal 20 is received, the verification processing unit 104 verifies the received information on the basis of the public key of the user terminal 20. Also, the verification processing unit 104 decodes the signature information by the user terminal 20a of the owner 2a for the public key of the user terminal 20b, which is included in the eKey received from the user terminal 20, on the basis of the public key of the user terminal 20a.

(1-2-1-4. Determination Unit 106)

The determination unit 106 determines whether or not to cause the locking unit 132 described later to unlock, on the basis of the verification result of the information generated on the basis of the secret key of the user terminal 20, and the verification result of the public key of the user terminal 20. For example, the determination unit 106 determines to cause the locking unit 132 to unlock, when the key information verifying unit 102 verifies that the public key of the user terminal 20 is rightful, and the verification processing unit 104 verifies that the information generated on the basis of the secret key of the user terminal 20 is rightful. More specifically, first, the determination unit 106 confirms whether or not the key information verifying unit 102 has verified that the public key of the user terminal 20 is rightful. Then, the determination unit 106 determines to cause the locking unit 132 to unlock, when it is verified that the public key of the user terminal 20 is rightful, and the verification processing unit 104 has verified that the information generated by the user terminal 20 is rightful.

Also, the determination unit 106 determines not to cause the locking unit 132 to unlock, when it is verified that the public key of the user terminal 20 is not rightful, or when it is verified that the information generated on the basis of the secret key of the user terminal 20 is not rightful.

(1-2-1-5. Locking Control Unit 108)

The locking control unit 108 controls the operation of the locking unit 132 on the basis of the determination result by the determination unit 106. For example, the locking control unit 108 causes the locking unit 132 to unlock, when the determination unit 106 has determined to unlock.

(1-2-1-6. Random Number Generating Unit 110)

The random number generating unit 110 generates a random number, such as a uniform random number within a predetermined range, for example.

(1-2-1-7. Transmission Control Unit 112)

The transmission control unit 112 causes the communication unit 130 to transmit various types of information to the user terminal 20. For example, the transmission control unit 112 causes the communication unit 130 to transmit the random number generated by the random number generating unit 110, to the user terminal 20.

(1-2-1-8. Communication Unit 130)

The communication unit 130 performs transmission and reception of information with another device, by the wireless communication in accordance with Bluetooth (registered trademark) such as Bluetooth low energy (BLE), Wi-Fi (registered trademark), near field communication (NFC), or the like, for example. For example, the communication unit 130 is control by the transmission control unit 112 to transmit the random number to the user terminal 20. Also, the communication unit 130 receives the eKey, the unlocking request, and the information generated on the basis of the secret key of the user terminal 20, from the user terminal 20.

(1-2-1-9. Locking Unit 132)

The locking unit 132 carries out locking or unlocking in accordance with the control of the locking control unit 108.

(1-2-1-10. Storage Unit 134)

The storage unit 134 is capable of storing various types of data, such as a registration key DB 136 described later, and software, for example.

Registration Key DB 136

As described later, the registration key DB 136 is a database that stores the information relevant to the user terminal 20a of the owner 2a which manages the relevant lock control device 10-1. Also, as an exemplary variant, the registration key DB 136 is capable of storing the information relevant to the user terminal 20b of the guest 2b for which the determination unit 106 has determined to unlock.

(1-2-2. User Terminal 20)

Figure 4:
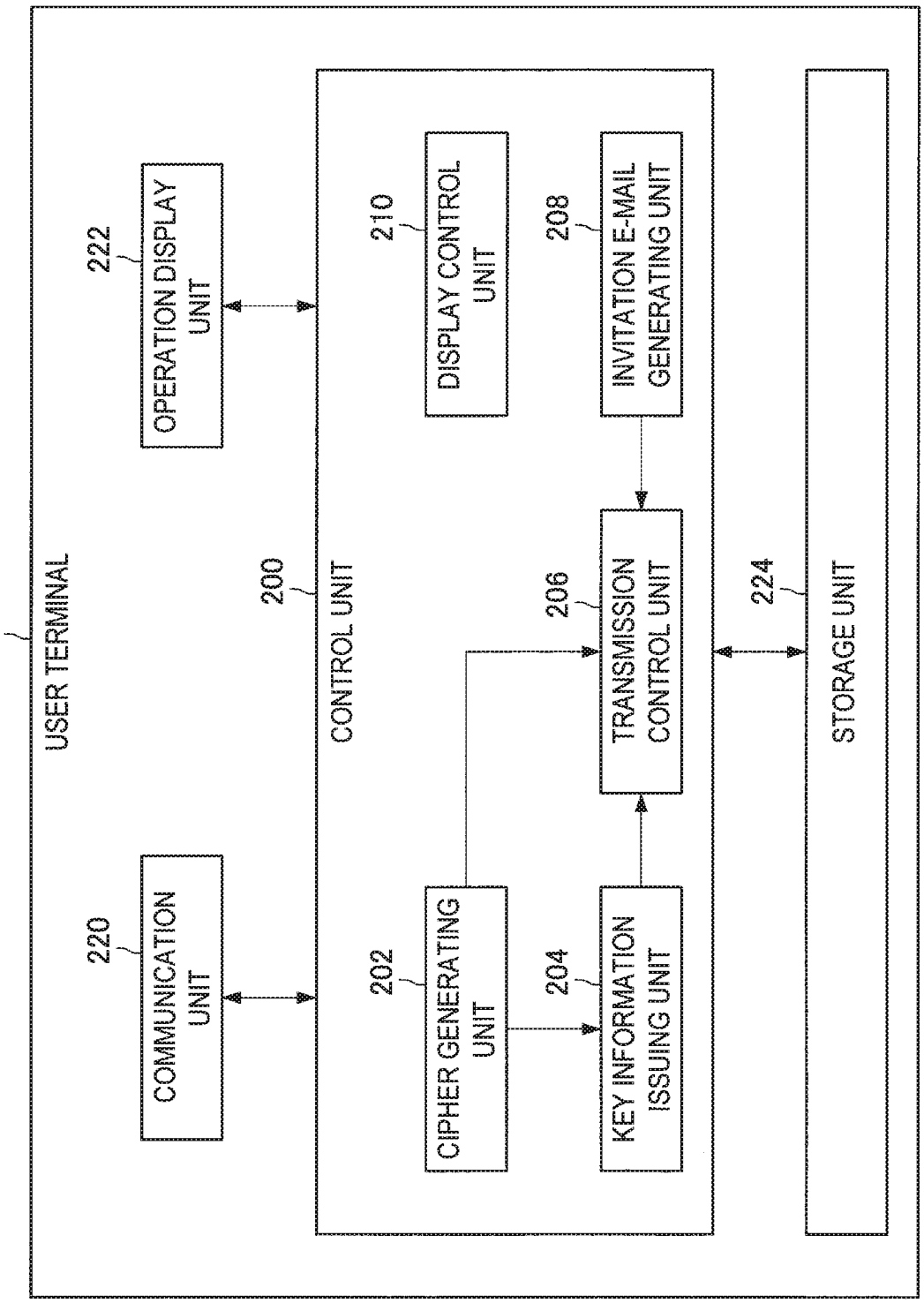
FIG. 4 is a functional block diagram illustrating an exemplary configuration of a user terminal 20 according to the same embodiment.

FIG. 4 is a functional block diagram illustrating the configuration of the user terminal 20 according to the first embodiment. As illustrated in FIG. 4, the user terminal 20 includes a control unit 200, a communication unit 220, an operation display unit 222, and a storage unit 224.

(1-2-2-1. Control Unit 200)

The control unit 200 generally controls the operation of the user terminal 20, using hardware, such as a CPU and a RAM for example, which is built into the user terminal 20.

Also, as illustrated in FIG. 4, the control unit 200 includes a cipher generating unit 202, a key information issuing unit 204, a transmission control unit 206, an invitation e-mail generating unit 208, and a display control unit 210.

(1-2-2-2. Cipher Generating Unit 202)

Generation Example 1

The cipher generating unit 202 generates information on the basis of a predetermined algorithm and the random number received from the lock control device 10-1, for example. For example, the cipher generating unit 202 generates information on the basis of the received random number and the secret key of the user terminal 20 stored in the storage unit 224 described later. Here, the predetermined algorithm is the RSA cryptographic algorithm, for example.

Generation Example 2

In addition, when the user terminal 20 is the user terminal 20 of the owner 2a, the cipher generating unit 202 is also capable of creating a digital signature for the public key of the user terminal 20b of the guest 2b. For example, in the above case, the cipher generating unit 202 creates a digital signature by encrypting the public key of the guest 2b, on the basis of the secret key of the user terminal 20.

(1-2-2-3. Key Information Issuing Unit 204)

The key information issuing unit 204 issues an eKey in association with the user terminal 20b, when the user 2 of the user terminal 20 has the authority for issuing an eKey, and the eKey issuance request with respect to another user terminal 20b is received from the server 30 described later. More specifically, in the above case, the key information issuing unit 204 issues an eKey including signature information for the public key of the user terminal 20b, which is generated by the cipher generating unit 202.

(1-2-2-4. Transmission Control Unit 206)

The transmission control unit 206 causes the communication unit 220 to transmit various types of information to the lock control device 10-1 or the server 30. For example, the transmission control unit 206 causes the communication unit 220 to transmit the information generated by the cipher generating unit 202 to the lock control device 10-1. Also, the transmission control unit 206 causes the communication unit 220 to transmit the eKey issued by the key information issuing unit 204 to the server 30. Also, the transmission control unit 206 causes the communication unit 220 to transmit the invitation e-mail generated by the invitation e-mail generating unit 208 described later, to the relevant user terminal 20.

(1-2-2-5. Invitation E-Mail Generating Unit 208)

The invitation e-mail generating unit 208 generates the invitation e-mail including the eKey ID associated with another user terminal 20b and the link information to the server 30. Note that, when the user terminal 20b receives this invitation e-mail, the user terminal 20b connects to the link information described in the invitation e-mail, in order to request a person authorized to issue the eKey, such as the owner 2a, to issue the eKey, for example.

(1-2-2-6. Display Control Unit 210)

The display control unit 210 causes the operation display unit 222 to display various types of display screen images. For example, when the user terminal 20 is the user terminal 20 of the owner 2a, the display control unit 210 causes the operation display unit 222, described later, to display an eKey issuance approval screen image for inputting whether or not to approve the issuance of the eKey for the user terminal 20b of another user 2b.

(1-2-2-7. Communication Unit 220)

The communication unit 220 performs transmission and reception of information with another device, by the wireless communication in accordance with Bluetooth, Wi-Fi, NFC, or the like, for example. For example, the communication unit 220 is controlled by the transmission control unit 206, to transmit the information generated by the cipher generating unit 202 to the lock control device 10-1.

(1-2-2-8. Operation Display Unit 222)

The operation display unit 222 is configured with a touch panel display, for example. This the operation display unit 222 is controlled by the display control unit 210, to display various types of display screen images. Also, the operation display unit 222 accepts various types of input by the user, such as selection of selection buttons displayed on the display screen image, for example.

(1-2-2-9. Storage Unit 224)

The storage unit 224 stores various types of software and various types of data such as the RSA secret key of the user terminal 20, for example.

(1-2-3. Server 30)

Figure 5:
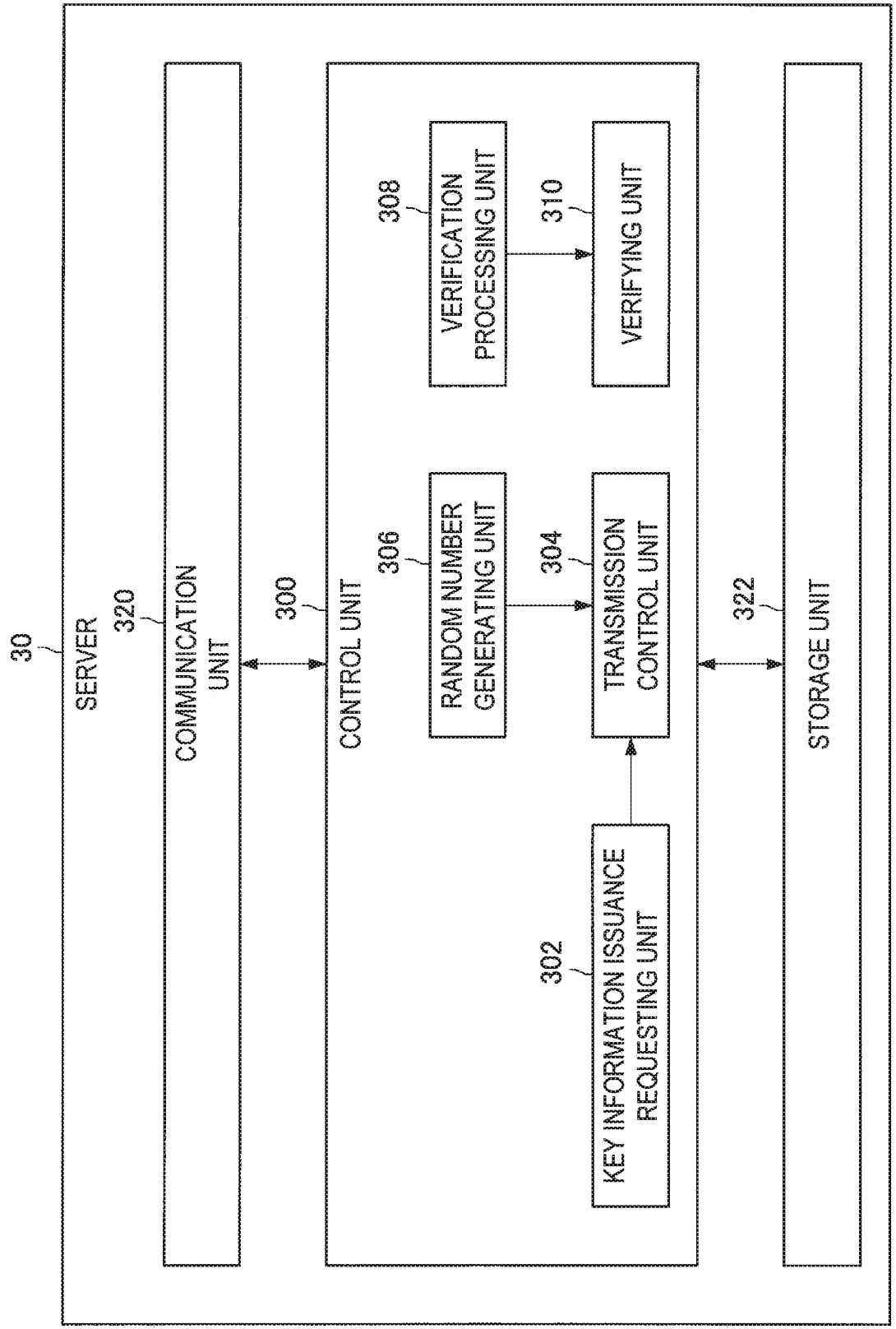
FIG. 5 is a functional block diagram illustrating an exemplary configuration of a server 30 according to the same embodiment.

FIG. 5 is a functional block diagram illustrating the configuration of the server 30 according to the first embodiment. As illustrated in FIG. 5, the server 30 includes a control unit 300, a communication unit 320, and a storage unit 322.

(1-2-3-1. Control Unit 300)

The control unit 300 generally controls the operation of the server 30, using hardware, such as a CPU and a RAM for example, which is built into the server 30. Also, as illustrated in FIG. 5, the control unit 300 includes a key information issuance requesting unit 302, a transmission control unit 304, a random number generating unit 306, a verification processing unit 308, and a verifying unit 310.

(1-2-3-2. Key Information Issuance Requesting Unit 302)

The key information issuance requesting unit 302 generates an eKey issuance request corresponding to the eKey ID, when receiving the eKey ID from the user terminal 20b of the guest 2b.

(1-2-3-3. Transmission Control Unit 304)

The transmission control unit 304 causes the communication unit 320 to transmit various types of information to the user terminal 20. For example, the transmission control unit 304 causes the communication unit 320 to transmit the eKey issuance request generated by the key information issuance requesting unit 302, to the user terminal 20a of the owner 2a.

(1-2-3-4. Random Number Generating Unit 306)

The random number generating unit 306 generates a random number, such as a uniform random number within a predetermined range, for example.

(1-2-3-5. Verification Processing Unit 308)

The verification processing unit 308 verifies, by a predetermined algorithm, the information generated on the basis of the secret key of the user terminal 20, which is received from the user terminal 20. For example, the verification processing unit 104 decodes the information generated on the basis of the secret key of the user terminal 20, which is received from the user terminal 20, on the basis of the public key of the user terminal 20 recorded in the database 32 for example.

(1-2-3-7. Verifying Unit 310)

The verifying unit 310 verifies the rightfulness of the user terminal 20 on the basis of the result of verification, by the verification processing unit 308, of the information received from the user terminal 20. For example, the verifying unit 310 determines that the user terminal 20 is rightful when the verification processing unit 308 verifies that the information received from the user terminal 20 is rightful, and determines that the user terminal 20 is not rightful when the verification processing unit 308 verifies that the same information is not rightful.

(1-2-3-8. Communication Unit 320)

The communication unit 320 performs transmission and reception of information with another device connected to the communication network 22, for example. For example, the communication unit 320 is controlled by the transmission control unit 304, to transmit the eKey issuance request to the relevant user terminal 20a of the owner 2a.

(1-2-3-9. Storage Unit 322)

The storage unit 322 stores various types of data and the software. Note that, as an exemplary variant, the storage unit 322 is also capable of storing the database 32.

1-3. Operation

In the above, the configuration according to the first embodiment has been described. Next, the operation according to the first embodiment will be described in the following order with reference to FIGS. 6 to 17.

1. Operation when registering a key into the lock control device 10-1
2. Operation when verifying the key of the owner 2a
3. Operation when registering an account into the server 30
4. Operation when registering the user terminal 20 into the server 30
5. Operation when authenticating the account by the server 30
6. Operation when inviting the guest 2b
7. Operation when requesting issuance of an eKey
8. Operation when issuing the eKey
9. Operation when unlocking
10. Operation of the unlocking process
11. Operation when requesting invalidation of an eKey Group Note that, unless expressly stated otherwise, FIGS. 6 to 17 illustrates an example in which the user terminal 20a is the user terminal 20 of the owner 2a, and, the user terminal 20b is the user terminal 20 of the guest 2b.

(1-3-1. Operation when Registering Key into Lock Control Device 10-1)

Figure 6:
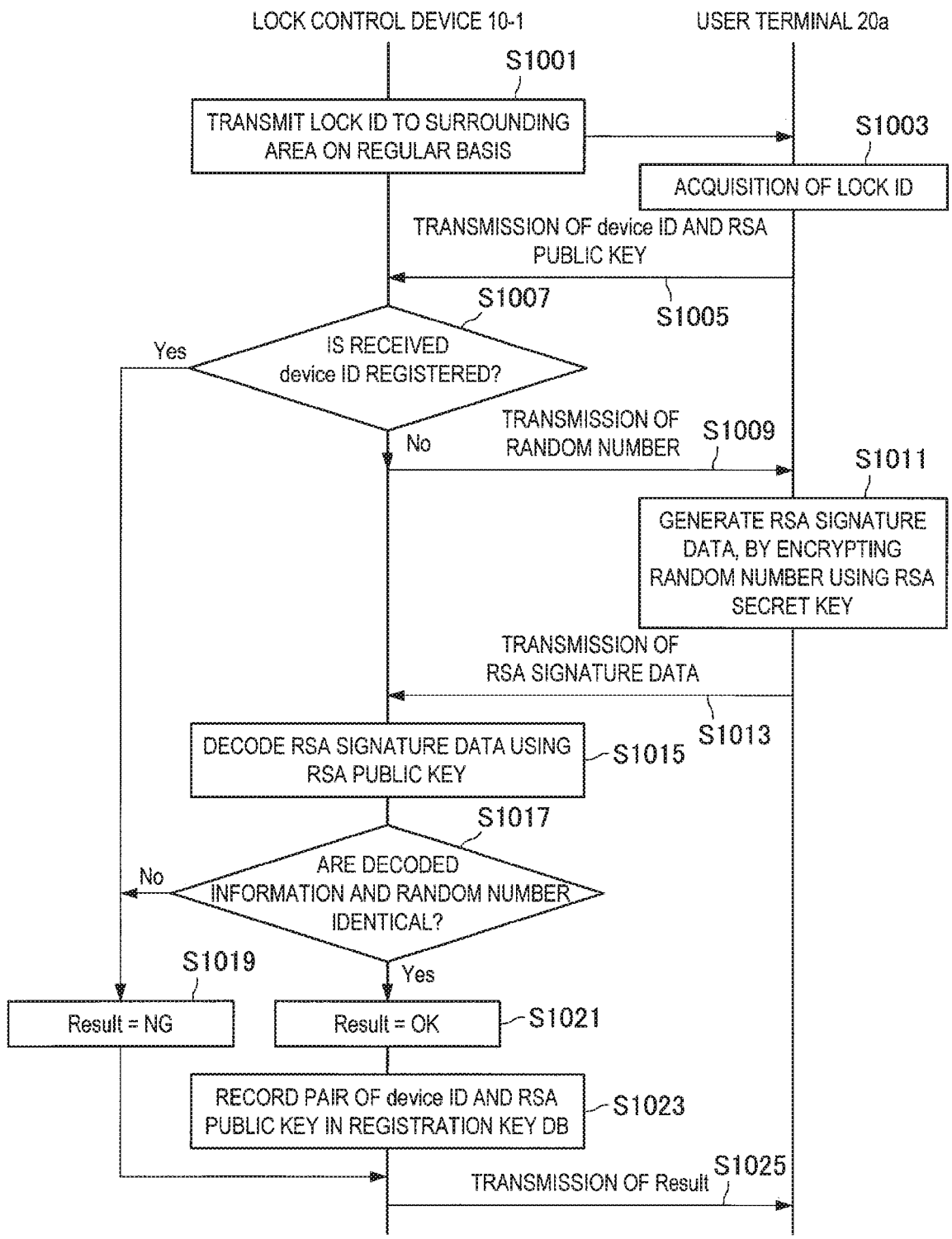
FIG. 6 is a sequence diagram illustrating an operation when registering a key into a lock control device 10-1 according to the same embodiment.

FIG. 6 is a sequence diagram illustrating the operation when registering a key into the lock control device 10-1, according to the first embodiment. Note that this operation is an operation when initially registering information such as the device ID and the public key of the user terminal 20a of the owner 2a, into the lock control device 10-1 managed by the owner 2a. Also, this operation is basically performed only once by the owner 2a who manages the lock control device 10-1, with regard to each lock control device 10-1.

As illustrated in FIG. 6, first, the transmission control unit 112 of the lock control device 10-1 sends the lock ID which is the identification information of the lock control device 10-1, to the surrounding area, on a regular basis (S1001).

Thereafter, when the user terminal 20a accesses the lock control device 10-1, the user terminal 20a receives the lock ID sent from the lock control device 10-1, and then determines whether or not to be the target lock control device 10-1 on the basis of the received lock ID. If it is the target lock control device 10-1, the user terminal 20a establishes a session with the lock control device 10-1 (S1003).

Subsequently, the transmission control unit 206 of the user terminal 20a causes the communication unit 220 to transmit the device ID of the user terminal 20a and the RSA public key of the user terminal 20a to the lock control device 10-1 (S1005).

Thereafter, the control unit 100-1 of the lock control device 10-1 confirms whether or not the device ID received in S1005 has been recorded in the registration key DB 136 (S1007). If the device ID has been recorded in the registration key DB 136 (S1007: Yes), the lock control device 10-1 performs the operation of S1019 described later.

On the other hand, if the device ID is not recorded in the registration key DB 136 (S1007: No), the random number generating unit 110 generates a random number. Then, the transmission control unit 112 causes the communication unit 130 to transmit the generated random number to the user terminal 20a (S1009).

Thereafter, the cipher generating unit 202 of the user terminal 20a generates the RSA signature data by encrypting the random number received in S1009 with the RSA secret key of the user terminal 20a (S1011).

Subsequently, the transmission control unit 206 causes the communication unit 220 to transmit the RSA signature data generated in S1011 to the lock control device 10-1 (S1013).

Thereafter, the verification processing unit 104 of the lock control device 10-1 decodes the RSA signature data received in S1013, using the RSA public key received in S1005 (S1015).

Subsequently, the determination unit 106 compares the information decoded in S1015 and the random number generated in S1009 (S1017). If the both are not identical with each other (S1017: No), the determination unit 106 sets "NG" to Result (=registration result), (S1019). Thereafter, the lock control device 10-1 performs the operation of S1025, which is described later.

On the other hand, if the both are identical with each other (S1017: Yes), the determination unit 106 sets "OK" to the Result (S1021). Then, the determination unit 106 records the device ID received in S1005 and the RSA public key in association with each other, in the registration key DB 136 (S1023).

Thereafter, the transmission control unit 112 causes the communication unit 130 to transmit the Result set in S1019 or S1021 to the user terminal 20a (S1025).

(1-3-2. Operation when Verifying Key of Owner 2a)

Next, with reference to FIG. 7, the operation when verifying the key of the owner 2a according to the first embodiment will be described. Note that this operation is performed by the lock control device 10-1 to verify whether or not the user terminal 20 of the communication target is the user terminal 20a of the owner 2a. For example, this operation is performed when the user terminal 20 requests a process authorized only to the owner 2a, such as a deletion request of the data registered in the lock control device 10-1.

Figure 7:
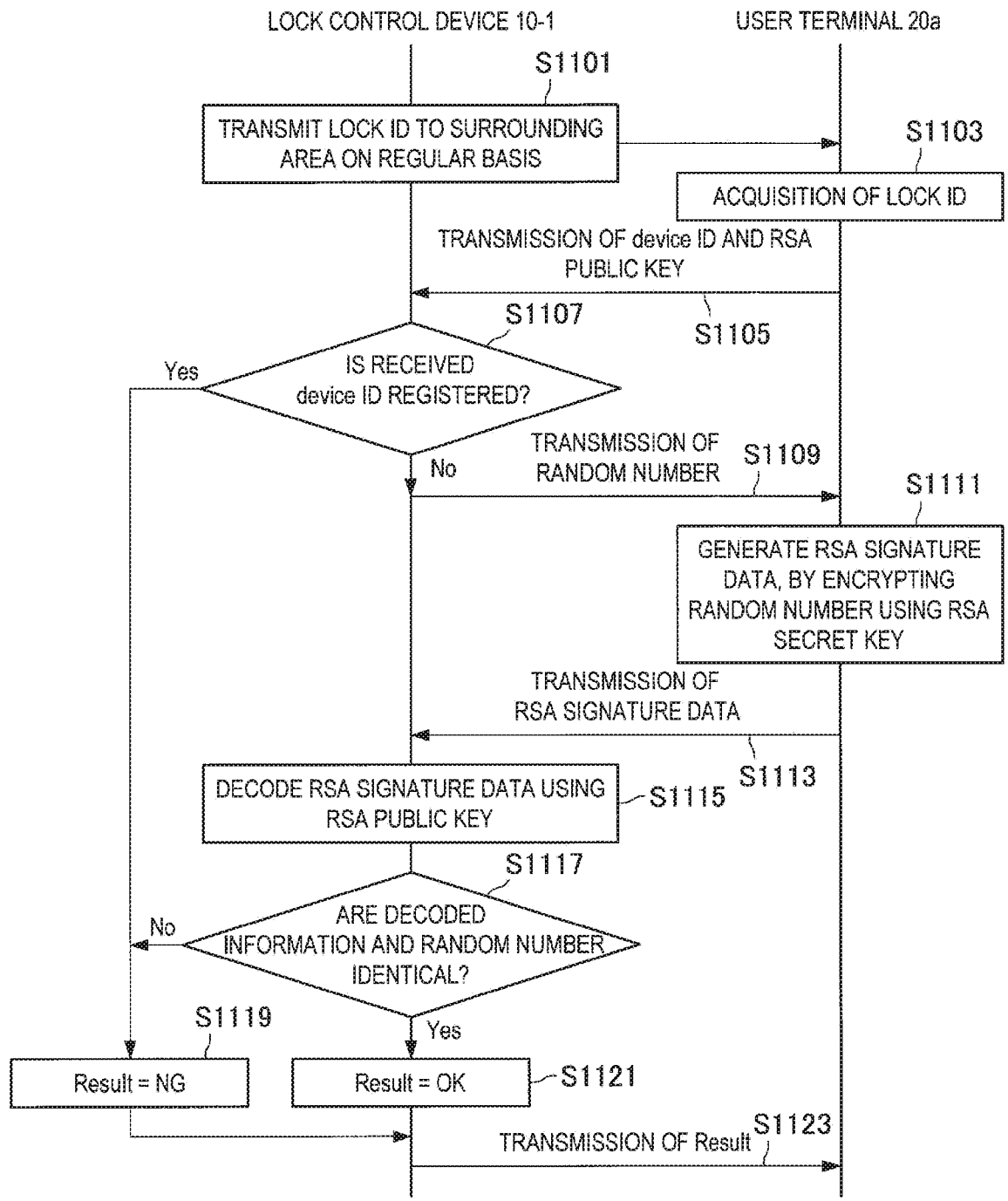
FIG. 7 is a sequence diagram illustrating an operation when verifying a key of an owner 2a according to the same embodiment.

The operation of S1101 to S1105 illustrated in FIG. 7 is substantially same as the operation of S1001 to S1005 illustrated in FIG. 6. Note that S1103 is different from S1003 in that the user terminal 20a establishes a session with the lock control device 10-1 when the lock ID received in S1101 is the lock ID of the lock control device 10-1 that has registered the public key.

After S1105, the control unit 100-1 of the lock control device 10-1 confirms whether or not the device ID received in S1105 has been recorded in the registration key DB 136 (S1107). If the device ID is not recorded in the registration key DB 136 (S1107: No), the lock control device 10-1 performs the operation of S1119 described later.

On the other hand, if the device ID has been recorded in the registration key DB 136 (S1107: Yes), the random number generating unit 110 generates a random number. Then, the transmission control unit 112 causes the communication unit 130 to transmit the generated random number to the user terminal 20a (S1109).

Note that the operation of S1111 to S1115 is substantially same as the operation of S1011 to S1015 illustrated in FIG. 6.

After S1115, the determination unit 106 compares the information decoded in S1115 and the random number generated in S1109 (S1117). If the both are not identical with each other (S1117: No), the determination unit 106 sets "NG" to Result (=verification result), and then does not authenticate the user terminal 20a (S1119). Thereafter, the lock control device 10-1 performs the operation of S1123 described later.

On the other hand, if the both are identical with each other (S1117: Yes), the determination unit 106 sets "OK" to the Result, and then authenticates the user terminal 20a (S1121).

Thereafter, the transmission control unit 112 causes the communication unit 130 to transmit the Result set in S1119 or S1121 to the user terminal 20a (S1123).

(1-3-3. Operation when Registering Account into Server 30)

Next, with reference to FIG. 8, the operation when registering the account into the server 30 according to the first embodiment will be described. Note that, for example, this operation is performed when the user 2 registers the account into the server 30 to utilize the key authentication service. Here, the user 2 may be the owner 2a, or may be the guest 2b (who has received an invitation e-mail described in section 1-3-6).

Figure 8:
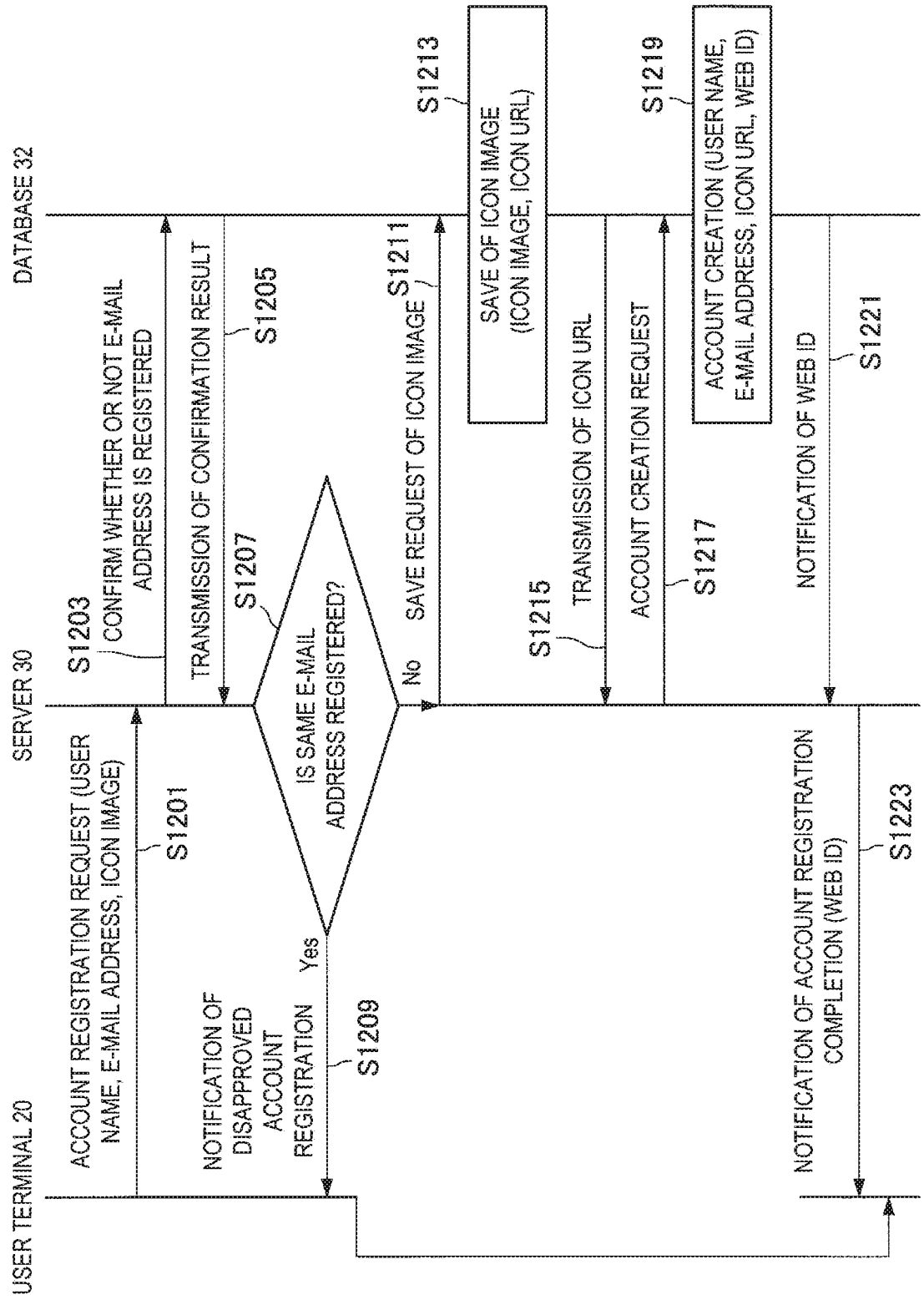
FIG. 8 is a sequence diagram illustrating an operation when registering an account into a server 30 according to the same embodiment.

As illustrated in FIG. 8, first, the user terminal 20 accesses to the server 30. Then, the operation display unit 222 of the user terminal 20 displays an account registration screen image received from the server 30 for example, and then accepts input of a user name and an e-mail address, and selection of an icon image (used in individual identification, for example) from the user 2, in the registration screen image. Thereafter, the transmission control unit 206 causes the communication unit 220 to transmit a registration request of the account, including input content, to the server 30 (S1201).

Thereafter, the transmission control unit 304 of the server 30 causes the communication unit 320 to transmit to the database 32 the request to confirm whether or not the same e-mail address as the e-mail address received in S1201 is registered (S1203).

Thereafter, the database 32 performs confirmation on the basis of the request received in S1203, and then transmits the confirmation result to the server 30 (S1205).

Thereafter, if it is confirmed that the same e-mail address is registered (S1207: Yes), the transmission control unit 304 of the server 30 causes the communication unit 320 to transmit to the user terminal 20 a notification of disapproved registration of the relevant account (S1209). Then, the "operation when registering the account into the server 30" ends.

On the other hand, if it is confirmed that the same e-mail address is not registered (S1207: No), the transmission control unit 304 causes the communication unit 320 to transmit to the database 32 the save request of the icon image received in S1201 (S1211).

Thereafter, the database 32 decides the URL of the save destination of the icon image received in S1211. Then, the database 32 stores the received icon image and the decided URL in association with each other (S1213). Then, the database 32 transmits the URL decided in S1213 to the server 30 (S1215).

Thereafter, the transmission control unit 304 of the server 30 causes the communication unit 320 to transmit to the database 32 a creation request of the account, which includes the user name and the e-mail address received in S1201 and the icon URL received in S1215 (S1217).

Thereafter, the database 32 decides the web ID corresponding to the relevant user 2. Then, the database 32 stores the user name, the e-mail address, the icon URL included in the creation request received in S1217, and the decided web ID, in association with each other (S1219).

Subsequently, the database 32 transmits the web ID decided in S1219 to the server 30 (S1221).

Thereafter, the transmission control unit 304 of the server 30 causes the communication unit 320 to transmit to the user terminal 20 a notification of the registration completion of the account, which includes the web ID received in S1221 (S1223).

(1-3-4. Operation when Registering User Terminal 20 into Server 30)

Next, with reference to FIG. 9, the operation when registering the user terminal 20 into the server 30 according to the first embodiment will be described. Note that this operation is performed when the user 2 registers the information of the user terminal 20 in the server 30 to utilize the key authentication service. Also, for example, this operation is performed immediately after the "operation when registering the account into the server 30" described in section 1-3-3. Although, in the following, an exemplary operation performed when registering the information of the user terminal 20b of the guest 2b will be described, the operation performed when registering the information of the user terminal 20a of the owner 2a is substantially same.

Figure 9:
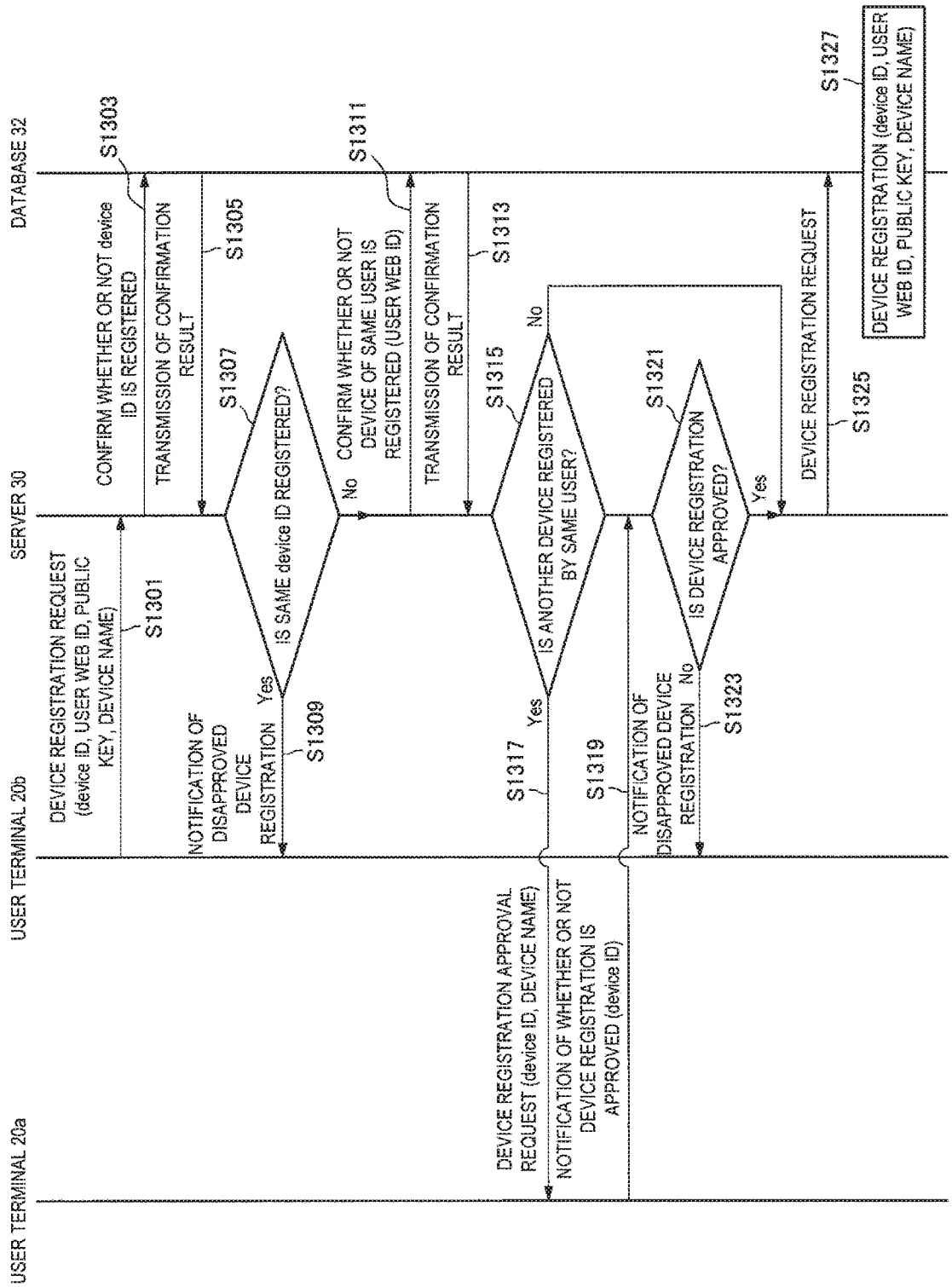
FIG. 9 is a sequence diagram illustrating an operation when registering a user terminal 20 into a server 30 according to the same embodiment.

As illustrated in FIG. 9, first, the user terminal 20b accesses to the server 30. Then, the user terminal 20b transmits to the server 30 a registration request of the device, which includes the device ID of the user terminal 20b, the user web ID (that has been issued from the server 30), the RSA public key of the user terminal 20b, and the device name of the user terminal 20b (S1301).

Thereafter, the transmission control unit 304 of the server 30 causes the communication unit 320 to transmit to the database 32 a request to confirm whether or not the same device ID as the device ID received in S1301 has been registered (S1303).

Thereafter, the database 32 performs confirmation on the basis of the request received in S1303, and then transmits the confirmation result to the server 30 (S1305).

Thereafter, if it is confirmed that the same device ID is registered (S1307: Yes), the transmission control unit 304 of the server 30 causes the communication unit 320 to transmit to the user terminal 20b a notification of disapproved registration of the relevant user terminal 20b (S1309).

On the other hand, if it is confirmed that the same device ID is not registered (S1307: No), the transmission control unit 304 of the server 30 causes the communication unit 320 to transmit to the database 32 a request to confirm whether or not device registration has been performed by the same user 2b (i.e., the user 2b having the same user web ID) (S1311).

Thereafter, the database 32 performs confirmation on the basis of the request received in S1311, and then transmits the confirmation result to the server 30 (S1313).

Thereafter, if it is confirmed that another device is not registered by the same user 2b (S1315: No), the server 30 performs the operation of S1325 described later.

On the other hand, if it is confirmed that another device is registered by the same user 2b (S1315: Yes), the transmission control unit 304 of the server 30 causes the communication unit 320 to transmit to the user terminal 20a of the owner 2a a request to approve registration of the new device, which includes the device ID and the device name received in S1301 (S1317).

Thereafter, for example, the display control unit 210 of the user terminal 20a causes the operation display unit 222 to display a device registration approval screen image for inputting whether or not to approve in response to the approval request received in S1317. Then, the transmission control unit 206 generates a notification of whether or not to the registration of the device is approved, which includes the device ID received in S1317, on the basis of the input of the owner 2a to the operation display unit 222, and then causes the communication unit 220 to transmit the generated notification to the server 30 (S1319).

Thereafter, the control unit 300 of the server 30 confirms the content of the notification received in S1319 (S1321). If the content of the received notification indicates to reject the registration of the device (S1321: No), the transmission control unit 304 causes the communication unit 320 to transmit the notification of the disapproved registration of the relevant user terminal 20b, to the user terminal 20b (S1323).

On the other hand, if the content of the received notification indicates to approve the registration of the device (S1321: Yes), the transmission control unit 304 causes the communication unit 320 to transmit the device registration request to the database 32, on the basis of the registration request received in S1301 (S1325).

Thereafter, the database 32 stores the device ID, the user web ID, the RSA public key, and the device name, which are included in the device registration request received in S1325, in association with each other (S1327).

(1-3-5. Operation when Authenticating Account by Server 30)

Next, with reference to FIG. 10, the operation when authenticating an account by the server 30 according to the first embodiment will be described. Note that this operation is performed each time the user terminal 20 logs in to the key authentication service, after the end of registration of the account and registration of the user terminal 20 to the above server 30, for example.

Figure 10:
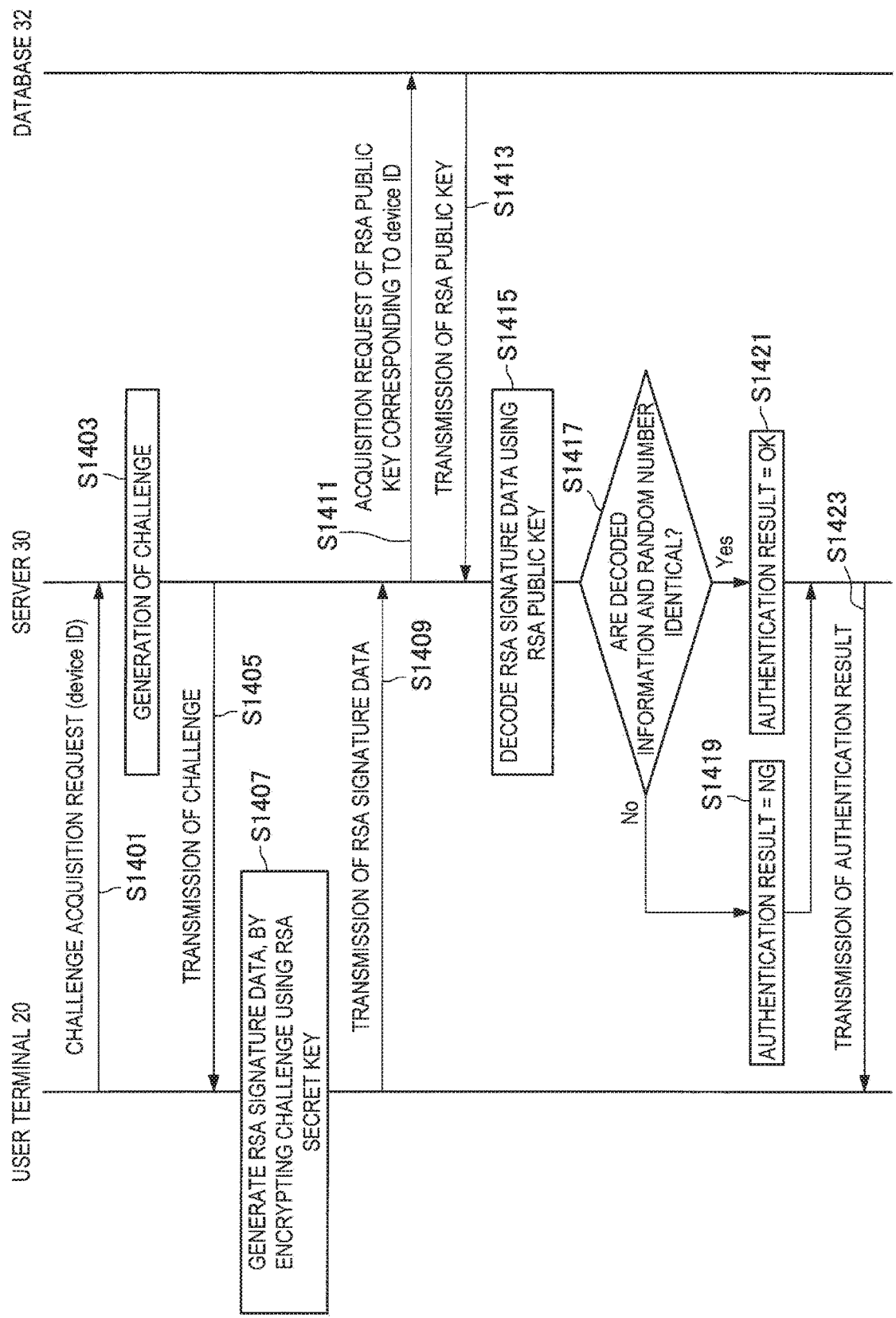
FIG. 10 is a sequence diagram illustrating an operation when authenticating an account by a server 30 according to the same embodiment.

As illustrated in FIG. 10, first, the transmission control unit 206 of the user terminal 20 causes the communication unit 220 to transmit to the server 30 a challenge acquisition request which includes the device ID of the user terminal 20 (S1401).

Thereafter, the random number generating unit 306 of the server 30 generates a challenge which is a uniform random number, for example (S1403). Then, the transmission control unit 304 causes the communication unit 320 to transmit the challenge generated in S1403 to the user terminal 20 (S1405).

Thereafter, the cipher generating unit 202 of the user terminal 20 generates RSA signature data by encrypting the challenge received in S1405 with the RSA secret key of the user terminal 20, (S1407).

Subsequently, the transmission control unit 206 causes the communication unit 220 to transmit the RSA signature data generated in S1407 to the server 30 (S1409).

Thereafter, the transmission control unit 304 of the server 30 causes the communication unit 320 to transmit to the database 32 a request to acquire the RSA public key corresponding to the device ID received in S1401 (S1411).

Thereafter, the database 32 extracts the RSA public key corresponding to the device ID included in the acquisition request received in S1411, and then transmits the extracted RSA public key to the server 30 (S1413).

Thereafter, the verification processing unit 308 of the server 30 decodes the RSA signature data received in S1409, using the RSA public key received in S1413 (S1415).

Subsequently, the verifying unit 310 compares the information decoded in S1415 and the challenge generated in S1403 (S1417). If the both are not identical with each other (S1417: No), the verifying unit 310 sets "NG" to Result (=authentication result), and then does not authenticate the user terminal 20 (S1419). Thereafter, the server 30 performs the operation of S1423 described later.

On the other hand, if the both are identical with each other (S1417: Yes), the verifying unit 310 sets "OK" to the Result, and then authenticates the user terminal 20 (S1421).

Thereafter, the transmission control unit 304 causes the communication unit 320 to transmit the Result set in S1419 or S1421 to the user terminal 20 (S1423).

(1-3-6. Operation when Inviting Guest 2*b*)

Next, with reference to FIG. 11, the operation when inviting the guest 2*b* according to the first embodiment will be described. Note that, for example, this operation is performed to give the unlocking right to the guest 2*b* whom the owner 2*a* approves to give the unlocking right of the lock control device 10-1.

Figure 11:
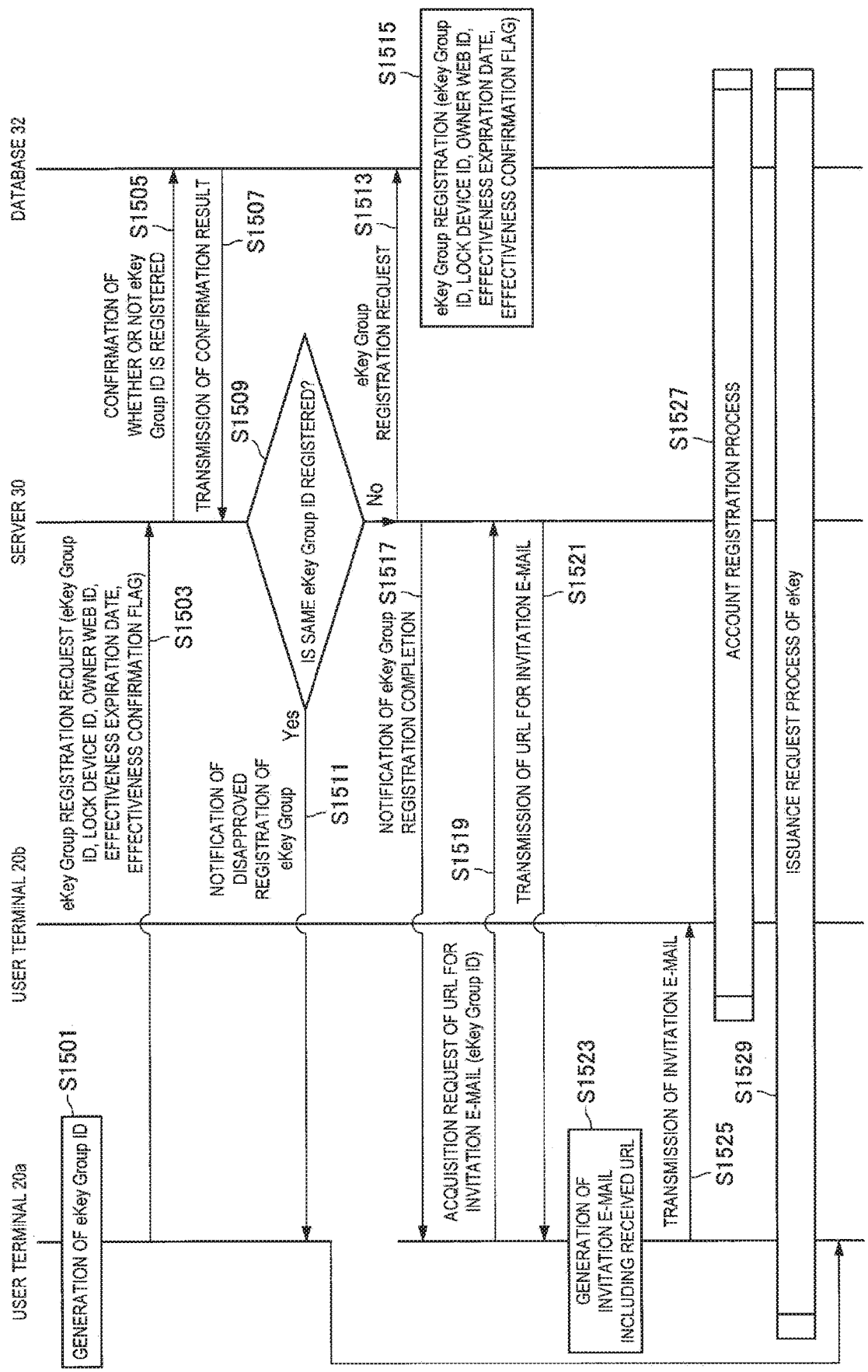
FIG. 11 is a sequence diagram illustrating an operation when inviting a guest 2b according to the same embodiment.

As illustrated in FIG. 11, first, the key information issuing unit 204 of the user terminal 20*a* generates an eKey Group ID associated with the specific lock control device 10-1, on the basis of the input of the owner 2*a* into the operation display unit 222, for example (S1501). Note that, here, the effectiveness expiration date of the eKey Group corresponding to the relevant eKey Group ID, and the value of the effectiveness confirmation flag are also set. Although the detail will be described later, the effectiveness confirmation flag is a flag for setting whether or not the lock control device 10-1 is to inquire of the server 30 as to the effectiveness of the eKey received from the user terminal 20 at the time of the unlocking request by the lock control device 10-1.

Subsequently, the transmission control unit 206 causes the communication unit 220 to transmit to the server 30 a registration request of the eKey Group, which includes the eKey Group ID generated in S1501, the lock control device ID corresponding to the eKey Group ID, the web ID of the owner 2*a*, the effectiveness expiration date set in S1501, and the effectiveness confirmation flag, (S1503).

Thereafter, the transmission control unit 304 of the server 30 causes the communication unit 320 to transmit to the database 32 a request to confirm whether or not the same eKey Group ID as the eKey Group ID included in the registration request received in S1503 has been registered (S1505).

Thereafter, the database 32 performs confirmation on the basis of the request received in S1505, and then transmits the confirmation result to the server 30 (S1507).

Thereafter, if it is confirmed that the same eKey Group ID is registered (S1509: Yes), the transmission control unit 304 of the server 30 causes the communication unit 320 to transmit to the user terminal 20*a* a notification of disapproved registration of the eKey Group (S1511). Then, the "operation when inviting the guest 2*b*" ends.

On the other hand, if it is confirmed that the same eKey Group ID is not registered (S1509: No), the transmission control unit 304 of the server 30 causes the communication unit 320 to transmit to the database 32 the registration request of the eKey Group, on the basis of the registration request received in S1503 (S1513).

Thereafter, the database 32 stores the eKey Group ID, the lock control device ID, the web ID of the owner 2*a*, the effectiveness expiration date, and the effectiveness confirmation flag, which are included in the registration request received in S1513, in association with each other (S1515).

Thereafter, the transmission control unit 304 of the server 30 causes the communication unit 320 to transmit to the user terminal 20*a* a notification of the registration completion of the eKey Group (S1517).

Thereafter, the transmission control unit 206 of the user terminal 20*a* causes the communication unit 220 to transmit to the server 30 a request to acquire the URL for the invitation e-mail (for inviting the guest 2*b* to the eKey Group), which includes the relevant eKey Group ID (S1519).

Thereafter, the control unit 300 of the server 30 decides the URL for the invitation e-mail, on the basis of the acquisition request received in S1519. Note that this URL is the link information to a predetermined link destination in the server 30, for example.

Then, the transmission control unit 304 causes the communication unit 320 to transmit the decided URL to the user terminal 20*a* (S1521).

Thereafter, the invitation e-mail generating unit 208 of the user terminal 20*a* generates the invitation e-mail including the URL received in S1521 (S1523). Then, the transmission control unit 206 causes the communication unit 220 to transmit the invitation e-mail generated in S1523 to the user terminal 20*b* (S1525).

Thereafter, the substantially same process as the "operation when registering the account into the server 30" described in section 1-3-3 is executed between the user terminal 20*b*, the server 30, and the database 32 (S1527).

Thereafter, the "operation when requesting the issuance of the eKey", which is described later, is performed between the user terminal 20*a*, the user terminal 20*b*, the server 30, and the database 32 (S1529).

(1-3-7. Operation when Requesting Issuance of eKey)

Next, with reference to FIG. 12, the "operation when requesting the issuance of the eKey" in S1529 will be described in detail. Note that, for example, this operation is performed when the guest 2*b* who has received the invitation e-mail from the owner 2*a* requests the issuance of the eKey to the owner 2*a* via the server 30.

Figure 12:
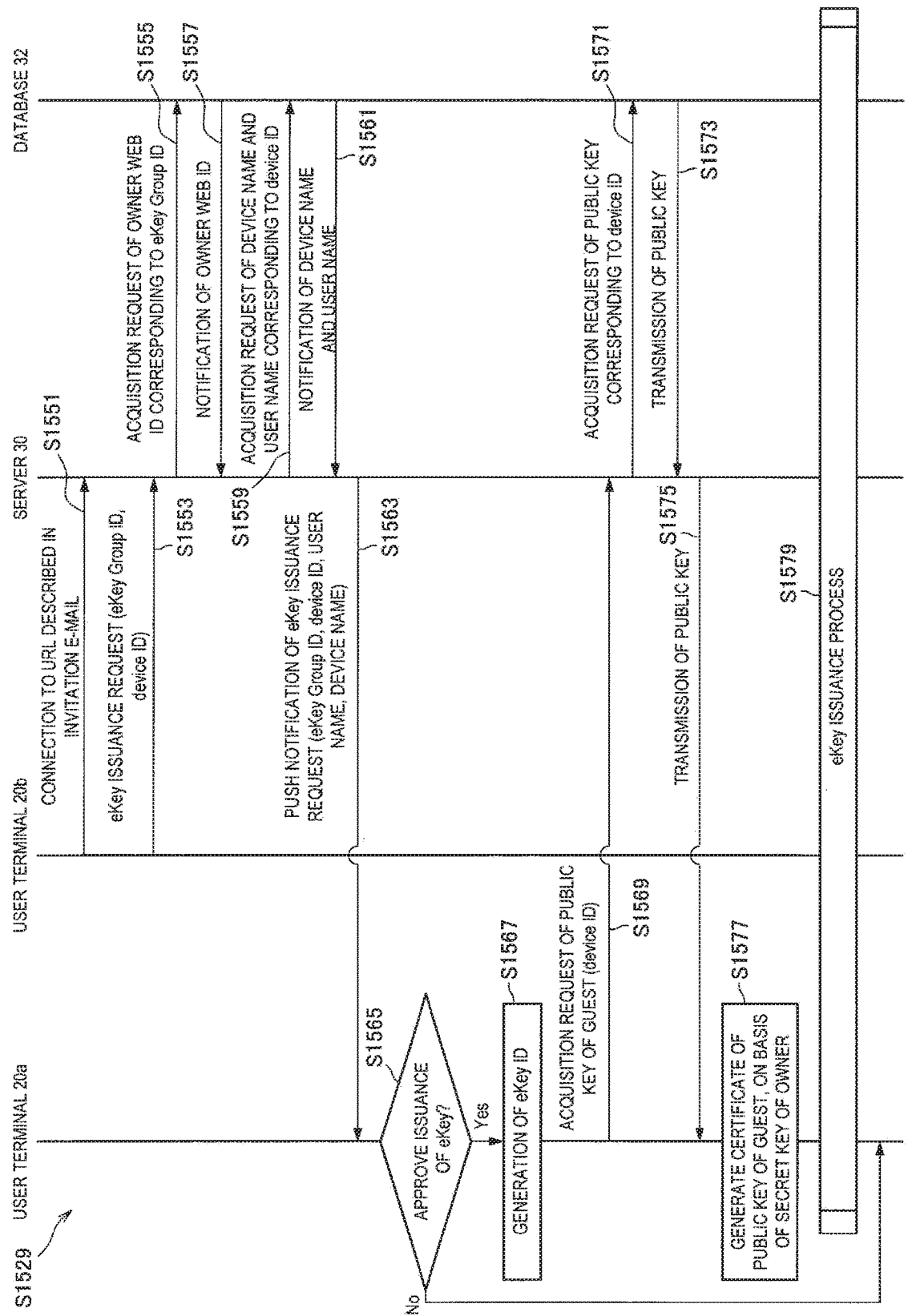
FIG. 12 is a sequence diagram illustrating an operation when requesting an issuance of an eKey according to the same embodiment.

As illustrated in FIG. 12, first, the user terminal 20*b* accesses to the URL described in the invitation e-mail received in S1525 illustrated in FIG. 11 (S1551). Thereby, the user terminal 20*b* accesses to a predetermined link destination in the server 30.

Subsequently, the transmission control unit 206 of the user terminal 20*b* causes the communication unit 220 to transmit to the server 30 an eKey issuance request, which includes the eKey Group ID described in the invitation e-mail received in S1525 and the device ID of the user terminal 20*b* (S1553).

Thereafter, the transmission control unit 304 of the server 30 causes the communication unit 320 to transmit to the database 32 a request to acquire the web ID of the owner 2*a* on the basis of the eKey issuance request received in S1553 (S1555).

Thereafter, the database 32 extracts the web ID of the owner 2a corresponding to the eKey Group ID included in the received acquisition request, and then transmits the extracted web ID to the server 30 (S1557).

Thereafter, the transmission control unit 304 of the server 30 causes the communication unit 320 to transmit to the database 32 a request to acquire the device name and the user name, on the basis of the eKey issuance request received in S1553 (S1559).

Thereafter, the database 32 extracts the device name and the user name corresponding to the device ID included in the acquisition request received in S1559, and then transmits the extracted device name and user name to the server 30 (S1561).

Thereafter, the transmission control unit 304 of the server 30 push-notifies the user terminal 20a corresponding to the web ID received in S1557, of the eKey issuance request which includes the eKey Group ID and the device ID included in the eKey issuance request received in S1553, and the device name and the user name received in S1561 (S1563).

Thereafter, the display control unit 210 of the user terminal 20a causes the operation display unit 222 to display the eKey issuance approval screen image for example, on the basis of the issuance request transmitted in S1563. Then, if the owner 2a inputs disapproval into the operation display unit 222 (S1565: No), the user terminal 20a ends the process. Then, the "operation when requesting the issuance of the eKey" ends.

On the other hand, if the owner 2a inputs approval (S1565: Yes), the key information issuing unit 204 of the user terminal 20a generates an eKey ID which is a universally unique identifier (UU ID), for example (S1567).

Thereafter, the transmission control unit 206 of the user terminal 20a causes the communication unit 220 to transmit to the server 30 a request to acquire the RSA public key corresponding to the device ID transmitted in S1563 (S1569).

Thereafter, the transmission control unit 304 of the server 30 causes the communication unit 320 to transmit to the database 32 a request to acquire the RSA public key, on the basis of the acquisition request received in S1569 (S1571).

Thereafter, the database 32 extracts the RSA public key corresponding to the device ID included in the received acquisition request, and then transmits the extracted RSA public key to the server 30 (S1573).

Thereafter, the transmission control unit 304 of the server 30 causes the communication unit 320 to transmit the RSA public key received in S1573 to the user terminal 20a (S1575).

Thereafter, the cipher generating unit 202 of the user terminal 20a generates a certificate of the received RSA public key, by creating a digital signature using the RSA secret key of the user terminal 20a with respect to the RSA public key received in S1575 (i.e., the RSA public key of the guest 2b), (S1577).

Thereafter, the "operation when issuing an eKey" described later is performed between the user terminal 20a, the user terminal 20b, the server 30, and the database 32, (S1579).

(1-3-8. Operation when Issuing eKey)

Next, with reference to FIG. 13, the "operation when issuing an eKey" in S1579 will be described in detail. Note that, for example, this operation is performed when the user terminal 20a of the owner 2a issues the eKey of the user terminal 20b of the guest 2b, and then delivers the eKey to the user terminal 20b via the server 30.

Figure 13:
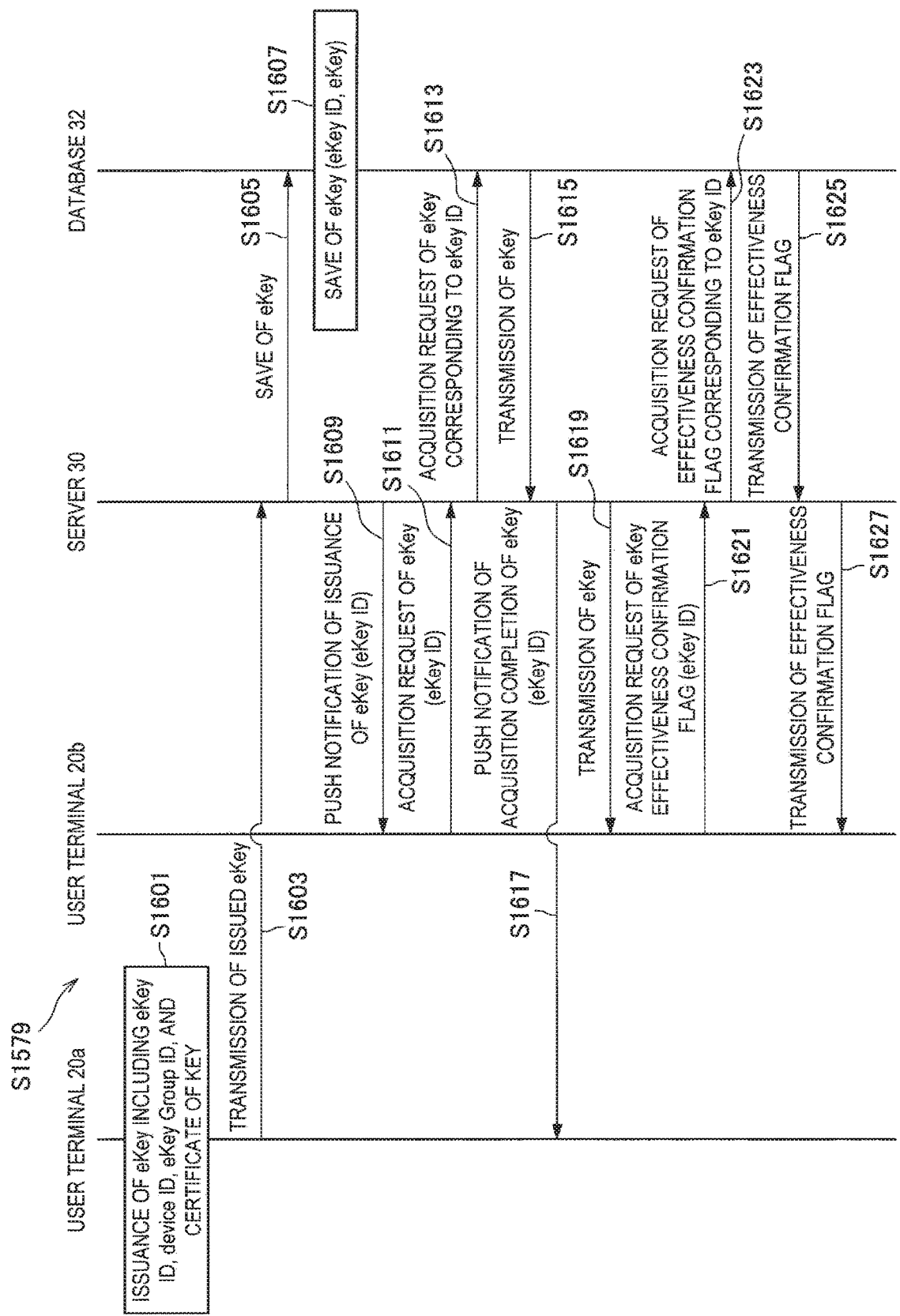
FIG. 13 is a sequence diagram illustrating an operation when issuing an eKey according to the same embodiment.

As illustrated in FIG. 13, first, the key information issuing unit 204 of the user terminal 20a issues an eKey including the eKey ID generated in S1567 illustrated in FIG. 12, the device ID of the user terminal 20a, and the certificate of the RSA public key generated in S1577, for example (S1601). Then, the transmission control unit 206 causes the communication unit 220 to transmit the eKey and the eKey ID issued in S1601 to the server 30 (S1603).

Thereafter, the transmission control unit 304 of the server 30 causes the communication unit 320 to transmit the eKey ID and the eKey received in S1603 to the database 32 (S1605).

Thereafter, the database 32 stores the eKey ID and the eKey received in S1605 in association with each other (S1607).

Thereafter, the transmission control unit 304 of the server 30 push-notifies to the user terminal 20b the issuance of the eKey notification including the eKey ID received in S1603 (S1609).

Thereafter, the transmission control unit 206 of the user terminal 20b causes the communication unit 220 to transmit to the server 30 a request to acquire the eKey corresponding to the eKey ID transmitted in S1609, on the basis of the input of the guest 2b into the operation display unit 222, for example (S1611).

Thereafter, the transmission control unit 304 of the server 30 causes the communication unit 320 to transmit to the database 32 a request to acquire the eKey, on the basis of the acquisition request received in S1611 (S1613).

Thereafter, the database 32 extracts the eKey corresponding to the eKey ID included in the acquisition request received in S1613, and then transmits the extracted eKey to the server 30 (S1615).

Thereafter, the transmission control unit 304 of the server 30 push-notifies to the user terminal 20a (of the owner 2a) a notification of the acquisition completion of the eKey including the eKey ID received in S1603 (S1617).

Subsequently, the transmission control unit 304 causes the communication unit 320 to transmit the eKey received in S1615 to the user terminal 20b (S1619).

Thereafter, the transmission control unit 206 of the user terminal 20b causes the communication unit 220 to transmit to the server 30 a request to acquire the effectiveness confirmation flag of the eKey including the relevant eKey ID, on the basis of the input of the user into the operation display unit 222, for example (S1621).

Thereafter, the transmission control unit 304 of the server 30 causes the communication unit 320 to transmit to the database 32 a request to acquire the effectiveness confirmation flag, on the basis of the acquisition request received in S1621 (S1623).

Thereafter, the database 32 extracts the effectiveness confirmation flag corresponding to the eKey ID included in the acquisition request received in S1623, and then transmits the extracted effectiveness confirmation flag to the server 30 (S1625).

Thereafter, the transmission control unit 304 of the server 30 causes the communication unit 320 to transmit the effectiveness confirmation flag received in S1625 to the user terminal 20b (S1627).

(1-3-9. Operation when Unlocking)

Next, with reference to FIG. 14, the operation when unlocking according to the first embodiment will be described. Note that, for example, this operation is performed when the user terminal 20 that possess the eKey corresponding to the relevant lock control device 10-1 accesses the lock control device 10-1, and then requests the lock control device 10-1 to unlock. Although, in the following, an exemplary operation performed when the user terminal 20b of the guest 2b requests unlocking will be described, the operation performed when the user terminal 20a of the owner 2a requests unlocking is substantially same.

Figure 14:
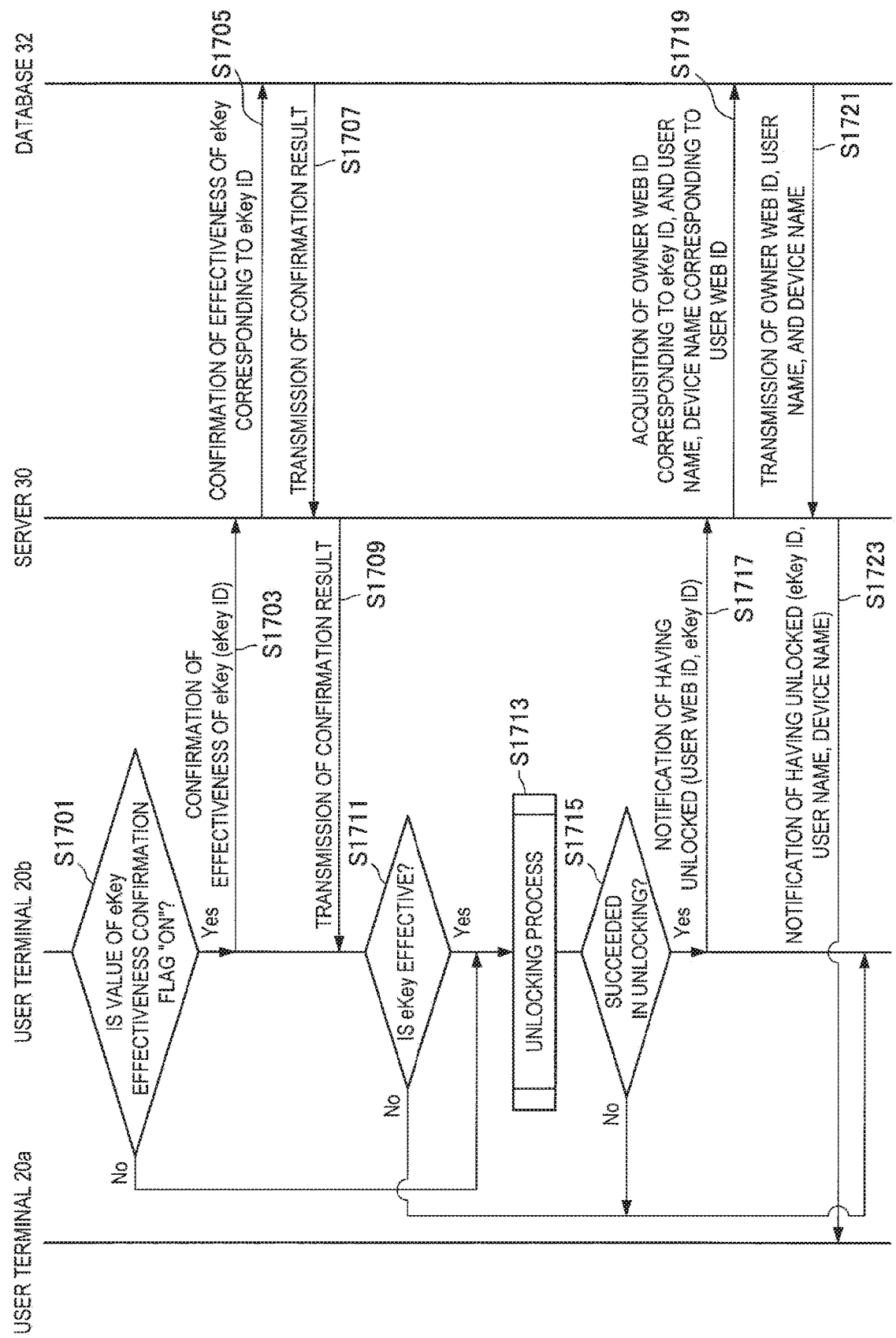
FIG. 14 is a sequence diagram illustrating a part of an operation when unlocking according to the same embodiment.

As illustrated in FIG. 14, first, the user terminal 20b confirms whether or not the value of the effectiveness confirmation flag received in S1627 illustrated in FIG. 13 is "ON" (S1701). If the value of the effectiveness confirmation flag is not "ON" (S1701: No), the user terminal 20b performs the operation of S1713 described later.

On the other hand, if the value of the effectiveness confirmation flag is "ON" (S1701: Yes), the transmission control unit 206 of the user terminal 20b causes the communication unit 220 to transmit to the server 30 a request to confirm the effectiveness of the eKey, which includes the relevant eKey ID (S1703).

Thereafter, the transmission control unit 304 of the server 30 causes the communication unit 220 to transmit to the database 32 a request to confirm the effectiveness of the eKey, on the basis of the confirmation request received in S1703 (S1705).

Thereafter, the database 32 extracts the information relevant to the effectiveness of the eKey corresponding to the eKey ID included in the confirmation request received in S1705, and then transmits the extracted information to the server 30 (S1707).

Thereafter, the transmission control unit 304 of the server 30 causes the communication unit 320 to transmit to the user terminal 20b the confirmation result of the effectiveness based on the information received in S1707 (S1709).

Thereafter, if the confirmation result received in S1709 indicates non-effectiveness of the eKey (S1711: No), the user terminal 20b ends the process. Then, the "operation when unlocking" ends.

On the other hand, if the confirmation result received in S1709 indicates effectiveness of the eKey (S1711: Yes), the user terminal 20b performs the "unlocking process" described later (S1713).

Then, if fails in unlocking in S1713 (S1715: No), the user terminal 20b ends the process. Then, the "operation when unlocking" ends.

On the other hand, if succeeds in the unlocking (S1715: Yes), the transmission control unit 206 of the user terminal 20b causes the communication unit 220 to transmit to the server 30 a notification of carrying out unlocking, which includes the user web ID and the eKey ID of the user terminal 20b (S1717).

Thereafter, the transmission control unit 304 of the server 30 causes the communication unit 320 to transmit to the database 32 a request to acquire the web ID of the owner 2a and the user name and the device name of the guest 2b, on the basis of the notification of carrying out unlocking received in S1717 (S1719).

Thereafter, the database 32 extracts the web ID of the owner 2a corresponding to the eKey ID included in the acquisition request received in S1719 and the user name and the device name corresponding to the user web ID included in the acquisition request, and then transmits the extracted information to the server 30 (S1721).

Thereafter, the transmission control unit 304 of the server 30 causes the communication unit 220 to transmit to the user terminal 20 corresponding to the web ID received in S1721 (i.e., the user terminal 20a of the owner 2a) a notification of carrying out unlocking, which includes the eKey ID received in S1717 and the user name and the device name received in S1721 (S1723).

(1-3-10. Operation of Unlocking Process)

Figure 15:
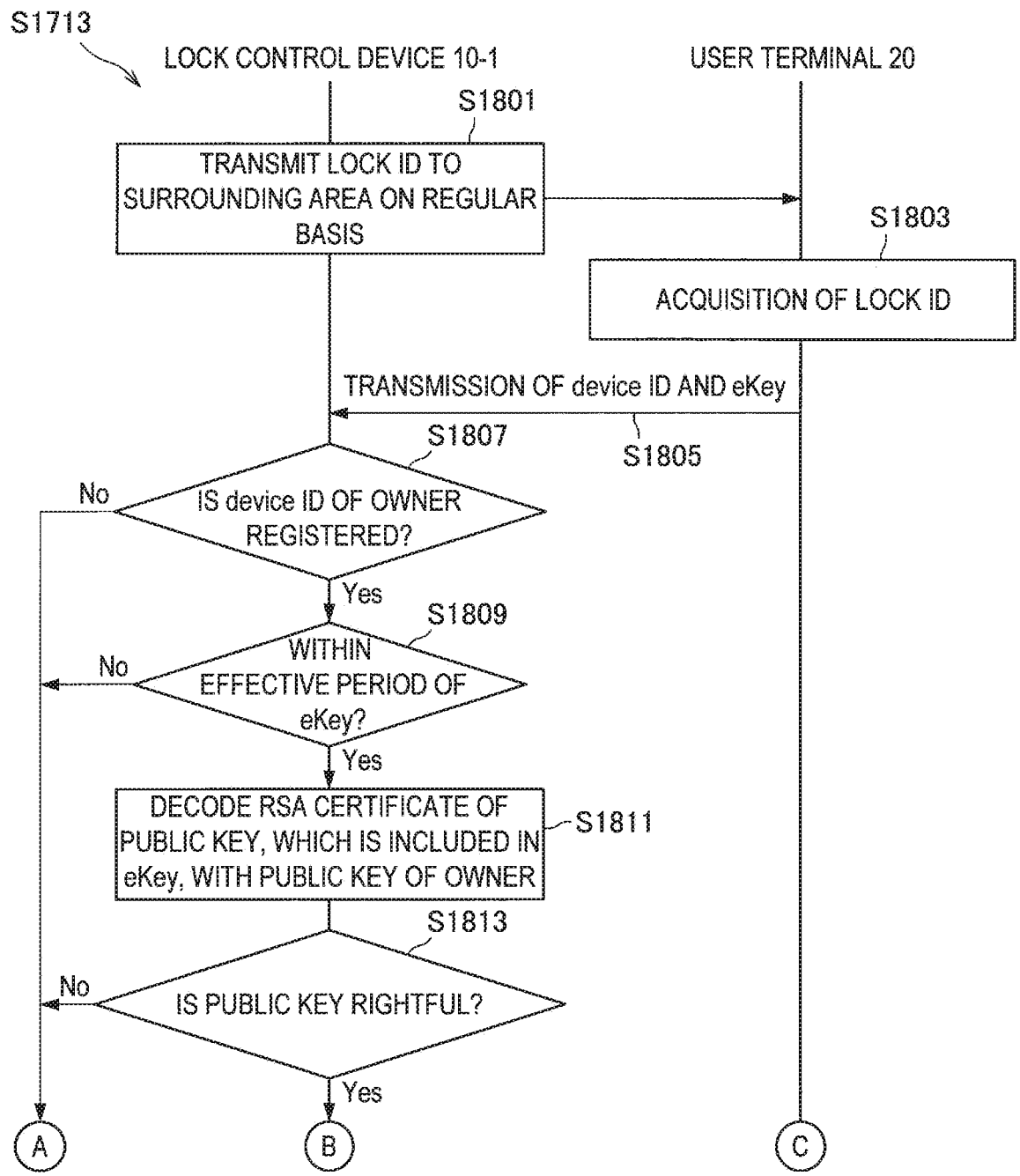
FIG. 15 is a sequence diagram illustrating a part of an operation of an unlocking process according to the same embodiment.

Next, with reference to FIGS. 15 and 16, the "operation of the unlocking process" in S1713 will be described in detail. Note that the operation of S1801 to S1803 illustrated in FIG. 15 is same as the operation of S1101 to S1103 illustrated in FIG. 7.

After S1803, the transmission control unit 206 of the user terminal 20 causes the communication unit 220 to transmit to the lock control device 10-1 the device ID of the user terminal 20 and the eKey (received in S1619 illustrated in FIG. 13 for example) (S1805).

Thereafter, the control unit 100-1 of the lock control device 10-1 confirms whether or not the device ID received in S1805 has been recorded in the registration key DB 136 (S1807). If the device ID is not recorded in the registration key DB 136 (S1807: No), the lock control device 10-1 performs the operation of S1831 described later.

On the other hand, if the device ID is recorded in the registration key DB 136 (S1807: Yes), the key information verifying unit 102 confirms the value of the effective period included in the eKey received in S1805, and then determines whether or not the present moment is within the effective period of the eKey (S1809). If not within the effective period of the eKey (S1809: No), the lock control device 10-1 performs the operation of S1831 described later.

On the other hand, if within the effective period of the eKey (S1809: Yes), the verification processing unit 104 decodes the RSA certificate of the public key of the user 2b which is included in the relevant eKey, using the RSA public key of the user terminal 20a of the owner 2a which is recorded in the registration key DB 136 (S1811).

Then, the key information verifying unit 102 determines whether or not the RSA public key of the user 2b is rightful, on the basis of the certificate decoded in S1811 (S1813). If it is determined that the RSA public key of the user 2b is not rightful (S1813: No), the lock control device 10-1 performs the operation of S1831 described later.

On the other hand, if it is determined that the RSA public key of the user 2b is rightful (S1813: Yes), the random number generating unit 110 generates a random number. Then, the transmission control unit 112 causes the communication unit 130 to transmit the generated random number to the user terminal 20 (S1821).

Next, with reference to FIG. 16, the operation after S1821 will be described. Note that the operation of S1823 to S1827 is same as S1011 to S1015 illustrated in FIG. 6.

After S1827, the determination unit 106 of the lock control device 10-1 compares the information decoded in S1827 and the random number generated in S1821 (S1829). If the both are not identical with each other (S1829: No), the determination unit 106 decides not to unlock (S1831). Thereafter, the lock control device 10-1 performs the operation of S1835 described later.

On the other hand, if the both are identical with each other (S1829: Yes), the determination unit 106 decides to unlock. Then, the locking control unit 108 causes the locking unit 132 to unlock (S1833).

Thereafter, the transmission control unit 112 causes the communication unit 130 to transmit to the user terminal 20 the execution result of S1831 or S1833 (S1835).

(1-3-10-1. Exemplary Variant)

Note that, in an exemplary variant of S1833, the determination unit 106 may record the RSA public key and the header 400 included in the eKey received in S1805 in association with each other in the registration key DB 136, when the user terminal 20 is the user terminal 20 of the guest 2b, and, this user terminal 20 unlocks for the first time. According to this exemplary variant, the process such as transmission of the eKey and verification of the eKey is omitted in S1805 to S1813 for example, at the second or later unlocking request by the relevant user terminal 20. This makes the process faster.

(1-3-11. Operation when Requesting Invalidation of eKey Group)

Next, with reference to FIG. 17, the operation when requesting the invalidation of the eKey Group, according to the first embodiment will be described. Note that this operation is performed when the owner 2a wishes to invalidate the eKey Group associated with the lock control device 10-1, at the time of the replacement of the lock control device 10-1, for example.

Figure 17:
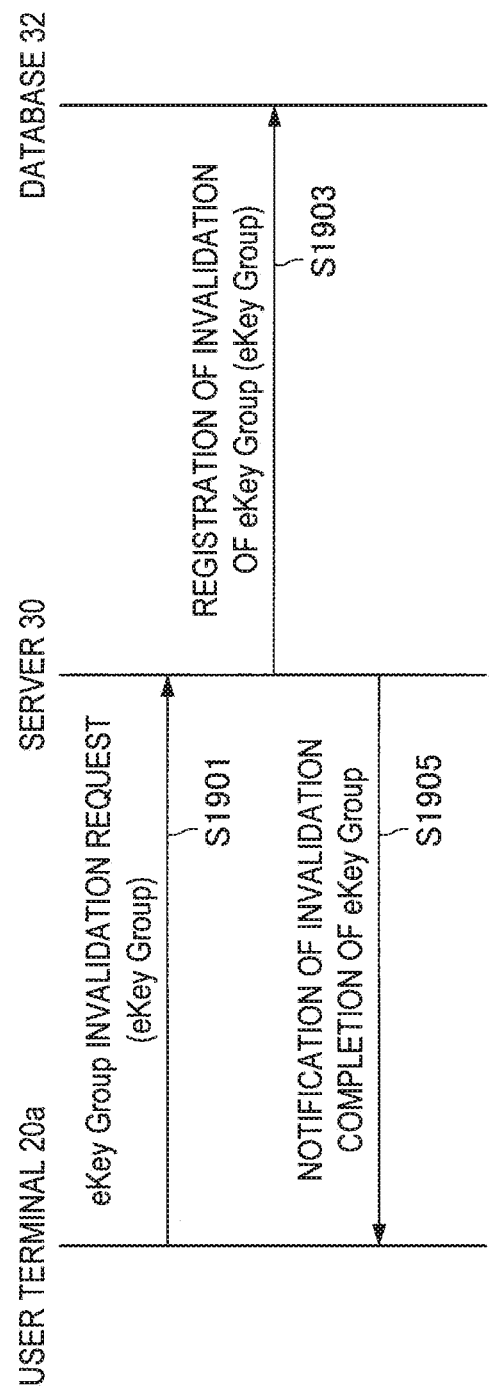
FIG. 17 is a sequence diagram illustrating an operation when requesting an invalidation of an eKey Group according to the same embodiment.

As illustrated in FIG. 17, first, the owner 2a inputs the eKey Group ID and the invalidation registration into an eKey Group invalidation registration screen image displayed on the operation display unit 222 of the user terminal 20a, for example. Then, the transmission control unit 206 of the user terminal 20a causes the communication unit 220 to transmit to the server 30 an invalidation request of the eKey Group which includes the input eKey Group ID (S1901).

Thereafter, the transmission control unit 304 of the server 30 records in the database 32 the invalidation of the eKey Group corresponding to the eKey Group ID included in the invalidation request received in S1901 (S1903). Thereby, the eKey Group corresponding to the relevant eKey Group ID is invalidated.

Thereafter, the transmission control unit 304 of the server 30 causes the communication unit 320 to transmit a notification of the invalidation completion of the eKey Group to the user terminal 20a (S1905).

1-4. Effect (1-4-1. Effect 1)

In the above, for example as described with reference to FIG. 2, FIG. 15, FIG. 16, and other drawings, the lock control device 10-1 according to the first embodiment receives from the user terminal 20 the unlocking request and the information generated on the basis of the secret key of the user terminal 20, and then determines whether or not to cause the locking unit 132 to unlock on the basis of the received information generated by the user terminal 20 and the public key of the user terminal 20. Hence, the lock control device 10-1 authenticates the user terminal 20 without receiving information of high secrecy from the user terminal 20, and therefore the safety of authentication is high.

Further, the user terminal 20 is needless to register information of high secrecy into the lock control device 10-1 and the server 30, and therefore information of high secrecy is prevented from leaking outside even when not unlocking.

Also, the lock control device 10-1 verifies the rightfulness of the public key of the user terminal 20b, by verifying, using the public key of the user terminal 20a, the signature information of the user terminal 20a of the owner 2a, which is included in the eKey received from the user terminal 20b. Hence, the lock control device 10-1 can confirm whether or not the user terminal 20b of the authentication target is the user terminal 20 of the user 2 having unlocking authority.

(1-4-2. Effect 2)

Also, according to the first embodiment, if only the mail address of the guest 2b is identified, the user terminal 20a of the owner 2a can transmit the eKey ID, which is an e-mail including an invitation letter of eKey issuance, to the user terminal 20b of the guest 2b.

Also, only when the user terminal 20a approves the approval request received via the server 30 after transmitting the e-mail to the user terminal 20b of the guest 2b, the eKey is delivered to the user terminal 20b. Hence, the eKey is issued only to the guest 2b whom the owner 2a wants to approve.

Note that the eKey ID is just a pointer for having the eKey issued, and the eKey ID alone does not cause the lock control device 10-1 to unlock. Hence, even if an e-mail including the eKey ID is intercepted by a third person, the unlocking right of the lock control device 10-1 is not stolen.

1-5. Application Example

In the above, the first embodiment has been described. Next, the application example of the first embodiment will be described with reference to FIGS. 18 to 20.

(1-5-1. Background)

First, the background that has lead up to creating the present application example will be described. In the above first embodiment, the user 2 who can issue the eKey is only the owner 2a basically. Hence, for example, when the eKey is issued for a large number of guests 2b, it takes time to issue the eKey for all the users 2b. Also, the owner 2a is to perform an approval operation in response to the eKey issuance request from individual guest 2b, and therefore the work load of the owner 2a is huge.

As described later, according to the present application example, the owner 2a can register a vice owner 2c having the authority for issuing the eKey, from among other users 2.

(1-5-2. System Configuration)

Figure 18:
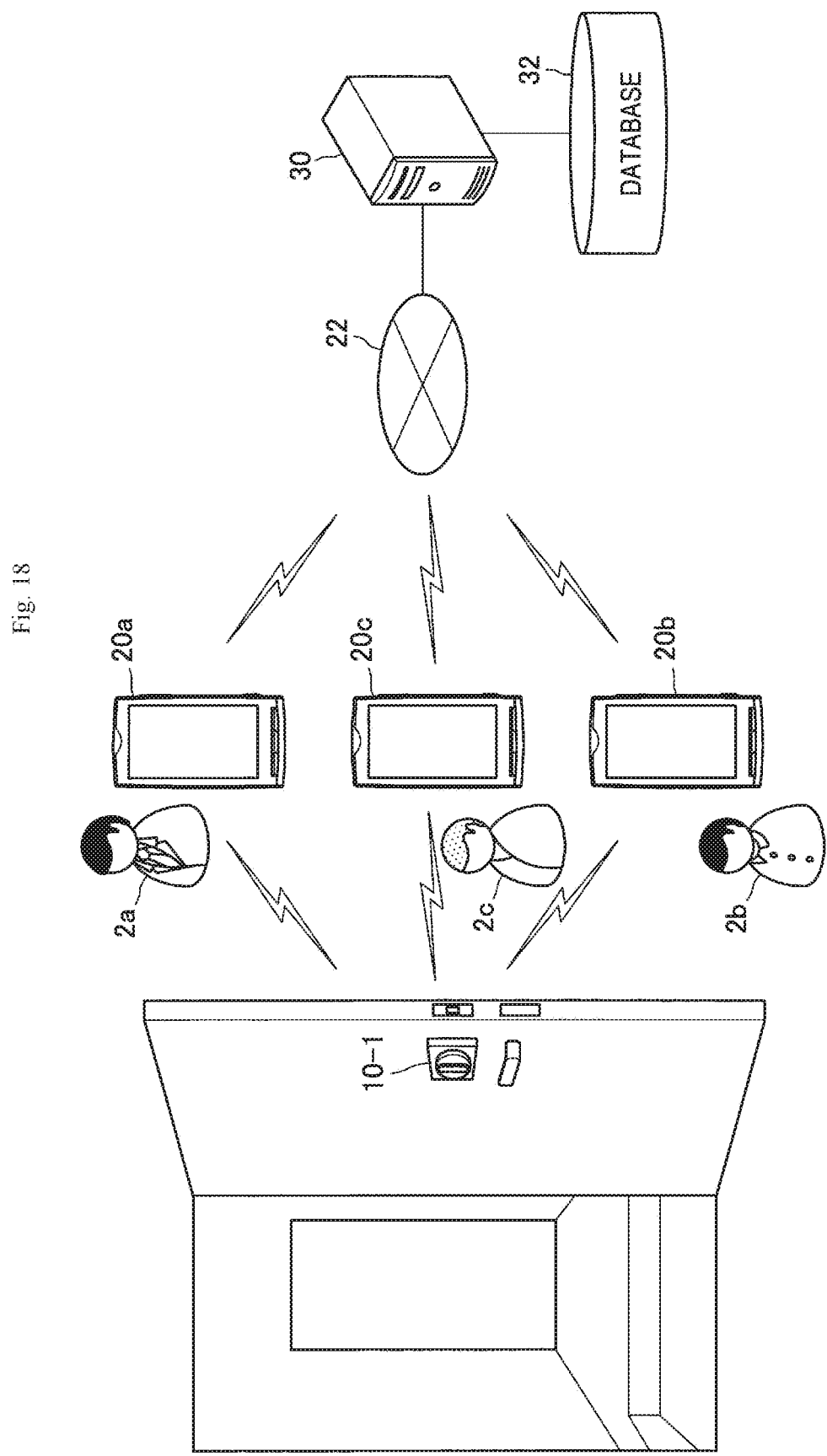
FIG. 18 is an explanatory diagram illustrating an exemplary configuration of an information processing system according to an application example of the same embodiment.

Next, with reference to FIG. 18, the configuration of the information processing system according to the present application example will be described. As illustrated in FIG. 18, the information processing system according to the present application example further includes a user terminal 20c of the vice owner 2c, as compared with the system illustrated in FIG. 1. Here, the vice owner 2c is the user 2 having the authority for issuing a conditional eKey. For example, the vice owner 2c is set at a lower rank than the owner 2a, and, has the authority for issuing the eKey to the user 2 of the lower rank than the rank set at itself. As one example, the vice owner 2c can issue the eKey to the guest 2b who does not have the authority for issuing the eKey.

Note that other components are same as the first embodiment.

(1-5-3. Configuration)

(1-5-3-1. User Terminal 20)

In the above, the configuration of the information processing system according to the present application example has been described. Next, the configuration according to the present application example will be described in detail. The configuration of the user terminal 20 by the present application example is substantially same as the configuration illustrated in FIG. 4. In the following, only components having the function different from the above first embodiment will be described.

Cipher Generating Unit 202

When the user terminal 20 is the user terminal 20 of the owner 2a or the vice owner 2c, the cipher generating unit 202 according to the present application example creates a digital signature for the public key of the user terminal 20b of the user 2b of eKey issuance target. For example, in the above case, the cipher generating unit 202 creates a digital signature by encrypting the public key of the target user 2b, using the secret key of the user terminal 20.

Key Information Issuing Unit 204

Setting of eKey Level

The key information issuing unit 204 according to the present application example issues the eKey additionally including the eKey level indicating the rank of the user 2 of eKey issuance target.

FIG. 19 is an explanatory diagram illustrating an exemplary configuration of the eKey (eKey 40-2) according to the present application example. As illustrated in FIG. 19, the eKey 40-2 further includes the eKey level 4008, as compared with the eKey 40-1 illustrated in FIG. 3. Here, the value of the eKey level set to the relevant user 2 is recorded in the eKey level 4008.

Note that, the value of the eKey level is set by the user 2 who is the issuer of the eKey (hereinafter, sometimes referred to as eKey issuance user 2). For example, the eKey issuance user 2 sets a lower value than its own eKey level at the eKey level. As one example, the eKey issuance user 2 sets an integer within the range of "its own eKey level −1" to "−10" at the eKey level. Here, "−10" is the default value of the eKey level, and is the value given to the user 2 who does not have the authority for issuing the eKey. Also, "0" is set to the eKey level of the owner 2a.

According to this exemplary setting, the user 2 whose eKey level is set to the value of "−1" to "−9" can set a lower value than its own eKey level at the eKey level and issue the eKey. That is, the user 2 has the authority of the vice owner 2c who can issue the eKey conditionally.

(1-5-3-2. Lock Control Device 10-1, Server 30)

The configuration and the function of the lock control device 10-1 and the server 30 according to the present application example are substantially same as the above first embodiment.

(1-5-4. Operation)

In the above, the configuration according to the present application example has been described. Next, the operation according to the present application example will be described with reference to FIG. 20. Note that the operation other than S1501 illustrated in FIG. 11 is substantially same as the above first embodiment, and therefore the description will be omitted.

Figure 20:
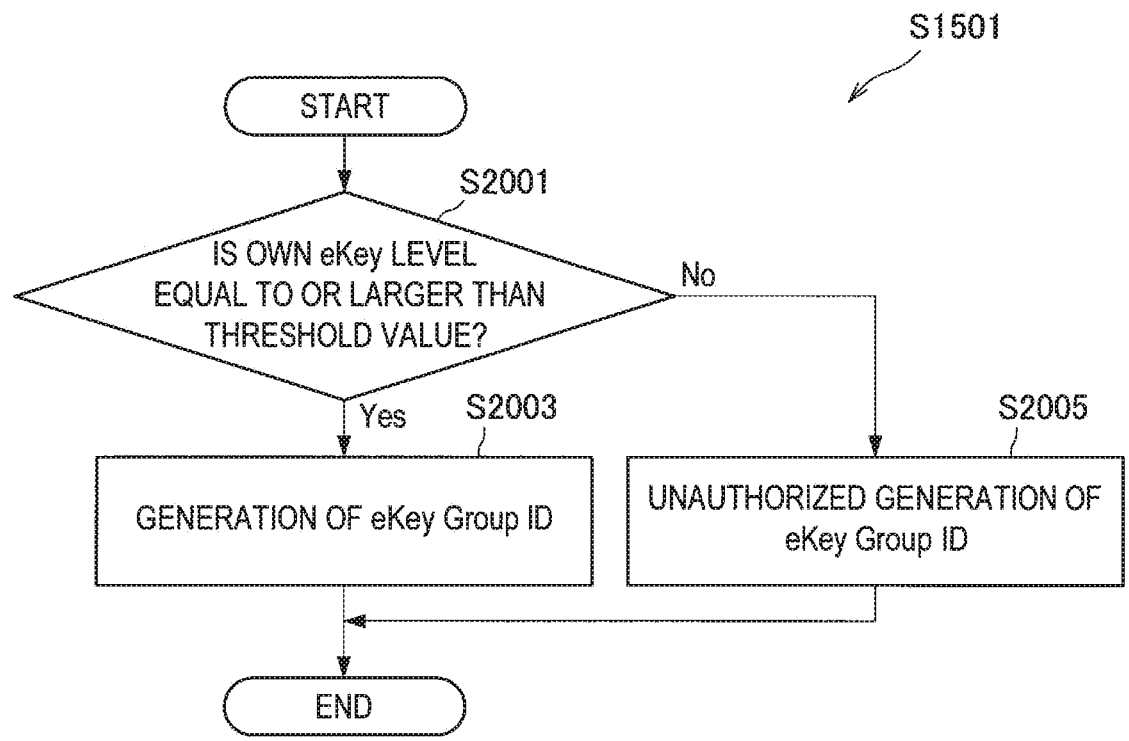
FIG. 20 is a sequence diagram illustrating a part of an operation according to the same application example.

As illustrated in FIG. 20, in the present application example, the operation of S2001 to S2003 is performed, instead of S1501. First, the key information issuing unit 204 of the user terminal 20a determines whether or not the eKey level included in the eKey of the user terminal 20a is equal to or larger than a threshold value of the authority for issuing the eKey, such as "−9" for example (S2001). If the eKey level is smaller than the threshold value (S2001: No), the user terminal 20a determines that there is no authority for issuing the eKey (S2005). Then, the "operation when inviting the guest 2b" ends.

On the other hand, if the eKey level is equal to or larger than the threshold value (S2001: Yes), the key information issuing unit 204 generates the eKey Group ID in association with the eKey level of the terminal itself for example (S2003). Thereafter, the user terminal 20a performs the operation at or after S1503 illustrated in FIG. 11.

(1-5-5. Effect)

In the above, as described with reference to FIGS. 18 to 20, the user terminal 20 according to the present application example issues the eKey additionally including the eKey level indicating the rank of the user 2 of eKey issuance target. Then, the eKey level is set to a lower value than the eKey level of the eKey issuance user 2.

Hence, the user 2 other than the owner 2a is also capable of issuing the eKey whose eKey level is set to a lower value than its own eKey level, when the eKey level set for itself is equal to or larger than the threshold value, so as to have the authority of the vice owner 2c. Then, the owner 2a can select the vice owner 2c to commission the vice owner 2c to issue the eKey to the guest 2b for example, reducing the work load of the owner 2a.

For example, according to the present application example, the proprietor (the owner 2a) of the apartment building sets the real estate management company as the vice owner 2c for example, and then commissions the real estate management company to issue the eKey to the guest 2b such as tenants of each room of the apartment building, maintenance workers, the intermediate agent, etc. Hence, the work load of the proprietor of the apartment building is reduced significantly.

(1-5-6. Exemplary Variant)

Although, in the above application example, an example using the eKey level has been described as the method for setting the vice owner 2c, an embodiment of the present disclosure is not limited to such an example. As an exemplary variant, a method in which the flag indicating the presence or absence of the authority of the vice owner 2c is set in the eKey or the public key of the user 2 may be used.

2. Second Embodiment 2-1. Background

In the above, the first embodiment has been described. Next, the second embodiment will be described.

First, the background that has lead up to creating the second embodiment will be described. In the above first embodiment, authentication is performed using only one authentication algorithm, such as the RSA authentication algorithm, for example.

In the meantime, in only one authentication algorithm implemented in the lock control device 10-1, there is a risk of being unable to maintain the confidentiality of the key, due to the reason such as dramatic progress of the calculation functionality in future for example. Then, there is a risk that the key is decrypted by the third person who does not have the rightful authority in order to unlock.

As described later, the lock control device 10-2 according to the second embodiment is capable of implementing a plurality of types of authentication algorithms.

2-2. System Configuration

The system configuration according to the second embodiment is same as the first embodiment illustrated in FIG. 1 or FIG. 18.

2-3. Configuration (2-3-1. Lock Control Device 10-2)

Figure 21:
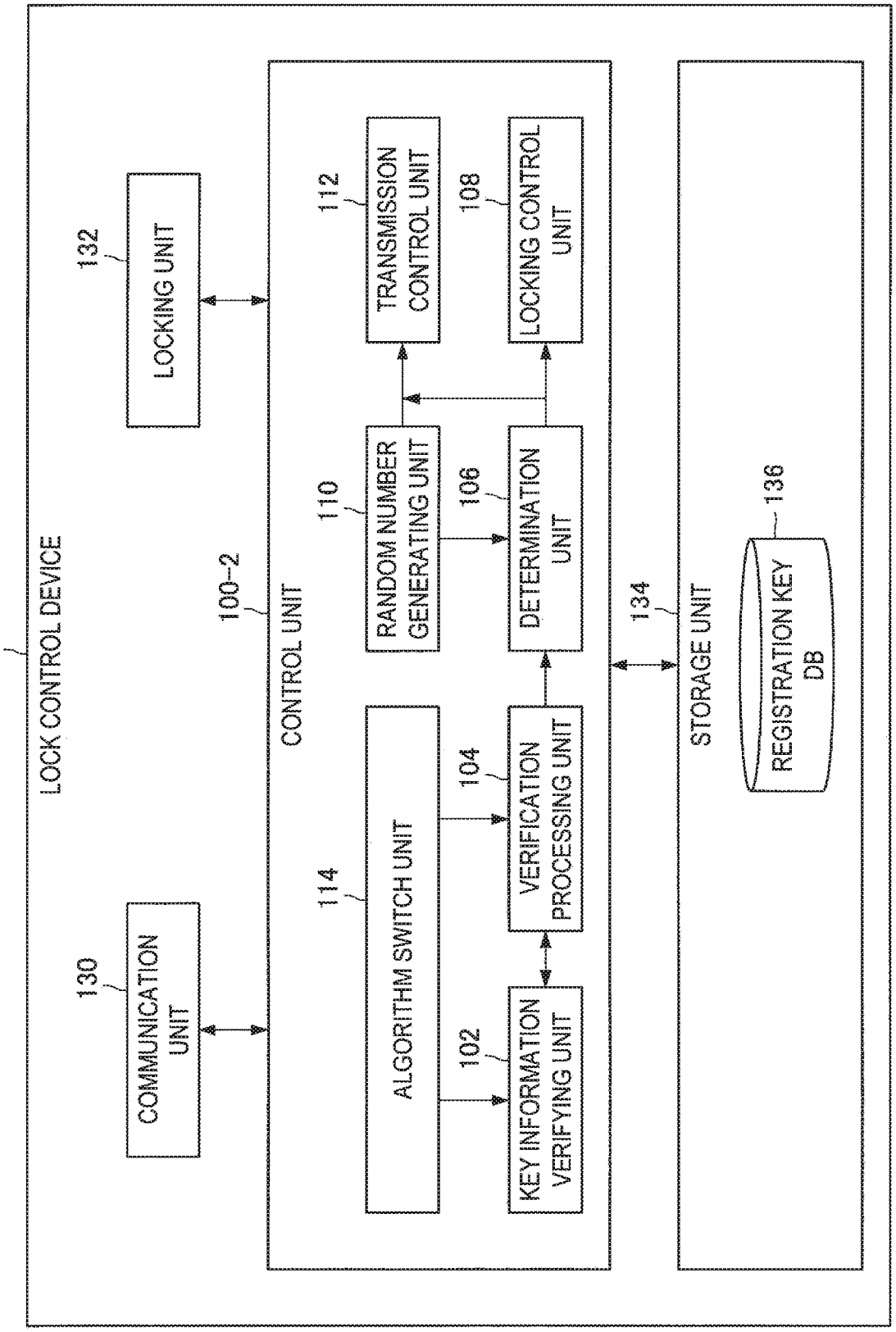
FIG. 21 is a functional block diagram illustrating an exemplary configuration of a lock control device 10-2 according to a second embodiment of the present disclosure.

Next, the configuration according to the second embodiment will be described in detail. FIG. 21 is a functional block diagram illustrating the configuration of the lock control device 10-2 according to the second embodiment. The lock control device 10-2 can have a movable lock interface that is removably coupleable external to, adjacent to, or over a movable component of the lock, such as a thumbturn, to unlock the lock. As illustrated in FIG. 21, the lock control device 10-2 includes the control unit 100-2, instead of the control unit 100-1, as compared with the lock control device 10-1 illustrated in FIG. 2. Note that, in the following, the description will be omitted with respect to the functions overlapping the first embodiment.

(2-3-1-1. Control Unit 100-2)

The control unit 100-2 further includes an algorithm switch unit 114, as compared with the control unit 100-1 according to the first embodiment.

(2-3-1-2. Algorithm Switch Unit 114)

When a change request from the first authentication algorithm to the second authentication algorithm is received from the user terminal 20a of the owner 2a, the algorithm switch unit 114 switches the authentication algorithm to use from the first authentication algorithm to the second authentication algorithm. More specifically, when the change request is received from the user terminal 20a, the algorithm switch unit 114 first stops using the first authentication algorithm, and then changes the setting to use the second authentication algorithm.

Alternatively, the algorithm switch unit 114 may switch, at the time of the unlocking request, the authentication algorithm to use from the first authentication algorithm to the second authentication algorithm, when the information generated on the basis of the second authentication algorithm is received from the user terminal 20 for example.

Here, the first authentication algorithm takes a short time for processing, but is an algorithm having the risk of being unable to maintain the confidentiality of the key if the calculation functionality is improved significantly. For example, the first authentication algorithm is RSA, DSA, or ECDSA. Also, the second authentication algorithm takes a long time for processing, but is an algorithm having a large possibility of being able to maintain the confidentiality of the key even if the calculation functionality is improved significantly. For example, the second authentication algorithm is an algorithm considered to have the resistance to the quantum computer. As one example, the second authentication algorithm is the MQ authentication method, the lattice cryptosystem based authentication method, or the cipher based authentication method utilizing cedes. Note that whether or not to change from the first authentication algorithm to the second authentication algorithm is determined by the owner 2a on the basis of the current calculation functionality and the technology trend, for example.

Note that, in the following, an example in which the first authentication algorithm is the RSA algorithm, and the second authentication algorithm is the MQ algorithm will be described mainly.

(2-3-1-3. Key Information Verifying Unit 102)

When the use of the RSA algorithm is stopped by the algorithm switch unit 114, the key information verifying unit 102 according to the second embodiment determines the rightfulness of the eKey received from the user terminal 20, on the basis of the MQ algorithm.

eKey

Figure 22:
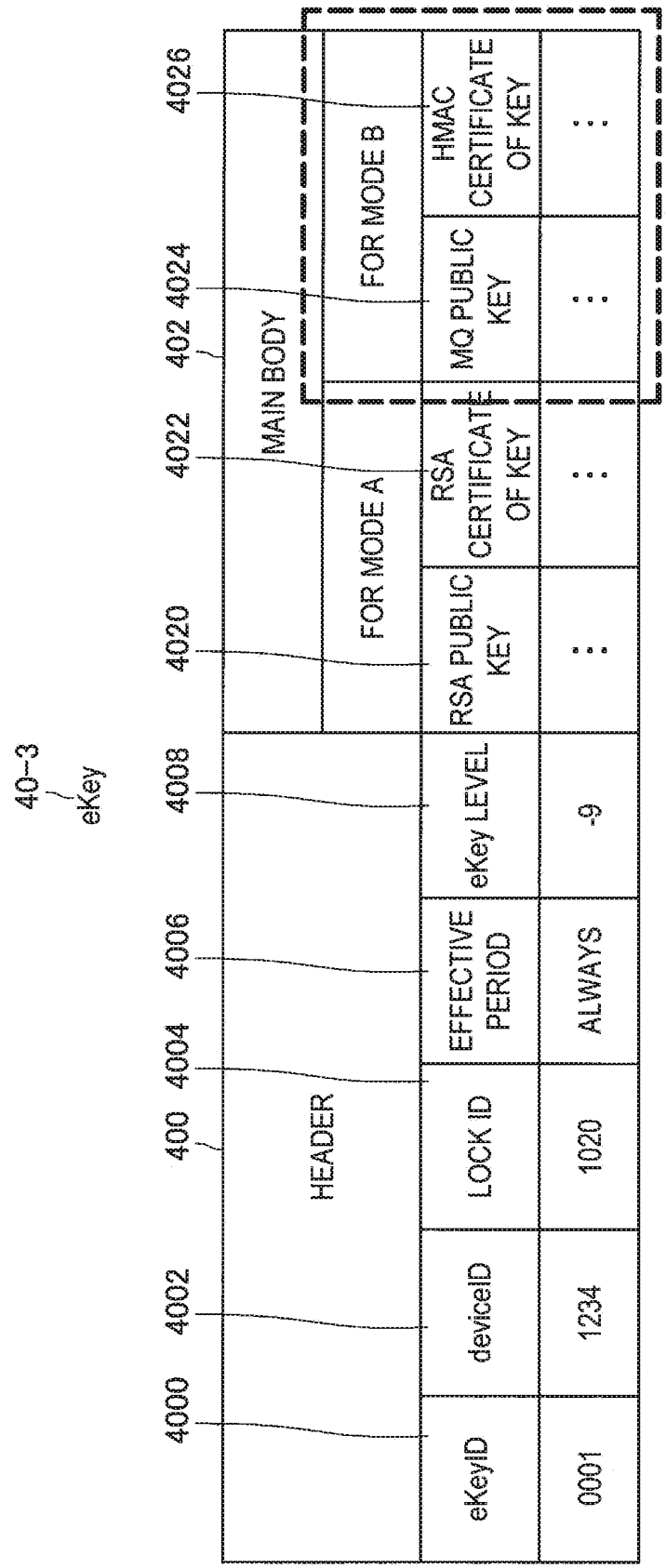
FIG. 22 is an explanatory diagram illustrating an exemplary configuration of an eKey according to the same embodiment.

Here, an exemplary configuration of the eKey (eKey 40-3) according to the second embodiment will be described with reference to FIG. 22. As illustrated in FIG. 22, the eKey 40-3 further includes the MQ public key 4024 and the HMAC certificate 4026 of the key, as compared with the eKey 40-2 (according to the application example of the first embodiment) illustrated in FIG. 19. Here, the MQ public key of the user terminal 20 to which the eKey 40-3 is issued is recorded in the MQ public key 4024. Also, the signature information using the HMAC key of the user terminal 20a of the owner 2a, for the MQ public key of the user terminal 20, is recorded in the HMAC certificate 4026 of the key.

(2-3-1-4. Verification Processing Unit 104)

When the use of the RSA algorithm is stopped by the algorithm switch unit 114, the verification processing unit 104 according to the second embodiment verifies, by the MQ algorithm, the information generated on the basis of the MQ secret key of the user terminal 20, which is received from the user terminal 20.

(2-3-1-5. Storage Unit 134)

The storage unit 134 according to the second embodiment stores authentication software based on the RSA algorithm and authentication software based on the MQ algorithm.

Note that other components included in the lock control device 10-2 are substantially same as the first embodiment.

(2-3-2. User Terminal 20)

Next, the configuration of the user terminal 20 according to the second embodiment will be described.

(2-3-2-1. Cipher Generating Unit 202)

When instruction information to change from the RSA algorithm to the MQ algorithm is received from the server 30, the cipher generating unit 202 according to the second embodiment generates the information on the basis of the random number received from the lock control device 10-1 and the MQ secret key, after the reception.

(2-3-2-2. Transmission Control Unit 206)

When the user terminal 20 is the user terminal 20 of the owner 2a for example, the transmission control unit 206 according to the second embodiment causes the communication unit 220 to transmit to the server 30 a change request from the RSA algorithm to the MQ algorithm, on the basis of the input of the user 2 into the operation display unit 222.

Note that other components included in the user terminal 20 are substantially same as the first embodiment.

(2-3-3. Server 30)

Next, the configuration of the server 30 according to the second embodiment will be described.

(2-3-3-1. Verification Processing Unit 308)

When the change request from the RSA algorithm to the MQ algorithm is received from the user terminal 20, the verification processing unit 308 according to the second embodiment verifies, by the MQ algorithm, the information generated on the basis of the MQ secret key of the user terminal 20, which is received from the user terminal 20, after the reception.

(2-3-3-4. Transmission Control Unit 304)

When the change request from the RSA algorithm to the MQ algorithm is received from the user terminal 20a, the transmission control unit 304 according to the second embodiment causes the communication unit 320 to transmit instruction information to change from the RSA algorithm to the MQ algorithm to another user terminal 20b.

(2-3-3-5. Storage Unit 322)

The storage unit 322 according to the second embodiment stores authentication software based on the RSA algorithm and authentication software based on the MQ algorithm.

Note that other components included in the server 30 are substantially same as the first embodiment.

2-4. Operation

In the above, the configuration according to the second embodiment has been described. Next, the operation according to the second embodiment will be described in the following order with reference to FIGS. 23 to 30. Note that other types of operations are same as the first embodiment, and therefore their description will be omitted.

1. Operation when registering a key into the lock control device 10-2
2. Operation of an MQ response data verifying process
3. Operation when verifying the key of the owner 2a
4. Operation when requesting the change of algorithm
5. Operation when authenticating an account by the server 30

Note that, unless expressly stated otherwise, FIGS. 23 to 30 illustrates an example in which the user terminal 20a is the user terminal 20 of the owner 2a, and the user terminal 20b is the user terminal 20 of the guest 2b.

(2-4-1. Operation when Registering Key into Lock Control Device 10-2)

Figure 23:
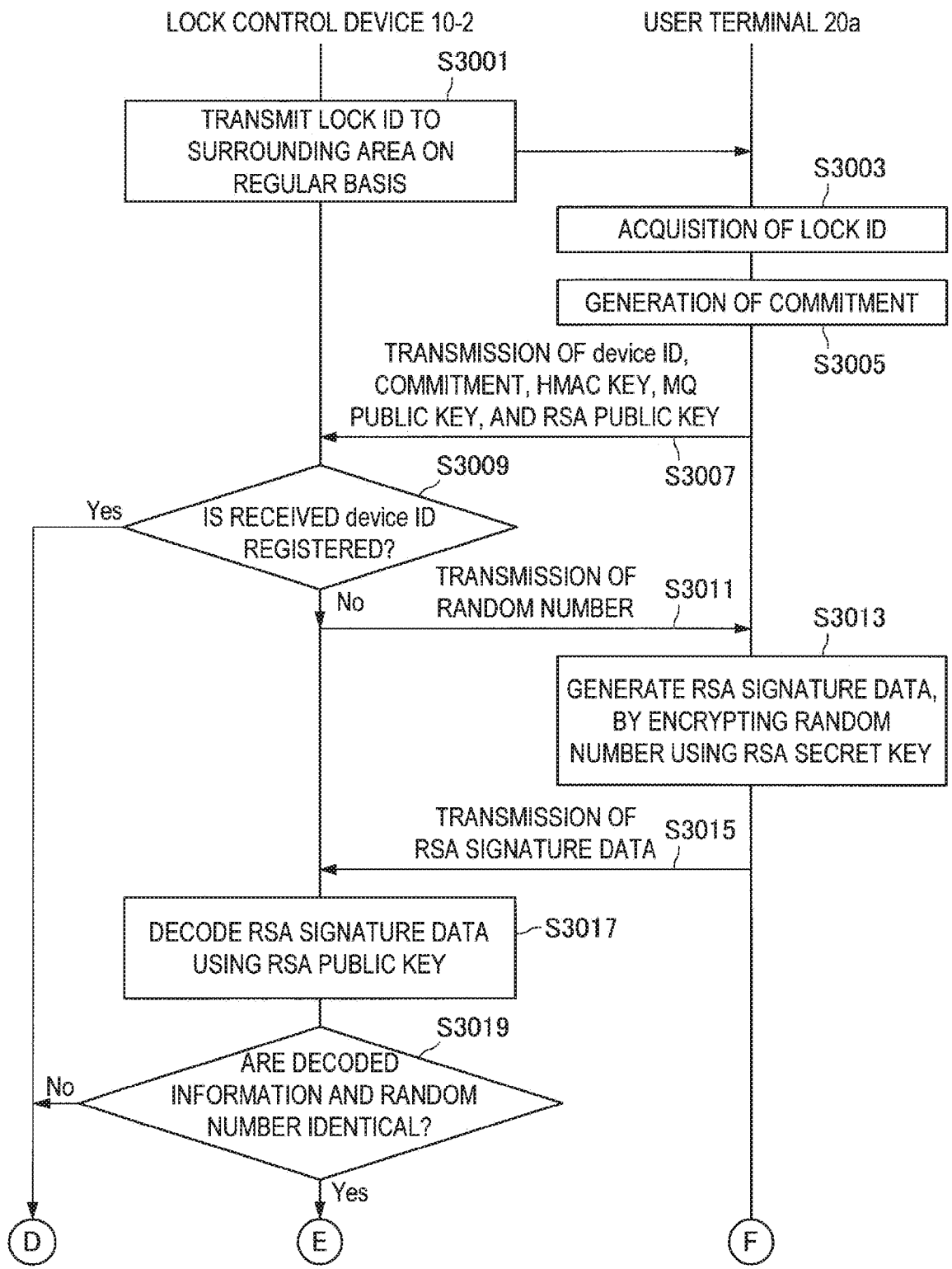
FIG. 23 is a sequence diagram illustrating a part of an operation when registering a key into a lock control device 10-2 according to the same embodiment.

FIG. 23 is a sequence diagram illustrating a part of the operation when registering the key into the lock control device 10-2, according to the second embodiment. Note that this operation is an alternative operation to the operation according to the first embodiment (illustrated in FIG. 6). Also, here, an exemplary operation when initially registering information such as the device ID of the user terminal 20a of the owner 2a and two types of public keys (i.e., the RSA public key and the MQ public key), into the lock control device 10-2 managed by the owner 2a will be described. Also, this operation is basically performed only once by the owner 2a who manages the lock control device 10-2 with regard to each lock control device 10-2.

Note that the operation of S3001 to S3003 illustrated in FIG. 23 is same as S1001 to S1003 illustrated in FIG. 6.

After S3003, the cipher generating unit 202 of the user terminal 20a generates a commitment on the basis of the MQ algorithm, (S3005).

Subsequently, the transmission control unit 206 causes the communication unit 220 to transmit to the lock control device 10-2 the device ID of the user terminal 20a, the commitment generated in S3005, the HMAC key of the user terminal 20a, the MQ public key of the user terminal 20a, and the RSA public key of the user terminal 20a (S3007).

Note that the operation of S3009 to S3017 illustrated in FIG. 23 is substantially same as S1007 to S1015 illustrated in FIG. 6.

After S3017, the determination unit 106 of the lock control device 10-2 compares the information decoded in S3017 and the random number generated in S3011 (S3019). When the both are not identical with each other (S3019: No), the determination unit 106 performs the operation of S3045 described later.

Here, the operation when the both are identical with each other in S3019 (S3019: Yes) will be described with reference to FIG. 24.

Figure 24:
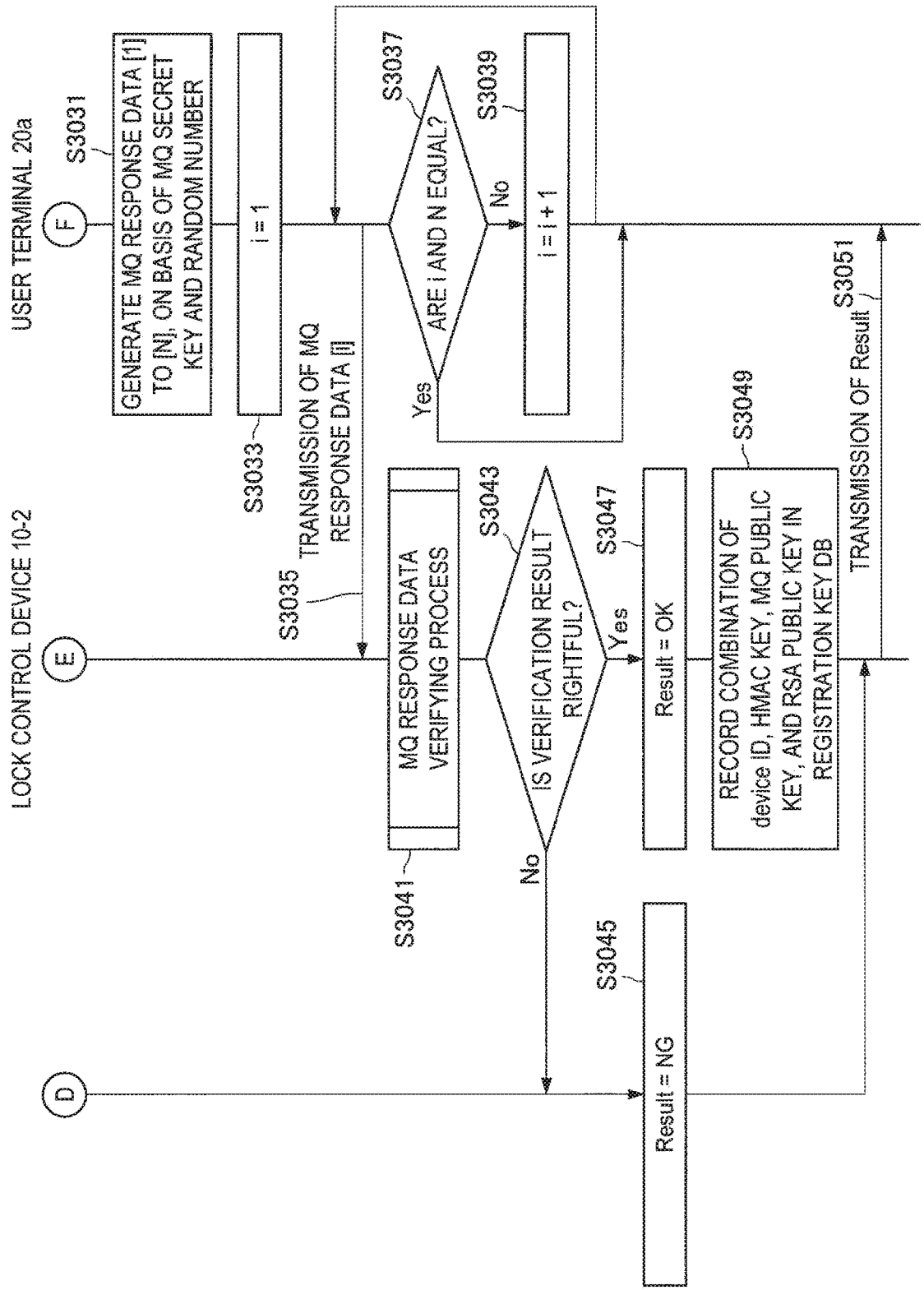
FIG. 24 is a sequence diagram illustrating a part of an operation when registering a key into a lock control device 10-2 according to the same embodiment.

As illustrated in FIG. 24, first, the cipher generating unit 202 of the user terminal 20a generates N pieces of MQ response data [i] (i=1 to N) for example, on the basis of the random number received in S3011 and the MQ secret key of the user terminal 20a (S3031). Note that, here, an example in which the cipher generating unit 202 generates data divided into N pieces, due to a reason such as large data size of the MQ response data for example, will be described. Note that the cipher generating unit 202 is not limited to such an example, but may generate only one piece of the MQ response data.

Subsequently, the transmission control unit 206 causes the communication unit 220 to transmit (S3033 to S3039) N pieces of the MQ response data [i] (i=1 to N) generated in S3031, to the lock control device 10-2.

Thereafter, the lock control device 10-2 executes the "MQ response data verifying process" described later, (S3041).

Thereafter, if it is verified that the MQ response data is not rightful (S3043: No), the determination unit 106 sets "NG" to Result (=registration result) (S3045). Thereafter, the lock control device 10-2 performs the operation of S3051 described later.

On the other hand, if it is verified that the MQ response data is rightful (S3043: Yes), the determination unit 106 sets "OK" to the Result, (S3047). Then, the determination unit 106 records the device ID, the HMAC key, the MQ public key, and the RSA public key received in S3007 in association with each other, in the registration key DB 136 (S3049).

Thereafter, the transmission control unit 112 causes the communication unit 130 to transmit the Result set in S3045 or S3047 to the user terminal 20a (S3051).

(2-4-2. Operation of MQ Response Data Verifying Process)

Next, with reference to FIG. 25, the "operation of the MQ response data verifying process" in S3041 will be described in detail.

Figure 25:
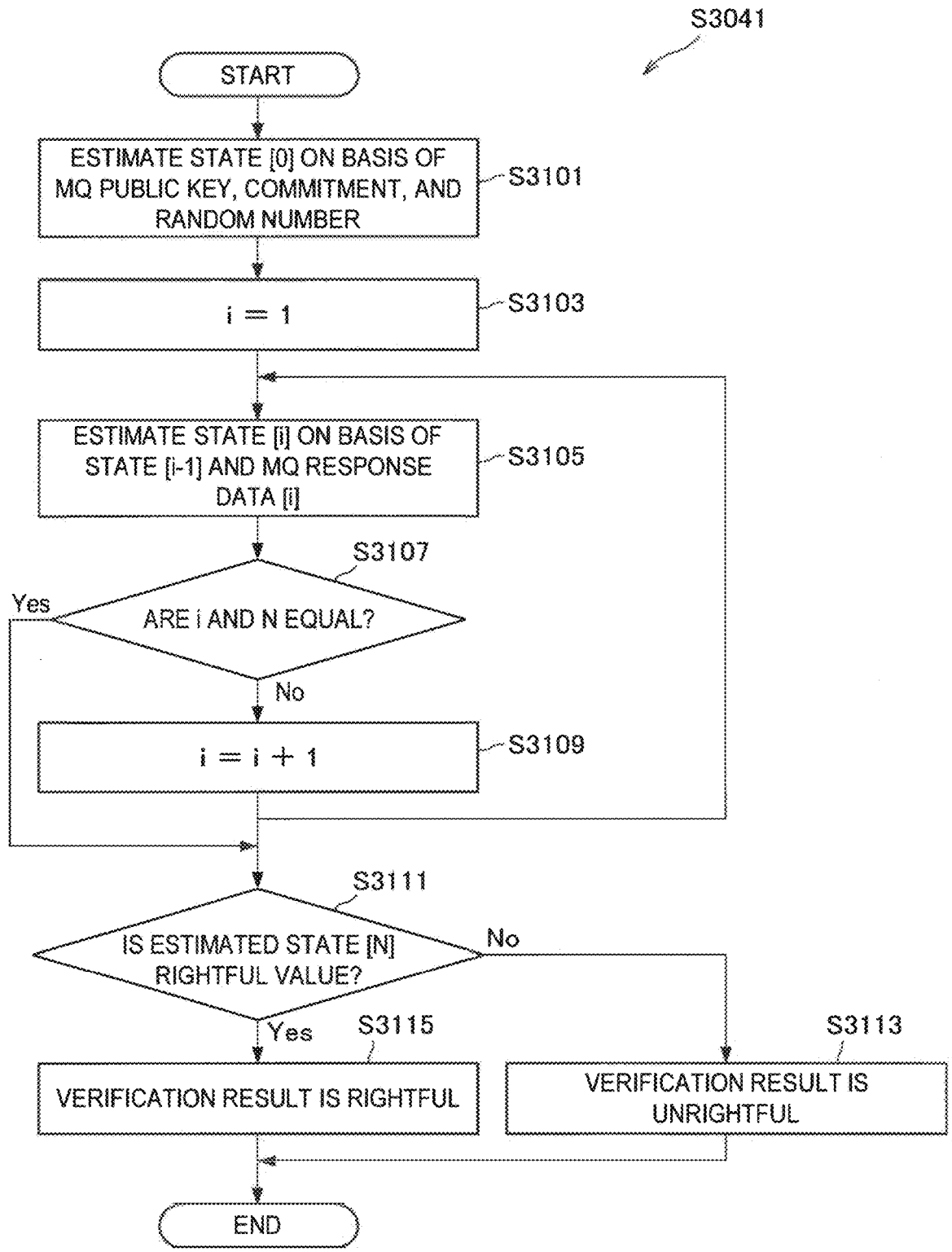
FIG. 25 is a flowchart illustrating an operation of an MQ response data verifying process according to the same embodiment.

As illustrated in FIG. 25, first, the verification processing unit 104 of the lock control device 10-2 estimates State [0] by the MQ algorithm, on the basis of the MQ public key and the commitment received in S3007 illustrated in FIG. 23, and the random number generated in S3011 illustrated in FIG. 23 (S3101).

Thereafter, the verification processing unit 104 repeats estimating State [i] by the MQ algorithm, from i=1 to i=N, on the basis of the estimated State [i−1] and the MQ response data [i] received in S3035 (S3103 to S3109).

Thereafter, the determination unit 106 verifies whether or not the estimated State [N] is a rightful value (S3111). If the State [N] is not a rightful value (S3111: No), the determination unit 106 determines that the MQ response data received from the user terminal 20a is not rightful (S3113).

On the other hand, if the State [N] is a rightful value (S3111: Yes), the determination unit 106 determines that the received MQ response data is rightful (S3115).

(2-4-3. Operation when Verifying Key of Owner 2a)

Next, the operation when verifying the key of the owner 2a according to the second embodiment will be described. Note that, this operation is an alternative operation to the operation according to the first embodiment (illustrated in FIG. 7). Also, this operation includes two types of operations, which are the verification operation using the RSA algorithm and the verification operation using the MQ algorithm, and these two types of operations are executed consecutively, for example. Of these, the verification operation using the RSA algorithm is same as the operation according to the first embodiment, and therefore the description will be omitted. In the following, the verification operation using the MQ algorithm will be described with reference to FIG. 26.

Figure 26:
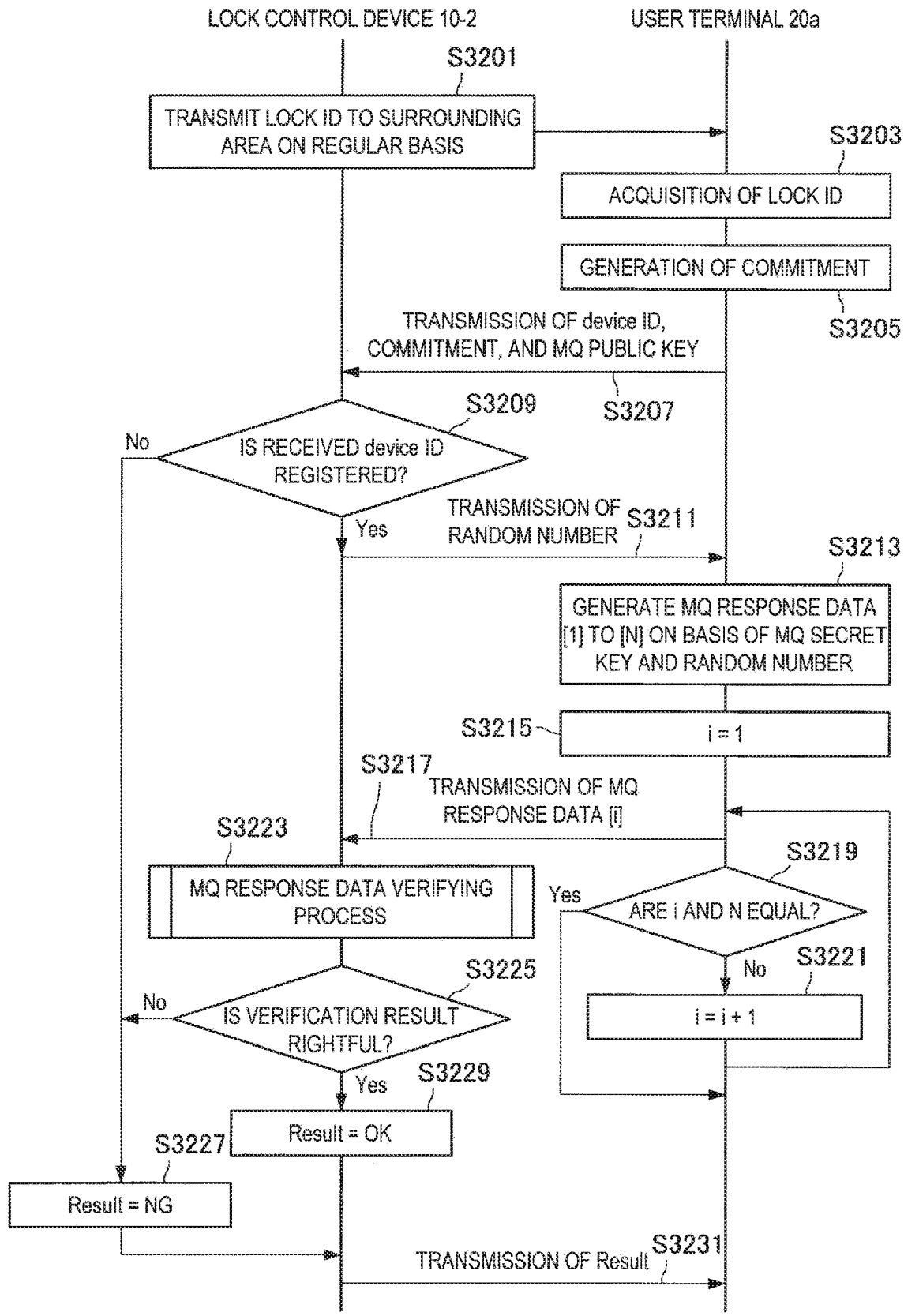
FIG. 26 is a sequence diagram illustrating an operation when verifying a key of an owner 2a according to the same embodiment.

Note that the operation of S3201 to S3203 illustrated in FIG. 26 is same as S1101 to S1103 illustrated in FIG. 7. Also, the operation of S3205 is same as S3005 illustrated in FIG. 23.

After S3205, the transmission control unit 206 of the user terminal 20a causes the communication unit 220 to transmit to the lock control device 10-2 the device ID of the user terminal 20a, the commitment generated in S3205, and the MQ public key of the user terminal 20a (S3207).

Note that the operation of S3209 to S3211 is same as S1107 to S1109 illustrated in FIG. 7. Also, the operation of S3213 to S3223 is same as S3031 to S3041 illustrated in FIG. 24.

After S3223, if it is verified that the MQ response data is not rightful (S3225: No), the determination unit 106 of the lock control device 10-2 sets "NG" to Result (=verification result) (S3227). Thereafter, the lock control device 10-2 performs the operation of S3231 described later.

On the other hand, if it is verified that the MQ response data is rightful (S3225: Yes), the determination unit 106 sets "OK" to the Result (S3229).

Thereafter, the transmission control unit 112 causes the communication unit 130 to transmit the Result set in S3227 or S3229 to the user terminal 20a (S3231).

(2-4-4. Operation when Requesting Change of Algorithm)

Next, with reference to FIG. 27, the operation when requesting the change of algorithm according to the second embodiment will be described. Note that this operation is the operation performed when the owner 2a wishes to change the authentication algorithm used by the lock control device 10-2 from the RSA algorithm to the MQ algorithm, for example.

Figure 27:
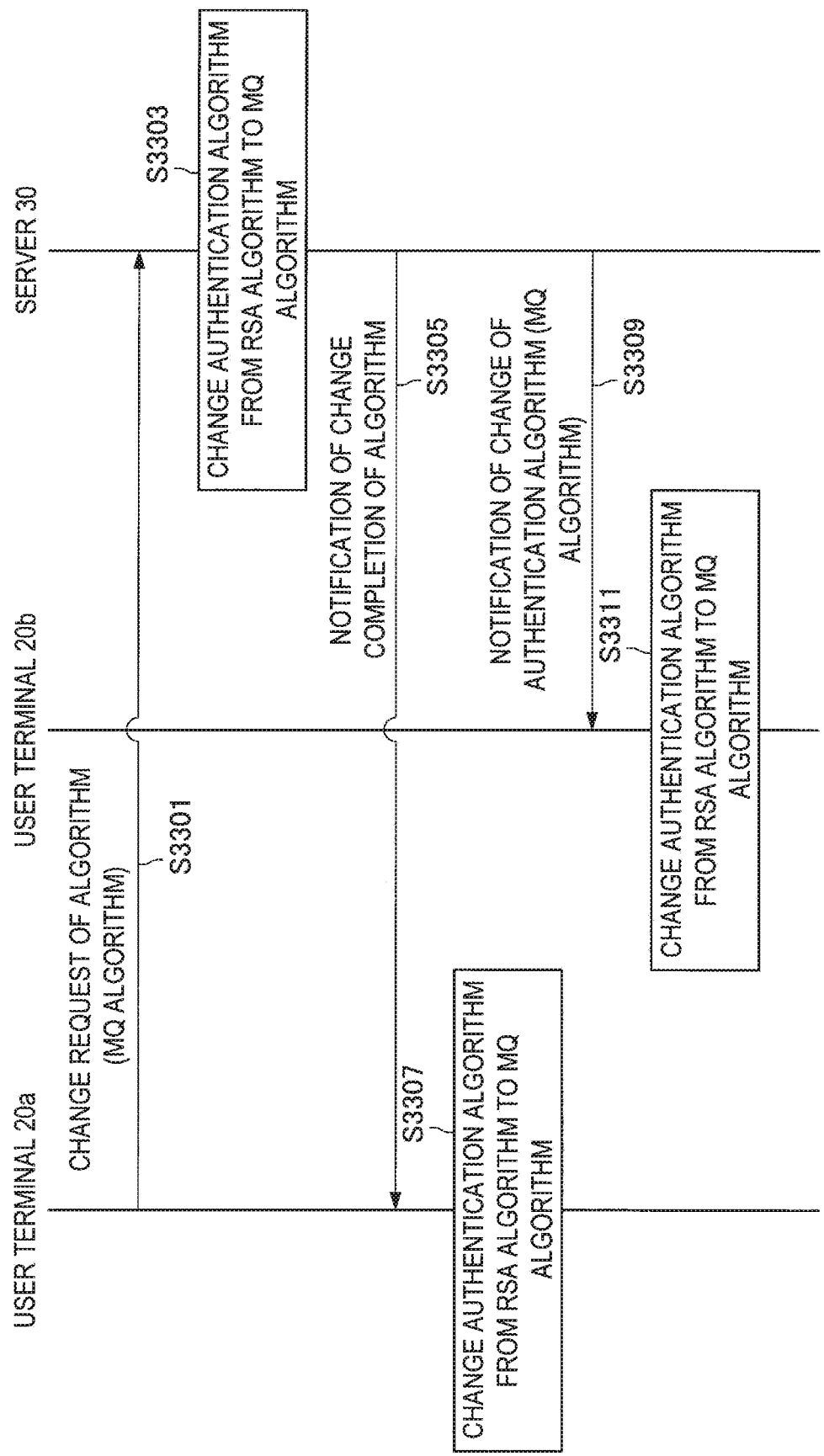
FIG. 27 is a sequence diagram illustrating an operation when requesting a change of an algorithm according to the same embodiment.

As illustrated in FIG. 27, first, the user terminal 20a logs in to the key authentication service. Then, the transmission control unit 206 of the user terminal 20a causes the communication unit 220 to transmit to the server 30 the change request to the MQ algorithm, on the basis of the input of the user into the operation display unit 222, for example, (S3301).

Thereafter, the control unit 300 of the server 30 changes the setting of the authentication algorithm to use, which is recorded in the storage unit 322 (or the database 32), from the RSA algorithm to the MQ algorithm, and updates the recorded content (S3303). Here, the control unit 300 may change the authentication algorithm to use, from the RSA algorithm to the MQ algorithm, with respect to all eKey Groups that have been registered. Alternatively, the control unit 300 may change the authentication algorithm to use, from the RSA algorithm to the MQ algorithm, only with respect to the eKey Group specified in the change request received in S3301.

Subsequently, the transmission control unit 304 causes the communication unit 320 to transmit to the user terminal 20a a notification of the change completion of the authentication algorithm (S3305).

Thereafter, the control unit 200 of the user terminal 20a changes the setting of the authentication algorithm to use, which is recorded in the storage unit 224, from the RSA algorithm to the MQ algorithm, and updates the recorded content of the storage unit 224 (S3307).

Also, the transmission control unit 304 of the server 30 causes the communication unit 320 to transmit to another user terminal 20b an instruction information to change from the RSA algorithm to the MQ algorithm (S3309).

Thereafter, in the same way as S3307, the control unit 200 of the user terminal 20b changes the setting of the authentication algorithm to use, from the RSA algorithm to the MQ algorithm, and updates the recorded content of the storage unit 224 (S3311).

(2-4-5. Operation when Authenticating Account by Server 30)

Next, the operation when authenticating an account by the server 30 according to the second embodiment will be described. Note that this operation is an alternative operation to the operation according to the first embodiment (illustrated in FIG. 10). Also, this operation includes two types of operations, which are the authentication operation using the RSA algorithm, and the authentication operation using the MQ algorithm. For example, the server 30 performs the authentication operation using the RSA algorithm before the change request of the algorithm, which is described in section 2-4-4, is received from the user terminal 20a, and performs the authentication operation using the MQ algorithm after the change request of the algorithm is received. Note that the authentication operation using the RSA algorithm is same as the authentication operation according to the first embodiment, and therefore the description will be omitted. In the following, the authentication operation using the MQ algorithm will be described with reference to FIG. 28.

Figure 28:
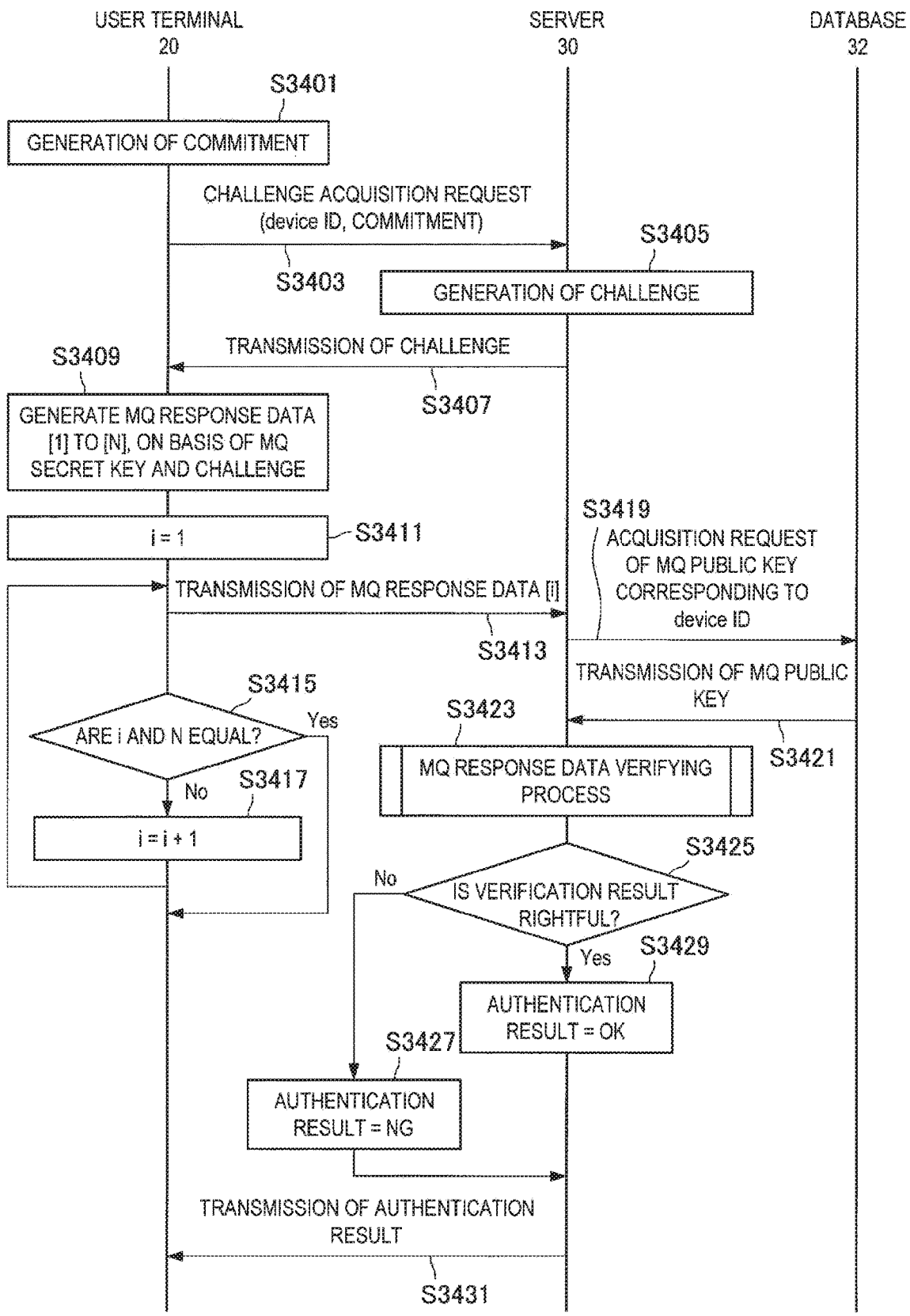
FIG. 28 is a sequence diagram illustrating an operation when authenticating an account by a server 30 according to the same embodiment.

As illustrated in FIG. 28, first, the cipher generating unit 202 of the user terminal 20 generates a commitment on the basis of the MQ algorithm (S3401).

Subsequently, the transmission control unit 206 causes the communication unit 220 to transmit to the server 30 a challenge acquisition request including the device ID of the user terminal 20 and the commitment generated in S3401 (S3403).

Note that the operation of S3405 to S3407 is same as S1403 to S1405 illustrated in FIG. 10.

Thereafter, the cipher generating unit 202 of the user terminal 20 generates N pieces of the MQ response data [i] (i=1 to N) for example, on the basis of the challenge received in S3407, and the MQ secret key of the user terminal 20 (S3409).

Subsequently, the transmission control unit 206 causes the communication unit 220 to transmit N pieces of the MQ response data [i] (i=1 to N) generated in S3409 to the server 30 (S3409 to S3417).

Thereafter, the transmission control unit 304 of the server 30 causes the communication unit 320 to transmit to the database 32 a request to acquire the MQ public key of the user terminal 20 (S3419).

Thereafter, the database 32 extracts the MQ public key corresponding to the device ID included in the acquisition request received in S3419, and then transmits the extracted MQ public key to the server 30 (S3421).

Thereafter, the server 30 performs the "MQ response data verifying process" (S3423). Note that this "MQ response data verifying process" is different from the operation illustrated in FIG. 25 in that the operation executor is the server 30 instead of the lock control device 10-2, but other configuration is substantially same.

In S3423, if it is verified that the MQ response data is not rightful (S3425: No), the control unit 300 of the server 30 sets "NG" to Result (=authentication result), and then does not authenticate the user terminal 20 (S3427). Thereafter, the server 30 performs the operation of S3431 described later.

On the other hand, if it is verified that the MQ response data is rightful (S3425: Yes), the control unit 300 sets "OK" to the Result, and then authenticates the user terminal 20 (S3429).

Thereafter, the transmission control unit 304 causes the communication unit 130 to transmit the Result set in S3427 or S3429 to the user terminal 20 (S3431).

(2-4-6. Operation of Unlocking Process)

Next, the "operation of the unlocking process" according to the second embodiment will be described. Note that this operation is an alternative operation to the operation according to the first embodiment (illustrated in FIGS. 15 and 16). Also, this operation includes two types of operations, which are the unlocking process using the RSA algorithm and the unlocking process using the MQ algorithm. For example, the unlocking process using the RSA algorithm is executed when the lock control device 10-2 uses the RSA algorithm as the authentication algorithm, and the unlocking process using the MQ algorithm is executed when the lock control device 10-2 uses the MQ algorithm as the authentication algorithm. Of these, the unlocking process using the RSA algorithm is same as the operation according to the first embodiment, and therefore the description will be omitted. In the following, the unlocking process using the MQ algorithm will be described with reference to FIGS. 29 to 30.

Figure 29:
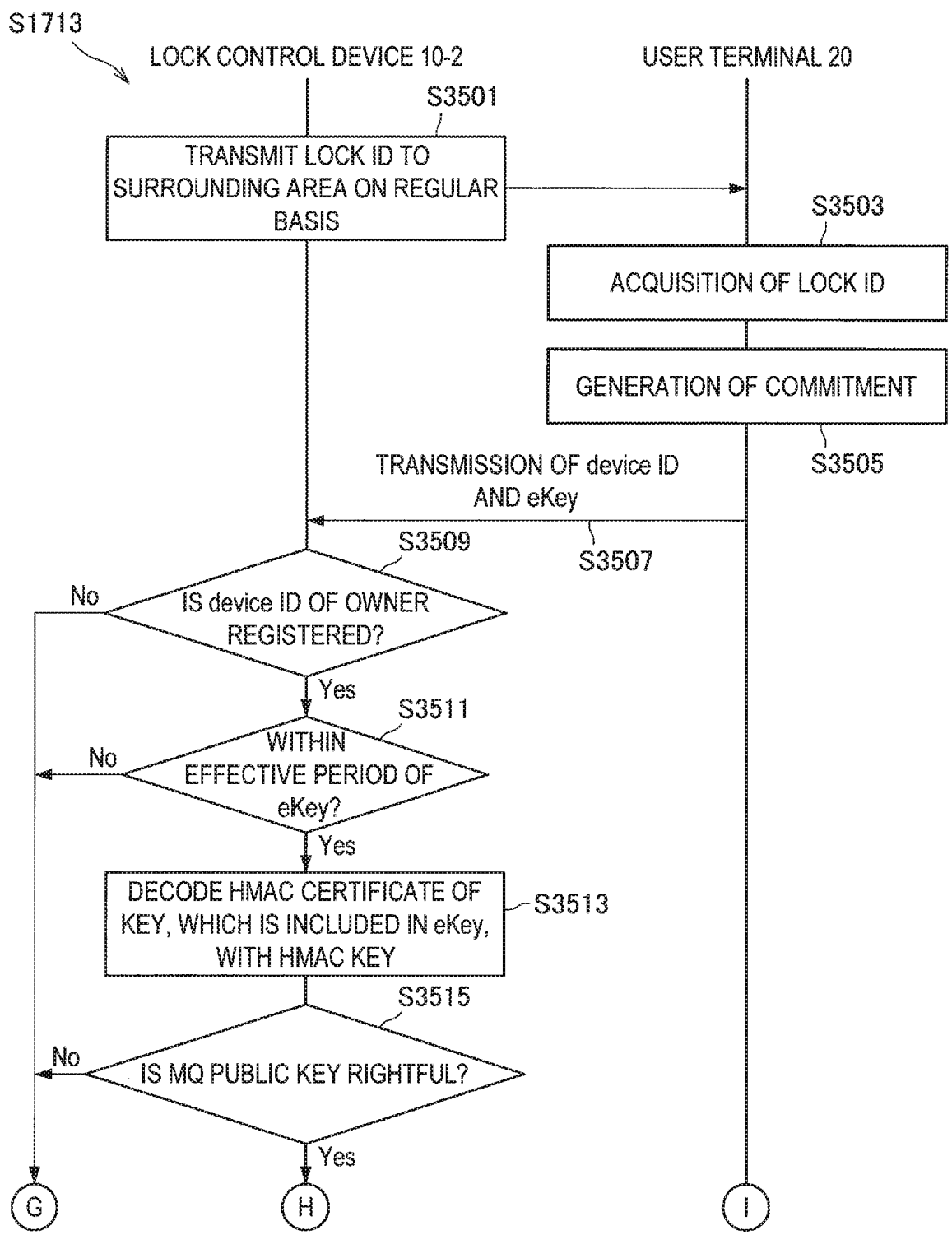
FIG. 29 is a sequence diagram illustrating a part of an operation of an unlocking process according to the same embodiment.

Note that the operation of S3501 to S3503 illustrated in FIG. 29 is same as the operation of S1801 to S1803 illustrated in FIG. 15. Also, the operation of S3505 is substantially same as S3205 illustrated in FIG. 26. Also, the operation of S3507 to S3511 is same as S1805 to S1809 illustrated in FIG. 15.

In S3511, if it is confirmed that the eKey received in S3507 is within the effective period (S3511: Yes), the verification processing unit 104 of the lock control device 10-2 decodes the HMAC certificate of the MQ public key of the user 2, which is included in the eKey, using the HMAC key of the user terminal 20a of the owner 2a, which is recorded in the registration key DB 136 (S3513).

Then, the determination unit 106 determines whether or not the MQ public key of the user 2 is rightful, on the basis of the certificate decoded in S3513 (S3515). If it is determined that the MQ public key of the user 2 is not rightful (S3515: No), the lock control device 10-2 performs the operation of S3535 described later.

Here, the operation when it is determined that the MQ public key of the user 2 is rightful in S3515 (S3515: Yes) will be described with reference to FIG. 30.

Figure 30:
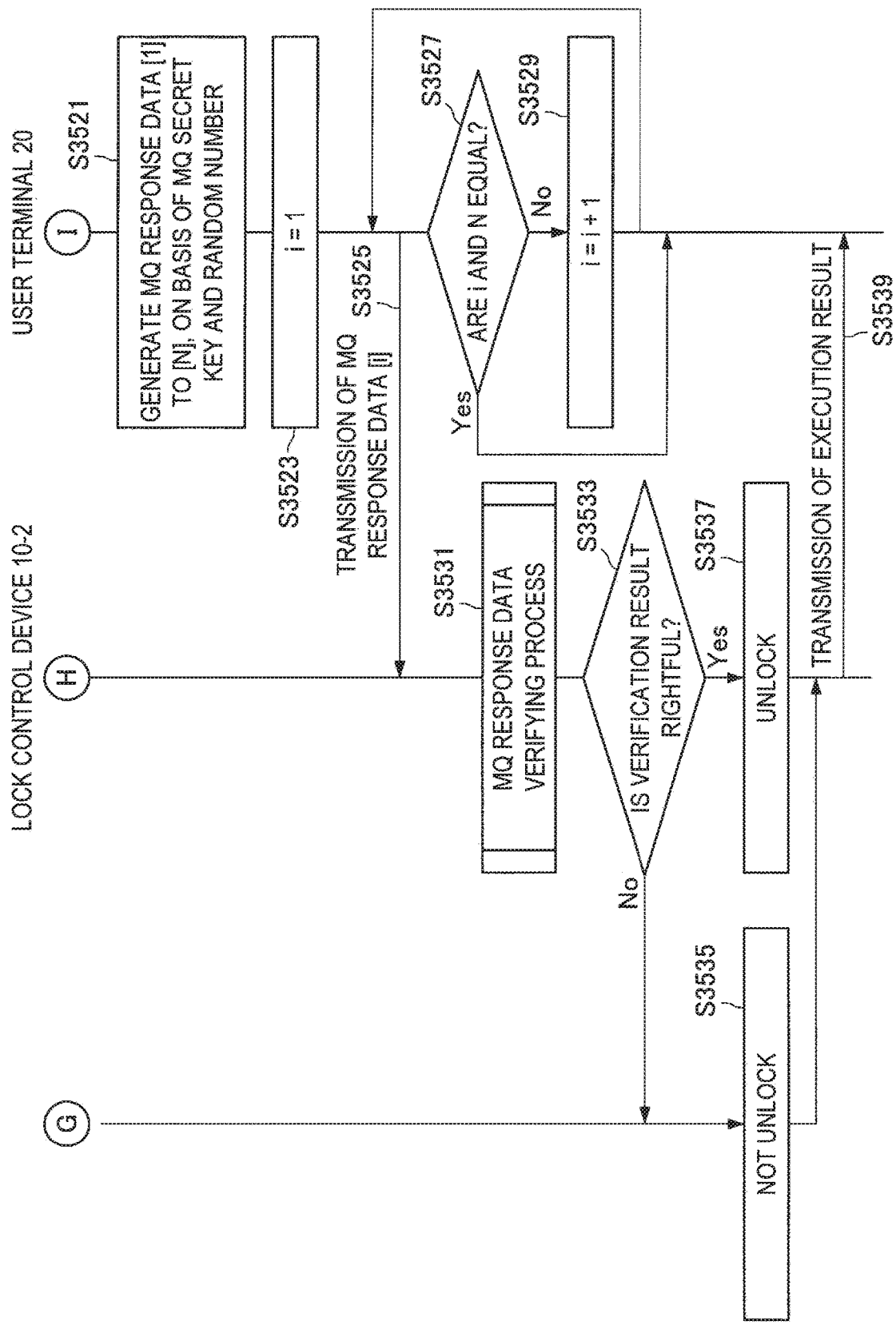
FIG. 30 is a sequence diagram illustrating a part of an operation of an unlocking process according to the same embodiment.

Note that the operation of S3521 to S3531 illustrated in FIG. 30 is substantially same as S3031 to S3041 illustrated in FIG. 24.

After S3531, if it is verified that the MQ response data is not rightful (S3533: No), the determination unit 106 of the lock control device 10-2 decides not to unlock (S3535). Thereafter, the lock control device 10-1 performs the operation of S3539 described later.

On the other hand, if it is verified that the MQ response data is rightful (S3533: Yes), the determination unit 106 decides to unlock. Then, the locking control unit 108 causes the locking unit 132 to unlock (S3537).

Thereafter, the transmission control unit 112 causes the communication unit 130 to transmit the execution result of S3535 or S3537 to the user terminal 20 (S3539).

2-5. Effect (2-5-1. Effect 1)

As described with reference to FIGS. 21 to 30 in the above, the lock control device 10-2 and the server 30 according to the second embodiment implement two types of authentication algorithms such as the RSA algorithm and the MQ algorithm, and use the RSA algorithm as the authentication algorithm in an initial state. In the present circumstances, the confidentiality of the key is secured sufficiently by the RSA algorithm, and therefore the authentication is performed safely. Also, the authentication process is executed in a shorter time, as compared with the MQ algorithm, for example.

(2-5-2. Effect 2)

Also, when the change request of the authentication algorithm is received from the user terminal 20a of the owner 2a, the lock control device 10-2 and the server 30 switch the authentication algorithm to use, from the RSA algorithm to the MQ algorithm.

Hence,

Even if the RSA algorithm becomes unable to maintain the confidentiality of the key, due to the reason such as dramatic progress of calculation functionality in future, The lock control device 10-2 authenticates the user terminal 20 using the MQ algorithm, in order to prevent being unlocked by the third person who does not have the rightful authority. That is, according to the second embodiment, the effect of making the lifetime of the key longer than the first embodiment is obtained.

3. Third Embodiment 3-1. Background

In the above, the second embodiment has been described. Next, the third embodiment will be described. First, the background that has lead up to creating the third embodiment will be described.

The effective period is set to the eKey as described above, the date and time information managed in the lock control device 10-1 is to be correct, to correctly operate the eKey. However, there is a risk of the date and time information lagging as the usage of the lock control device 10-1 goes on, due to the restriction of the lock control device 10-1. Thus, the date and time information of the lock control device 10-1 is to be corrected occasionally.

In the meantime, if the date and time information of all user terminals 20 (having the unlocking right) is set in a correctable manner, there is a risk of being set at incorrect date and time by a malicious user 2. For example, there is a risk that the malicious user 2 manipulates the date and time information to incorrect date and time, to continue the use of the eKey whose effective period has expired.

As described later, the lock control device 10-3 according to the third embodiment is capable of limiting the user 2 having the authority to change the date and time information.

3-2. System Configuration

The system configuration according to the third embodiment is same as the first embodiment illustrated in FIG. 1 or FIG. 18.

3-3. Configuration (3-3-1. Lock Control Device 10-3)

Figure 31:
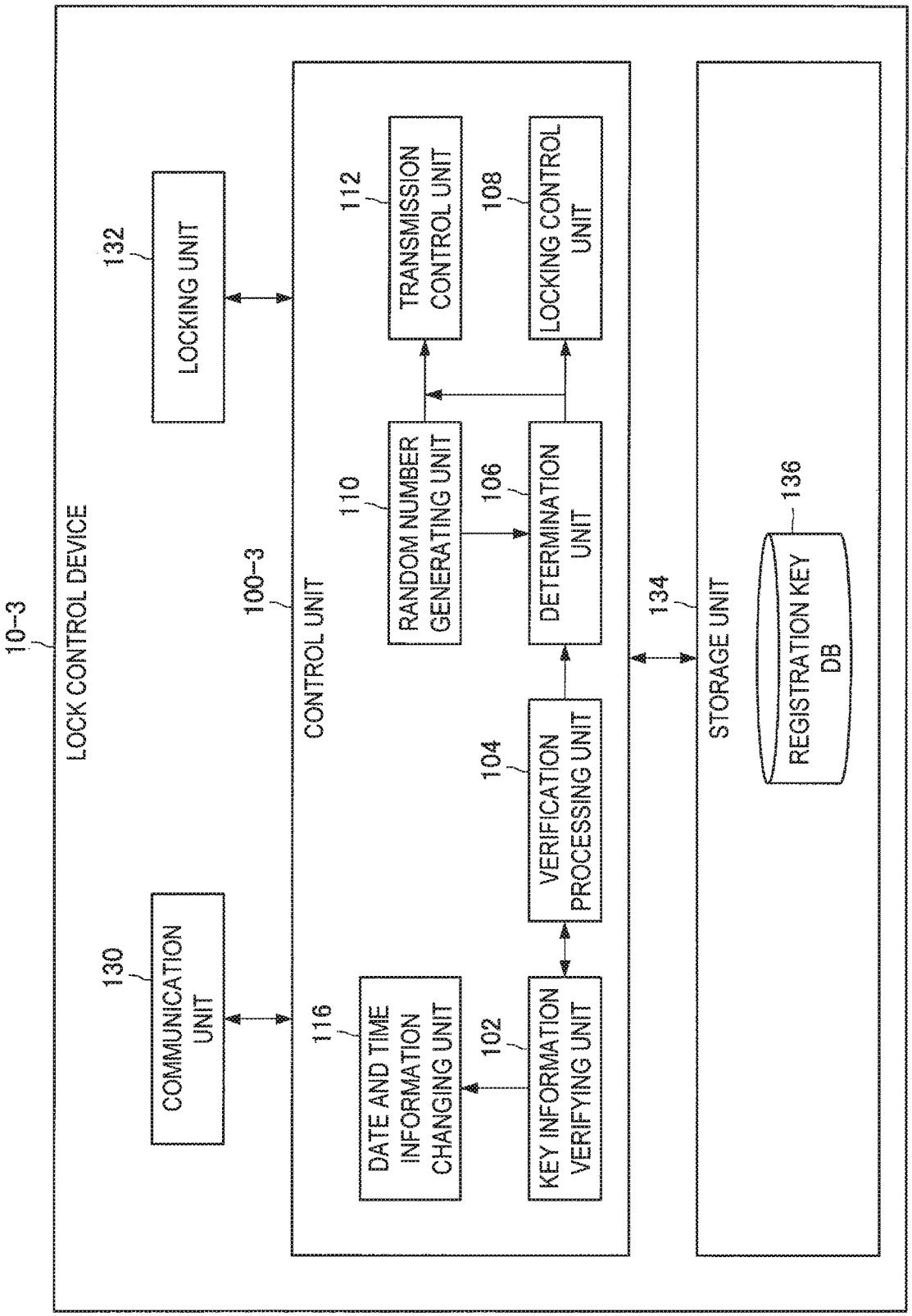
FIG. 31 is a functional block diagram illustrating an exemplary configuration of a lock control device 10-3 according to a third embodiment of the present disclosure.

Next, the configuration according to the third embodiment will be described in detail. FIG. 31 is a functional block diagram illustrating the configuration of the lock control device 10-3 according to the third embodiment. The lock control device 10-3 can have a movable lock interface that is removably coupleable external to, adjacent to, or over a movable component of the lock, such as a thumbturn, to unlock the lock. As illustrated in FIG. 31, the lock control device 10-3 includes a control unit 100-3, instead of the control unit 100-1, as compared with the lock control device 10-1 illustrated in FIG. 2.

(3-3-1-1. Control Unit 100-3)

The control unit 100-3 further includes a date and time information changing unit 116, as compared with the control unit 100-1 according to the first embodiment.

(3-3-1-2. Date and Time Information Changing Unit 116)

The date and time information changing unit 116 determines availability or unavailability of the change of the date and time information of the lock control device 10-3 by the user terminal 20, on the basis of a time synchronization availability flag included in the eKey received from the user terminal 20. For example, the date and time information changing unit 116 authorizes the change of the date and time information of the lock control device 10-3 by the user terminal 20, when the time synchronization availability flag included in the received eKey indicates "OK". Also, the date and time information changing unit 116 does not authorize the change of the date and time information of the lock control device 10-3 by the user terminal 20, when this time synchronization availability flag indicates "NG". Note that the value of the time synchronization availability flag may be set by the eKey issuing user 2 (the owner 2a or the vice owner 2c), when issuing the eKey for example. Alternatively, the value of the time synchronization availability flag may be set in a single uniform way, in such a manner that only the owner 2a is "OK", and other users 2b are "NG", for example.

eKey

Figure 32:
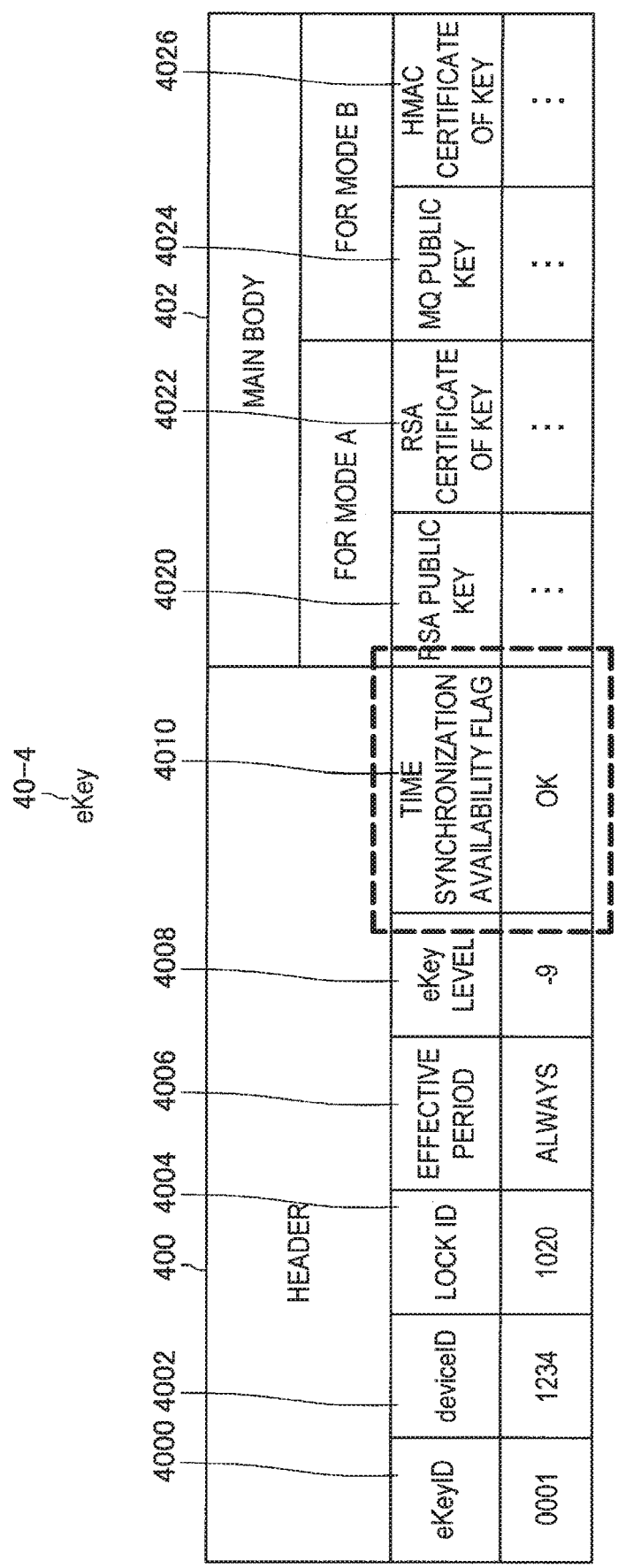
FIG. 32 is an explanatory diagram illustrating an exemplary configuration of an eKey according to the same embodiment.

Here, an exemplary configuration of the eKey (the eKey 40-4) according to the third embodiment will be described with reference to FIG. 32. As illustrated in FIG. 32, the eKey 40-4 further includes a time synchronization availability flag 4010, as compared with the eKey 40-3 (according to the second embodiment) illustrated in FIG. 22. Here, the value of the time synchronization availability flag set for the user terminal 20 to which the eKey 40-3 is issued is recorded in the time synchronization availability flag 4010.

Note that other components included in the lock control device 10-3 are substantially same as the first embodiment. Also, the configurations of the user terminal 20 and the server 30 are substantially same as the first embodiment.

3-4. Operation

In the above, the configuration according to the third embodiment has been described. Next, the operation according to the third embodiment will be described. Here, the "operation of the unlocking process" according to the third embodiment will be described. This operation is an alternative operation to the operation according to the first embodiment (illustrated in FIGS. 15 and 16). Note that other types of operations are same as the first embodiment illustrated in FIGS. 6 to 14 and FIG. 17, and therefore the description will be omitted.

(3-4-1. Operation of Unlocking Process)

Figure 33:
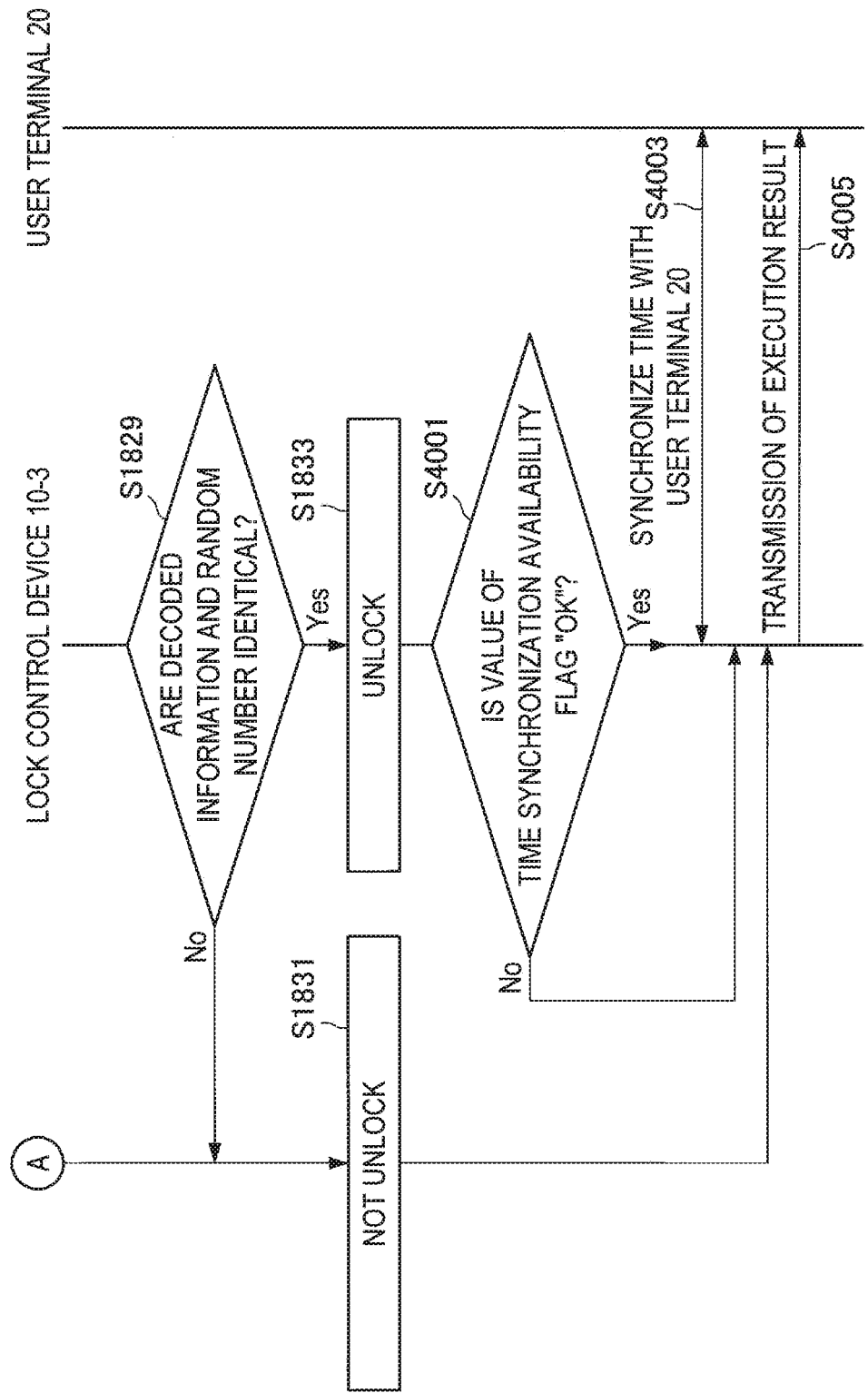
FIG. 33 is a sequence diagram illustrating a part of an operation of an unlocking process according to the same embodiment.

FIG. 33 is a sequence diagram illustrating a part of "operation of the unlocking process" according to the third embodiment. Note that the operation from S1801 to S1829 illustrated in FIGS. 15 to 16 is same as the first embodiment, and therefore the description is omitted partially in FIG. 33. In the following, only the operation after S1829 will be described.

Figure 16:
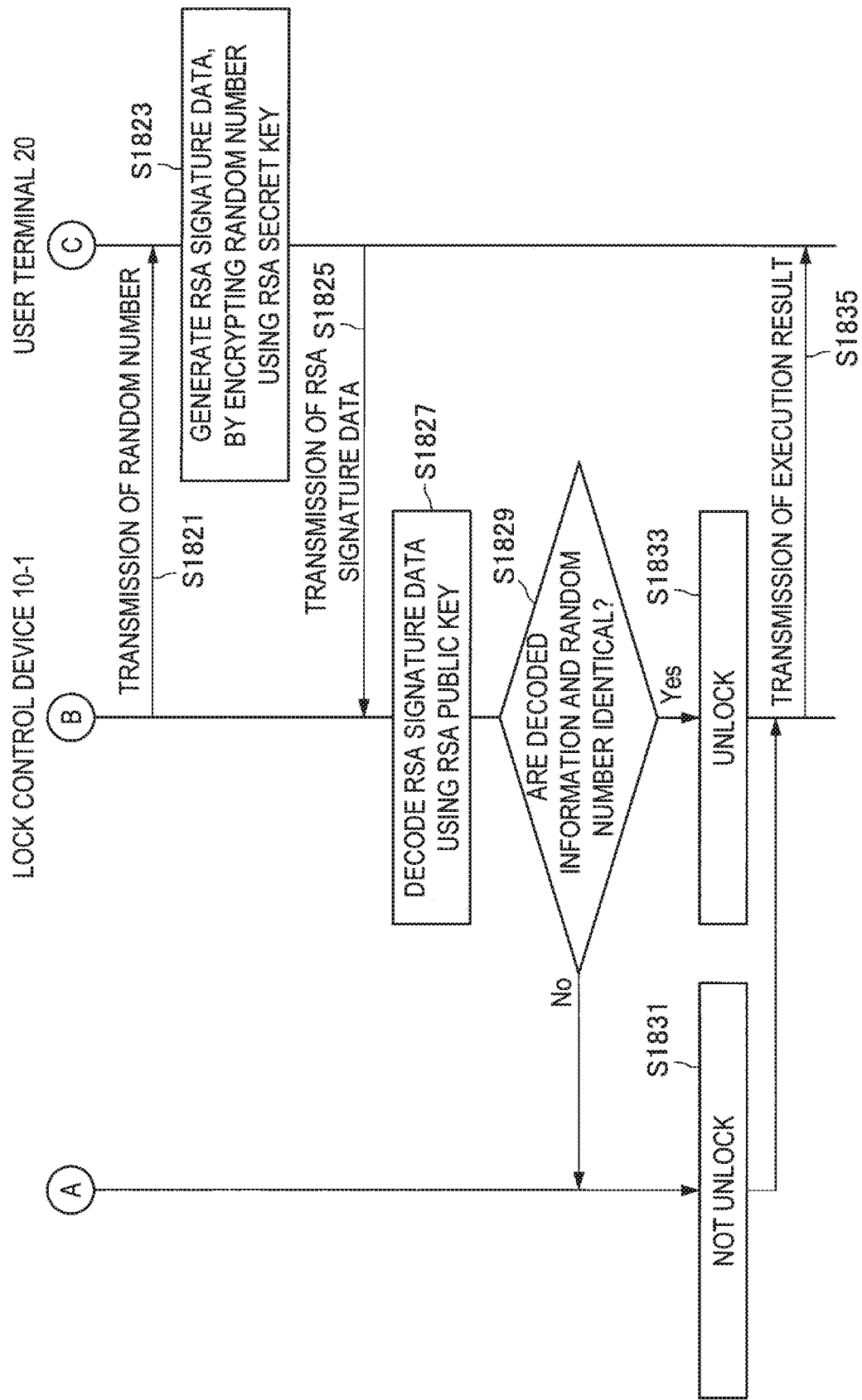
FIG. 16 is a sequence diagram illustrating a part of an operation of an unlocking process according to the same embodiment.

In S1829, if the information decoded in S1827 illustrated in FIG. 16 and the random number generated in S1821 illustrated in FIG. 16 are identical with each other (S1829: Yes), the determination unit 106 of the lock control device 10-3 decides to unlock. Then, the locking control unit 108 causes the locking unit 132 to unlock (S1833).

Subsequently, the date and time information changing unit 116 determines whether or not the value of the time synchronization availability flag included in the eKey received in S1805 illustrated in FIG. 15 is "OK" (S4001). If the value of the time synchronization availability flag is not "OK" (S4001: No), the lock control device 10-3 performs the operation of S4005 described later.

On the other hand, if the value of the time synchronization availability flag is "OK" (S4001: Yes), the date and time information changing unit 116 synchronizes the date and time information of the lock control device 10-3, with the date and time information managed by the user terminal 20 (S4005). Thereby, the date and time information of the lock control device 10-3 is corrected to be same as the date and time information of the user terminal 20.

Thereafter, the transmission control unit 112 causes the communication unit 130 to transmit the execution result of S1831 or S1833 to the user terminal 20 (S4005).

<3-5. Effect>

In the above, as described with reference to FIGS. 31 to 33, the lock control device 10-3 according to the third embodiment determines the availability or unavailability of the change of the date and time information of the lock control device 10-3 on the basis of the time synchronization availability flag included in the eKey received from the user terminal 20, and then authorizes the change of the date and time information of the lock control device 10-3 by the user terminal 20 when the time synchronization availability flag indicates "OK".

Hence, the date and time information of the lock control device 10-3 is prevented from being changed by the user terminal 20 of the user 2 to whom the authority of the time correction is not given. For example, the risk of the date and time information being changed to incorrect date and time by the malicious user 2 decreases.

4. Fourth Embodiment

4-1. Background

In the above, the third embodiment has been described. Next, the fourth embodiment will be described. First, the background that has lead up to creating the fourth embodiment will be described.

(4-1-1. Background 1)

In general, it is desirable that the door is unlockable with small burden for the user 2 having the unlocking right. In the publicly known technology, as the first method, a technology is proposed in which the user 2 activates a predetermined application implemented in the carried terminal, and then performs the unlocking operation in the application. However, in this method, the application is to be activated at each trial of unlocking the door, and the work load of the user 2 is large.

Also, as the second method, the method that automatically unlocks, when it is detected that the user 2 having the unlocking right has accessed the door is proposed. However, in this method, there is a risk of unlocking even when the user 2 is actually at a position slightly away from the door. As a result, there is a risk of intrusion into a room by the malicious person.

(4-1-2. Background 2)

Also, another problem is described below. When there are a plurality of user terminals 20 having the unlocking right of the same lock control device 10-1, it is envisaged that a situation occurs in which a plurality of user terminals 20 access the lock control device 10-1 and then requests unlocking within a substantially same time period. In this case, there is a risk of occurrence of an event in which, while the specific user terminal 20a performs some sort of communication with the lock control device 10-1, another user terminals 20b is unable to communicate with the lock control device 10-1 so as not to unlock for a certain amount of time. In particular, the communication amount increases when secure communication is performed between the lock control device 10-1 and the user terminal 20 for the unlocking process, and therefore the above problem is likely to occur.

As a result, there is a risk that the user 2 of another user terminal 20*b* is forced to wait for a certain amount of time until unlocked, and feels stress.

As described later, with the lock control device 10-4 according to the fourth embodiment, the user 2 having the unlocking right can unlock securely, without operating the application. Also, the time during which the user 2 is forced to wait in front of the door at the time of the unlocking operation is shortened.

4-2. System Configuration

Figure 34:
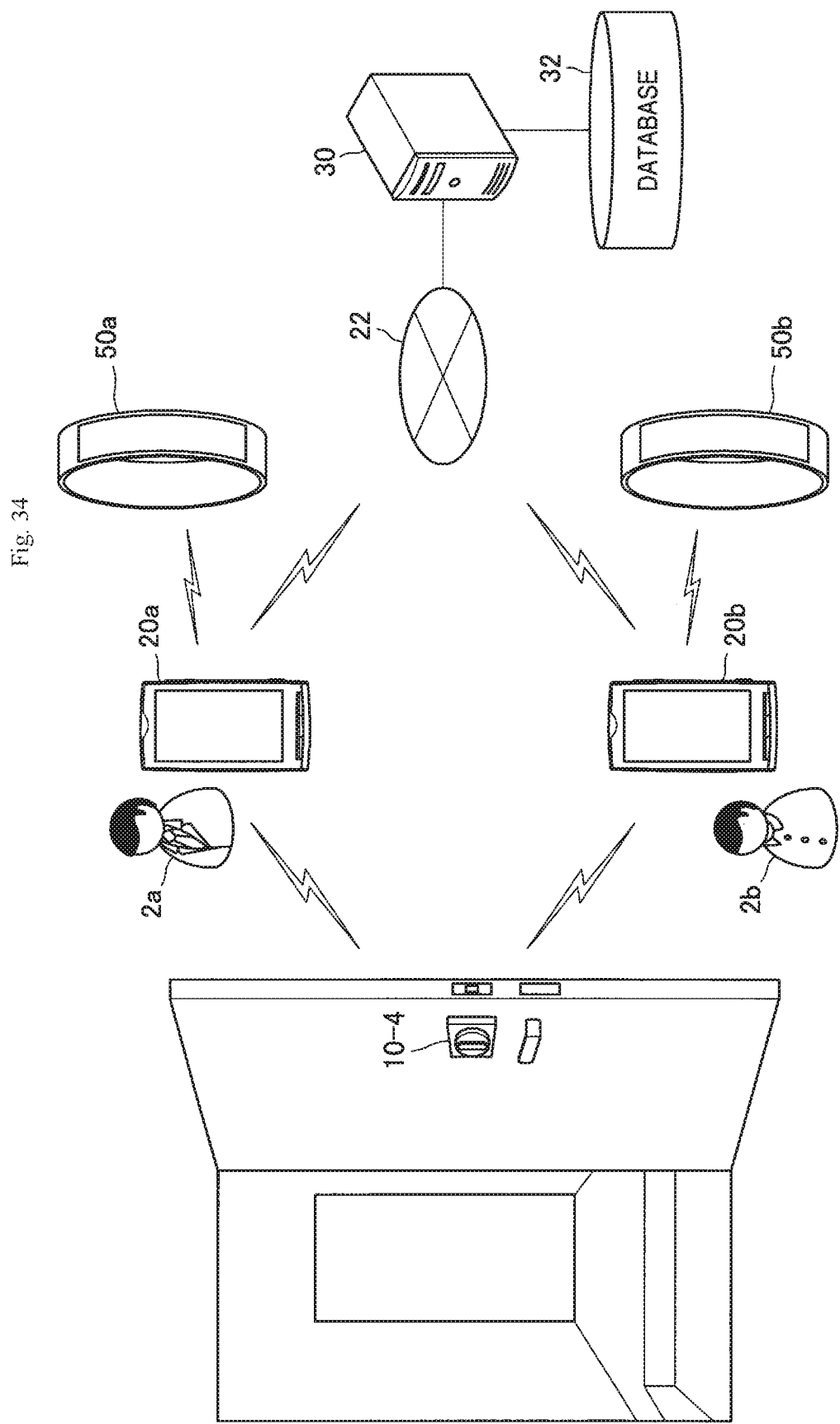
FIG. 34 is a functional block diagram illustrating an exemplary configuration of an information processing system according to a fourth embodiment of the present disclosure.

First, with reference to FIG. 34, the system configuration according to the fourth embodiment will be described. As illustrated in FIG. 34, the information processing system according to the fourth embodiment further includes wearable devices 50, as compared with the first embodiment illustrated in FIG. 1.

(4-2-1. Wearable Device 50)

The wearable device 50 is a device of a watch type for example, which the user 2 can wear on the body. This wearable device 50 includes an acceleration sensor for example, and is capable of measuring the acceleration of the wearable device 50.

Also, the wearable device 50 includes a display unit having a touch panel, and is capable of displaying a display screen image.

Note that other components are substantially same as the first embodiment.

4-3. Configuration (4-3-1. Lock Control Device 10-4)

Figure 35:
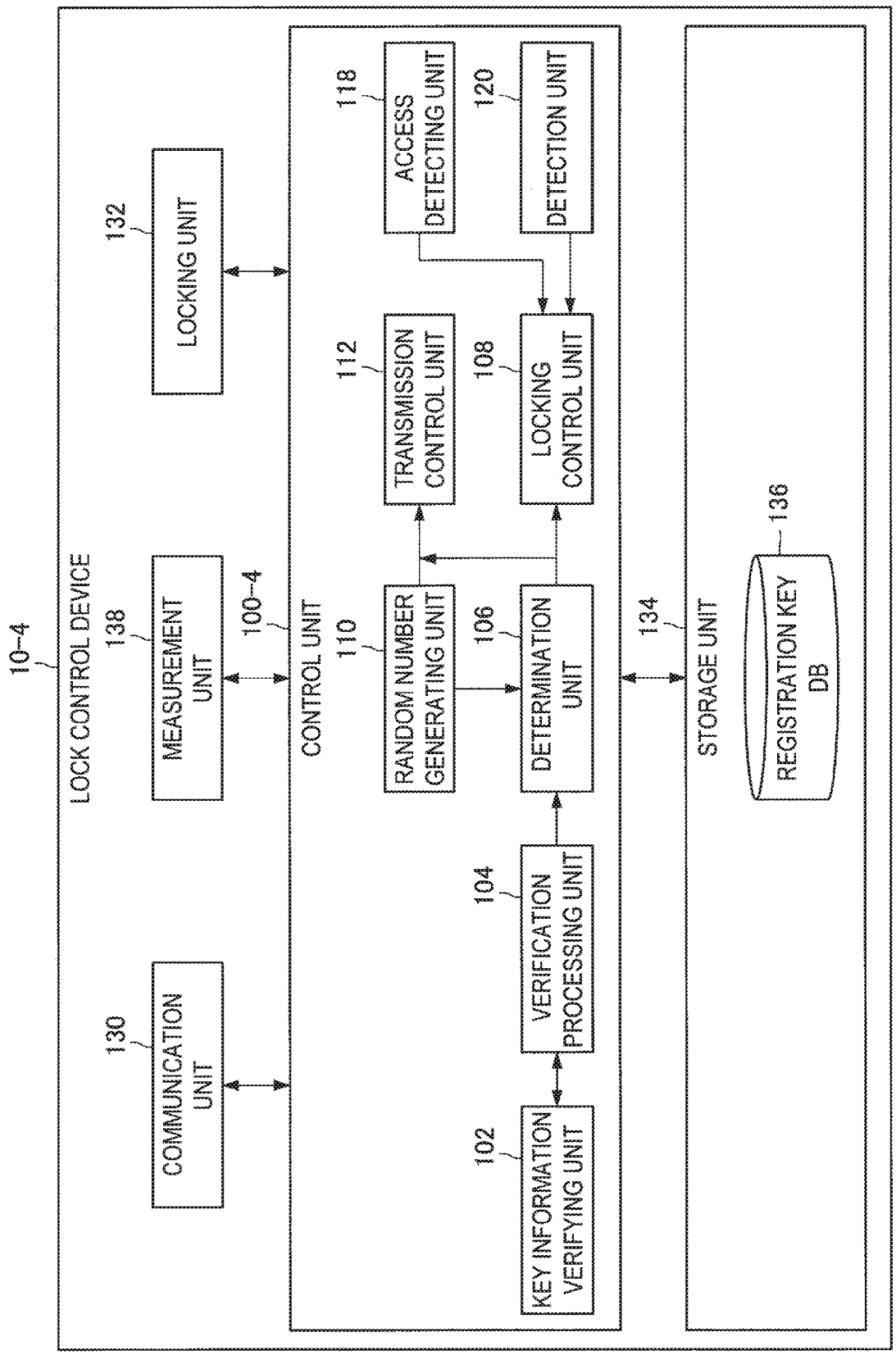
FIG. 35 is a functional block diagram illustrating an exemplary configuration of a lock control device 10-4 according to the same embodiment.

In the above, the configuration of the information processing system according to the fourth embodiment has been described. Next, the configuration according to the fourth embodiment will be described in detail. FIG. 35 is a functional block diagram illustrating the configuration of the lock control device 10-4 according to the fourth embodiment. The lock control device 10-4 can have a movable lock interface that is removably coupleable external to, adjacent to, or over a movable component of the lock, such as a thumbturn, to unlock the lock. As illustrated in FIG. 35, the lock control device 10-4 according to the fourth embodiment includes the control unit 100-4, instead of the control unit 100-1, as compared with the lock control device 10-1 illustrated in FIG. 2. Also, the lock control device 10-4 further includes a measurement unit 138.

(4-3-1-1. Control Unit 100-4)

The control unit 100-4 further includes an access detecting unit 118 and a detection unit 120, as compared with the control unit 100-1 according to the first embodiment.

(4-3-1-2. Access Detecting Unit 118)

The access detecting unit 118 detects the access of the user terminal 20 to the lock control device 10-4. For example, the access detecting unit 118 detects the access of the user terminal 20, on the basis of the strength of the radio wave of a predetermined standard, such as Bluetooth, which is received from the user terminal 20. More specifically, the access detecting unit 118 determines that the user terminal 20 accesses the lock control device 10-4, when it is detected that the strength of the received radio wave increases gradually. Also, the access detecting unit 118 determines that the user terminal 20 is away from the lock control device 10-4, when it is detected that the strength of the received radio wave decreases gradually.

Alternatively, the access detecting unit 118 is also capable of detecting whether or not the user terminal 20 accesses the lock control device 10-4, on the basis of the position information of the user terminal 20 received from the user terminal 20, for example. For example, the access detecting unit 118 may detect whether or not the user terminal 20 accesses the lock control device 10-4, by receiving from the user terminal 20 the position information of the user terminal 20 identified from the positioning signal received from the positioning satellite such as the global positioning system (GPS), at predetermined time intervals. Alternatively, the access detecting unit 118 may detect whether or not the user terminal 20 accesses the lock control device 10-4, by receiving from the user terminal 20 the position information of the transmitter transmitted by the transmitter installed indoors, for example. Thus, access of the user terminal 20 to the lock control device 10-4 may be detected or determined by the lock control device 10-4. Optionally or alternatively, access of the user terminal 20 to the lock control device 10-4 may be detected or determined by the user terminal 20.

(4-3-1-2. Detection Unit 120)

The detection unit 120 detects the unlocking request by the user 2 of the user terminal 20, when the detection result of the vibration or the ambient sound measured by the measurement unit 138 described later satisfies a predetermined condition. For example, the detection unit 120 detects the unlocking request, when it is detected that the door is knocked by the user 2, on the basis of the measurement result of the vibration by the measurement unit 138. That is, the detection unit 120 may detect as the unlocking request vibration or sound of the lock control device 10-4, for instance, satisfying a predetermined condition of the lock control device 10-4 (e.g., as measured by measurement unit 138). As an alternative, the unlocking request may include a signal from the user terminal 20 when or in a case that the detection unit 120 detects vibration or sound of the lock control device 10-4, for instance, satisfying a predetermined condition of the lock control device 10-4, or when or in a case that the lock control device 10-4 receives a signal from the user terminal 20 generated based on or in response to detection by the user terminal 20 of vibration or sound of the user terminal 20 satisfying a predetermined condition of the user terminal. Alternatively, the detection unit 120 detects the unlocking request, when a predetermined information is received from another user terminal, which may be the wearable device 50 worn by the user 2. Alternatively, the unlocking request may be a signal from the user terminal 20 sent to the lock control device 10-4 based on a predetermined operation at another user terminal, which may be the wearable device 50.

Note that another user terminal, which may be the wearable device 50, may transmit to the lock control device 10-4 the above predetermined information, when a predetermined operating state such as shaking repetitively in the vertical direction by the user 2 is detected for example. Alternatively, the another user terminal, which may be the wearable device 50 may transmit the above predetermined information to the lock control device 10-4, when the user has tapped the display screen image. Alternatively, the another user terminal may transmit to the user terminal 20 the above predetermined information based on a predetermined operation at the another user terminal.

Also, as an exemplary variant, the detection unit 120 may detect the unlocking request, when the vibration time point measured by the measurement unit 138 and the vibration time point detected by the wearable device 50, which are received from the wearable device 50, are identical with each other. Also, the detection unit 120 may detect the unlocking request, when it is detected that the door is knocked by the user 2 the number of knocking times set in advance, on the basis of the measurement result of the vibration by the measurement unit 138. That is, the detection unit 120 may detect as the unlocking request vibration or sound of the lock control device 10-4, for instance, satisfying a predetermined condition of the lock control device 10-4 (e.g., as measured by measurement unit 138). As an alternative, the unlocking request may include a signal from the user terminal 20 when or in a case that the detection unit 120 detects vibration or sound of the lock control device 10-4, for instance, satisfying a predetermined condition of the lock control device 10-4, or when or in a case that the lock control device 10-4 receives a signal from the user terminal 20 generated based on or in response to detection by the user terminal 20 of vibration or sound of the user terminal 20 satisfying a predetermined condition of the user terminal. According to these exemplary variants, the unlocking request is detected more appropriately, and therefore the security improves.

(4-3-1-3. Locking Control Unit 108)

Control Example 1

The locking control unit 108 according to the fourth embodiment executes preprocessing among the processes for unlocking, when the access detecting unit 118 detects that the user terminal 20 accesses within a predetermined range from the lock control device 10-4, for example. Here, the preprocessing is a process that takes a large amount of time among the processes for unlocking. For example, the preprocessing is the process other than the unlocking among the operations of the unlocking processes illustrated in FIGS. 15 to 16. As one example, the preprocessing may be the processes from S1801 to S1821.

Also, when the access detecting unit 118 further detects the access of another user terminal 20*b* while executing the preprocessing of the user terminal 20*a*, the locking control unit 108 executes the preprocessing corresponding to the other user terminal 20*b*, after the end of the preprocessing of the user terminal 20*a*.

Control Example 2

Also, when the preprocessing ends, and the detection unit 120 detects the unlocking request, the locking control unit 108 executes the unlocking control process among the processes for unlocking. For example, when the preprocessing of the user terminal 20*a* ends, and the unlocking request by the user terminal 20*a* is detected by the detection unit 120 while the locking control unit 108 is executing the preprocessing corresponding to another user terminal 20*b*, first, the locking control unit 108 temporarily halts the preprocessing corresponding to the other user terminal 20*b*. Then, the locking control unit 108 executes the unlocking control process corresponding to the user terminal 20*a*.

Figure 36:
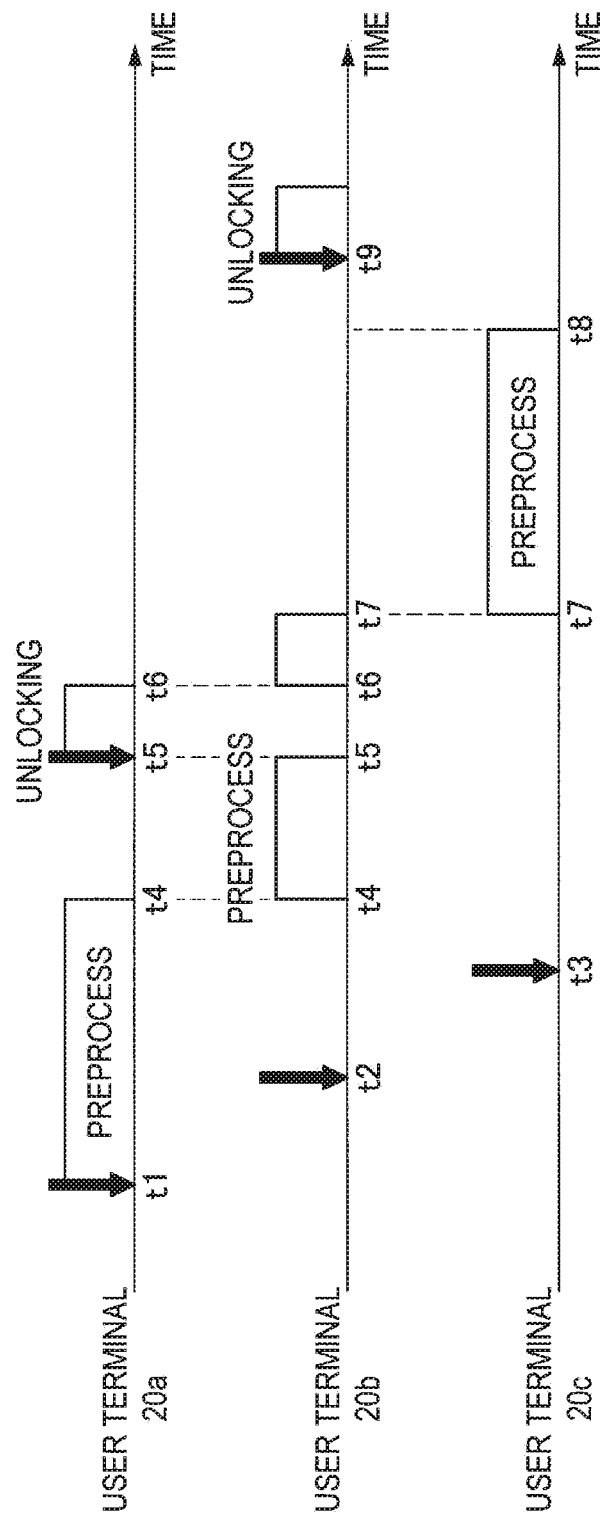
FIG. 36 is an explanatory diagram illustrating a flow of a process relevant to an individual user terminal 20 that has accessed a lock control device 10-4 according to the same embodiment.

Here, with reference to FIG. 36, the above function will be described in more detail. FIG. 36 is an explanatory diagram illustrating the flow of the process by the locking control unit 108, with respect to the user terminals 20*a* to 20*c* that have accessed the lock control device 10-4. As illustrated in FIG. 36, first, it is assumed that the access detecting unit 118 has detected at time "t1" that the user terminal 20*a* has accessed the lock control device 10-4. In this case, the locking control unit 108 starts the preprocessing of the user terminal 20*a* at the time "t1". Note that, as illustrated in FIG. 36, the preprocessing is a process that takes a certain amount of time, such as from the time "t1" to "t4", for example.

Then, it is assumed that the access detecting unit 118 has detected that the user terminal 20*b* has accessed to the lock control device 10-4, at time "t2", while the locking control unit 108 is executing the preprocessing of the user terminal 20*a*. In this case, the locking control unit 108 puts into a queue the identification information such as the device ID received from the user terminal 20*b* for example, and then causes the user terminal 20*b* to wait.

Further, it is assumed that the access detecting unit 118 has detected that the user terminal 20*c* has accessed to the lock control device 10-4 at time "t3", while continuing the preprocessing of the user terminal 20*a*. In this case, the locking control unit 108 puts into the queue the identification information of the user terminal 20*c*, and then causes the user terminal 20*c* to wait, in the same way.

Thereafter, it is assumed that the preprocessing of the user terminal 20*a* ends at the time "t4". In this case, the locking control unit 108 takes out the identification number from the head of the queue, and then starts the preprocessing of the user terminal 20 (i.e., the user terminal 20*b*) corresponding to the identification number that is taken out.

Thereafter, it is assumed that the detection unit 120 has detected the unlocking request from the user terminal 20*a*, at time "t5", while the locking control unit 108 is executing the preprocessing of the user terminal 20*b*. In this case, the locking control unit 108 temporarily halts the preprocessing of the user terminal 20*b*, and then starts the unlocking control process of the user terminal 20*a*. Then, when the unlocking control process of the user terminal 20*a* ends at time "t6", the locking control unit 108 restart the halting preprocessing of the user terminal 20*b*.

(4-3-1-4. Measurement Unit 138)

The measurement unit 138 measures various types of information, by an acceleration sensor, a geomagnetic sensor, or a microphone for example, which is included in the lock control device 10-4. For example, the measurement unit 138 measures acceleration of the lock control device 10-4, and ambient sound.

Note that other components included in the lock control device 10-4 are substantially same as the first embodiment. Also, the configuration of the user terminal 20 and the server 30 are substantially same as the first embodiment.

4-4. Operation

In the above, the configuration according to the fourth embodiment has been described. Next, the operation according to the fourth embodiment will be described with reference to FIGS. 37 to 39. Note that, here, the operation in a situation of unlocking request by the user terminal 20 will be described. More specifically, an exemplary operation when first the user terminal 20*a* accesses the lock control device 10-4, and thereafter another user terminal 20*b* accesses the lock control device 10-4 will be described.

Note that other types of operations are same as the first embodiment illustrated in FIGS. 6 to 17, and therefore the description will be omitted.

(4-4-1. Overall Operation)

Figure 37:
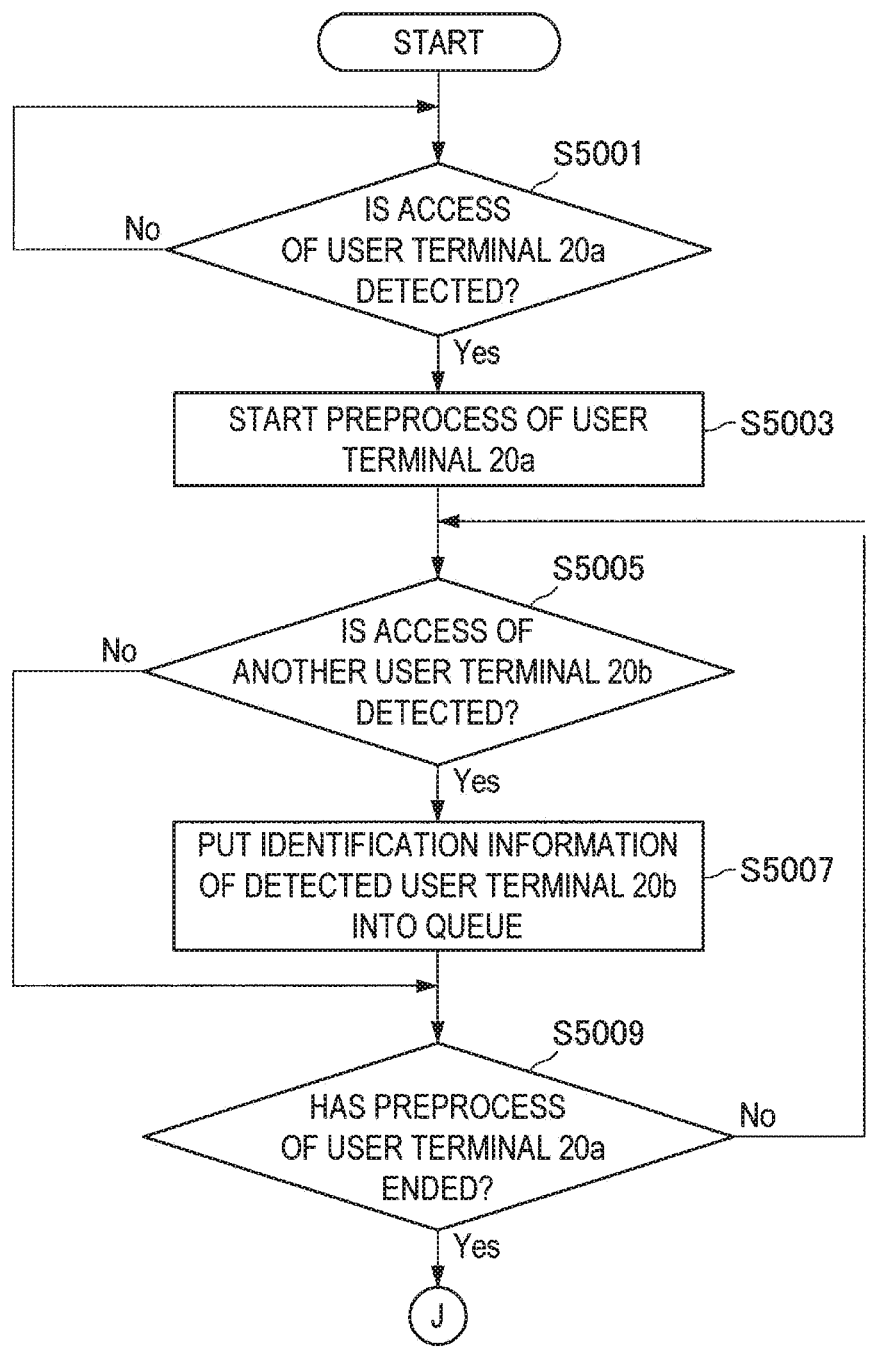
FIG. 37 is a flowchart illustrating a part of an operation according to the same embodiment.

As illustrated in FIG. 37, first, the locking control unit 108 of the lock control device 10-4 waits until the access detecting unit 118 detects the access of one of the user terminals 20 (S5001).

Then, if the access detecting unit 118 detects the access of the user terminal 20a (S5001: Yes), the locking control unit 108 starts the preprocessing of the user terminal 20a (S5003).

Thereafter, if the access detecting unit 118 detects the access of another user terminal 20b during the preprocessing of the user terminal 20a (S5005: Yes), the locking control unit 108 puts the identification information of the detected user terminal 20b into the queue (S5007).

Then, the locking control unit 108 repeats the process of S5005 to S5007, until the preprocessing of the user terminal 20a ends.

Figure 38:
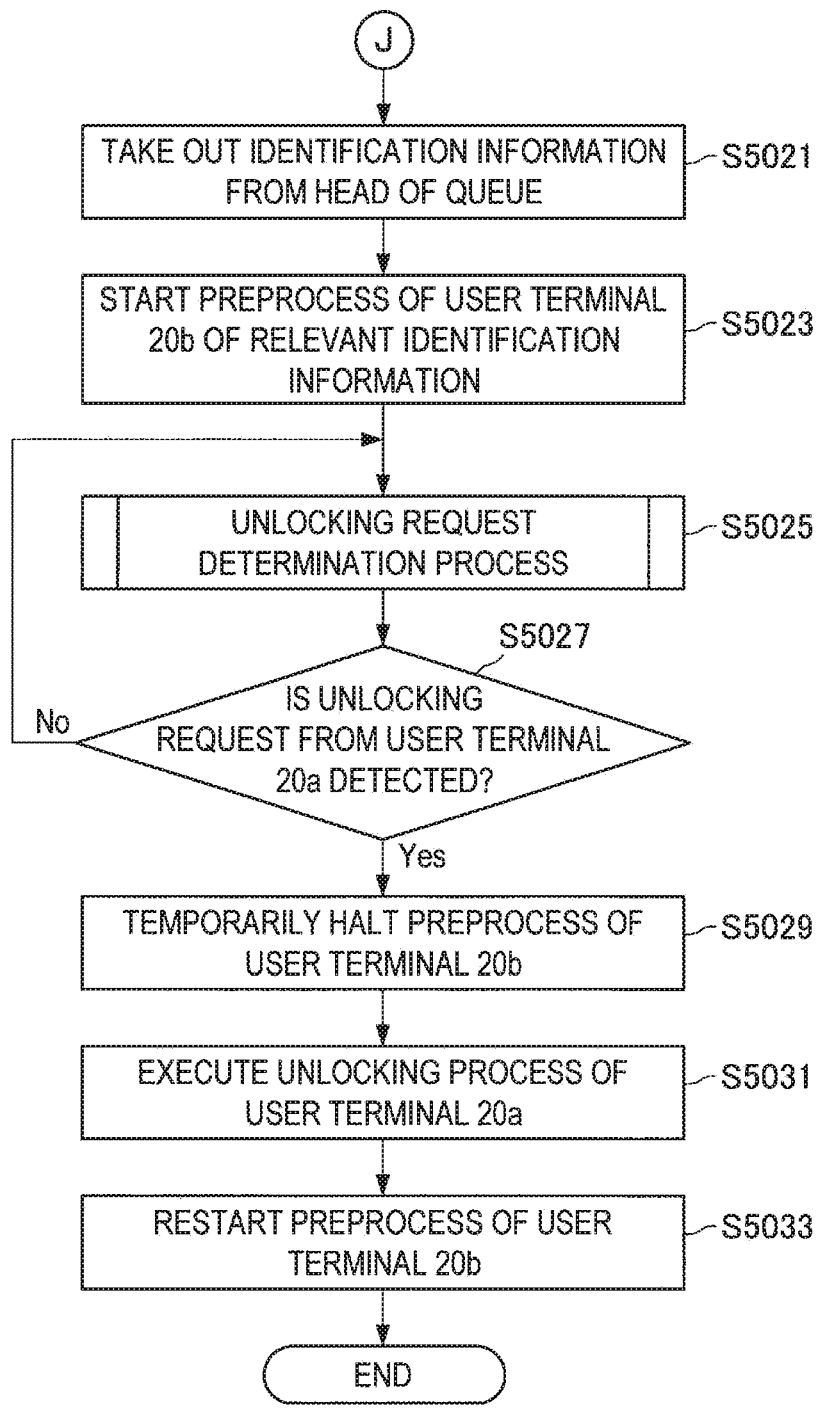
FIG. 38 is a flowchart illustrating a part of an operation according to the same embodiment.

Here, with reference to FIG. 38, the operation after S5007 will be described. If the preprocessing of the user terminal 20a ends after S5007 (S5009: Yes), the locking control unit 108 takes out the identification information at the head, among the identification information put into the queue (S5021).

Subsequently, the locking control unit 108 starts the preprocessing corresponding to the user terminal 20b of the identification information taken out in S5021 (S5023).

Then, the locking control unit 108 performs the "unlocking request determination process" described later (S5025). Thereafter, until the detection unit 120 detects the unlocking request from the user terminal 20a, the locking control unit 108 repeats the process of S5025.

If the unlocking request from the user terminal 20a is detected by the detection unit 120 in S5025 (S5027: Yes), the locking control unit 108 temporarily halts the preprocessing of the user terminal 20b (S5029).

Subsequently, the locking control unit 108 executes the unlocking control process of the user terminal 20a (S5031).

Thereafter, the locking control unit 108 restarts the preprocessing of the user terminal 20b that temporarily halts in S5029 (S5033).

(4-4-2. Unlocking Request Determination Process)

Next, with reference to FIG. 39, the operation of the "unlocking request determination process" in S5025 will be described in detail.

Figure 39:
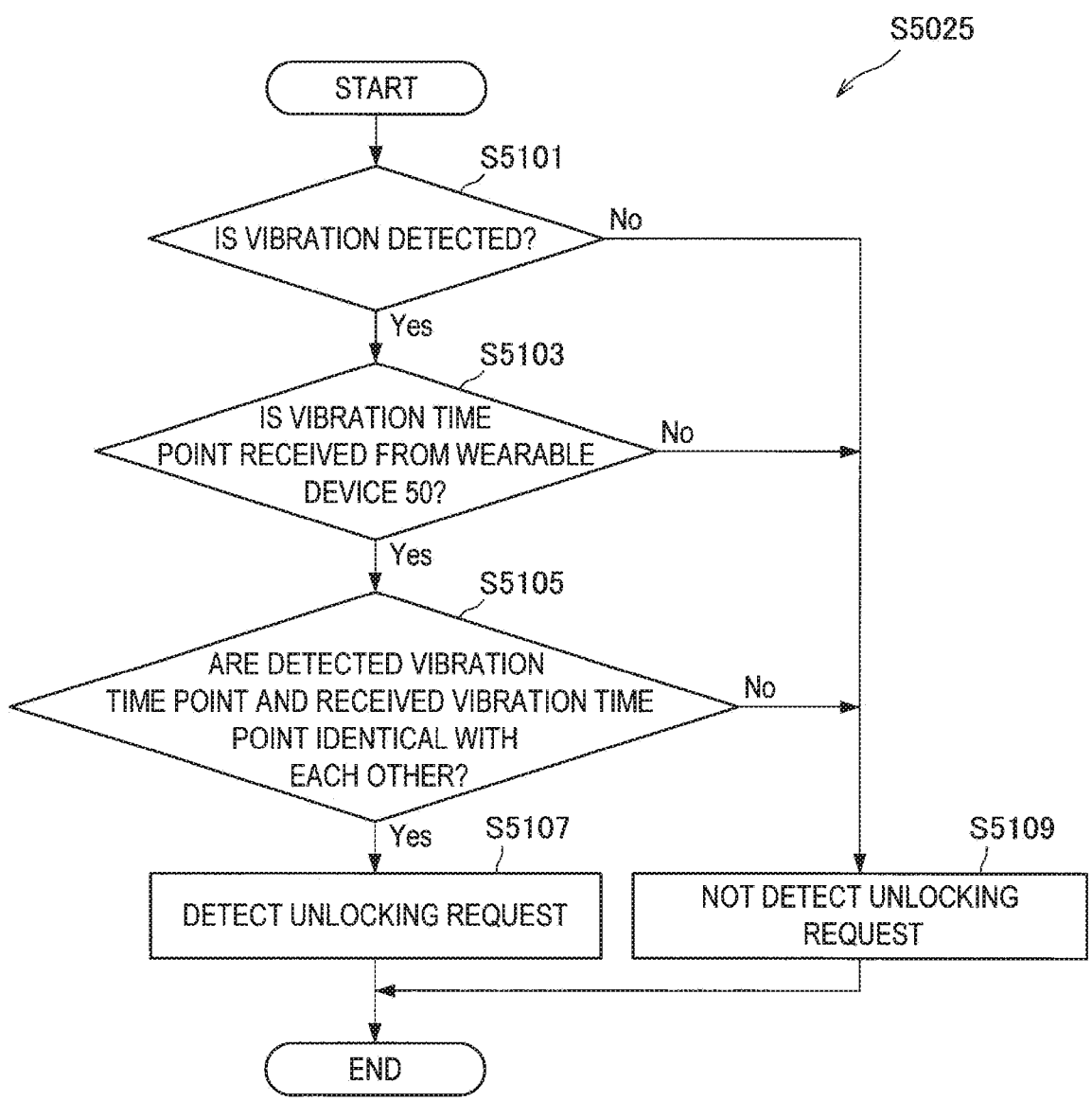
FIG. 39 is a flowchart illustrating an operation of an unlocking request determination process according to the same embodiment.

As illustrated in FIG. 39, first, the detection unit 120 of the lock control device 10-4 determines whether or not vibration is detected, on the basis of the measurement result of the acceleration by the measurement unit 138 (S5101). If the vibration is not detected (S5101: No), the detection unit 120 performs the operation of S5109 described later.

On the other hand, if the vibration is detected (S5101: Yes), the detection unit 120 waits for a predetermined time for example, until the vibration time point detected by the wearable device 50 is received from the wearable device 50 (S5103). If the vibration time point is not received (S5103: No), the detection unit 120 performs the operation of S5109 described later.

On the other hand, if the detected vibration time point is received from the wearable device 50 (S5103: Yes), the detection unit 120 determines whether or not the vibration time point detected in S5101 and the received vibration time point are identical with each other (S5105).

If the vibration time points are identical with each other (S5105: Yes), the detection unit 120 detects the unlocking request from the user terminal 20a (S5107). On the other hand, if the vibration time points are not identical with each other (S5105: No), the detection unit 120 does not detect the unlocking request (S5109).

4-5. Effect (4-5-1. Effect 1)

In the above, as described with reference to FIGS. 35 to 39 for example, the lock control device 10-4 according to the fourth embodiment executes the preprocessing among the processes for unlocking, when it is detected that the user terminal 20 accesses. Then, when the preprocessing ends, and the unlocking request from the user terminal 20 is detected, the lock control device 10-4 executes the unlocking control process among the processes for unlocking.

Hence, the lock control device 10-4 executes the preprocessing beforehand, and therefore only the remaining process (i.e., the unlocking control process) among the processes for unlocking is executed at the time of the unlocking request, and the process ends in a short time. Thus, the time during which the user 2 is forced to wait in front of the door is shortened at the time of the unlocking request.

Also, when the unlocking request by the user terminal 20a for which the preprocessing has ended already is detected while executing the preprocessing of the user terminal 20b, the lock control device 10-4 temporarily halts the preprocessing of the user terminal 20b, and then executes the unlocking control process of the user terminal 20a. Hence, even when a plurality of user terminals 20 access the lock control device 10-4 within a same time period, unlocking is performed promptly upon unlocking operation by the user 2 of the user terminal 20a. Hence, the user 2 is forced to wait little for unlocking, and does not feel the stress.

(4-5-2. Effect 2)

Also, according to the fourth embodiment, the user can perform the unlocking operation, by shaking the wearable device 50 or by tapping the wearable device 50, for example. Hence, the user is needless to activate the application in the user terminal 20 at each trial of unlocking the door for example, and thus the work load is reduced.

(4-5-3. Effect 3)

Also, as long as the unlocking request from the user terminal 20 is not detected, the lock control device 10-4 does not execute the unlocking control process, and therefore the safety of the unlocking improves, as compared with the publicly known key less entry technology, for example. For example, when the user is positioned away from the door, the door is prevented from being unlocked without intention of the user.

4-6. Exemplary Variant

Note that the following exemplary variant is applicable, when the lock control device 10-4 and the user terminal 20 communicate in accordance with Bluetooth. For example, when the detection unit 120 has not detected the unlocking request by the user terminal 20a for which the preprocessing has ended already, and the preprocessing currently executed for another user terminal 20b ends, the locking control unit 108 may return the connection of Bluetooth from the user terminal 20b to the user terminal 20a.

Normally, the connection of Bluetooth takes a certain amount of time. According to this exemplary variant, the connection of Bluetooth is returned in advance to the user terminal 20a for which the preprocessing has ended previously, so that the lock control device 10-4 can execute the unlocking control process corresponding to the user terminal 20a in shorter time, when the unlocking request by the user terminal 20a is detected.

5. Fifth Embodiment

5-1. Background

In the above, the fourth embodiment has been described. Next, the fifth embodiment will be described. First, the background that has lead up to creating the fifth embodiment will be described.

In general, it is desirable that the door is automatically locked at an appropriate time point, after unlocked transiently. In the publicly known technology, there is proposed a method for automatically locking, when a predetermined time has passed since the door is unlocked. However, in this method, there is a risk that the locking process is performed with the door open, when the user keeps the door open.

As described later, the lock control device 10-5 according to the fifth embodiment can lock automatically at an appropriate time point.

5-2. System Configuration

The system configuration according to the fifth embodiment is same as the first embodiment illustrated in FIG. 1 or FIG. 18.

5-3. Configuration (5-3-1. Lock Control Device 10-5)

Figure 40:
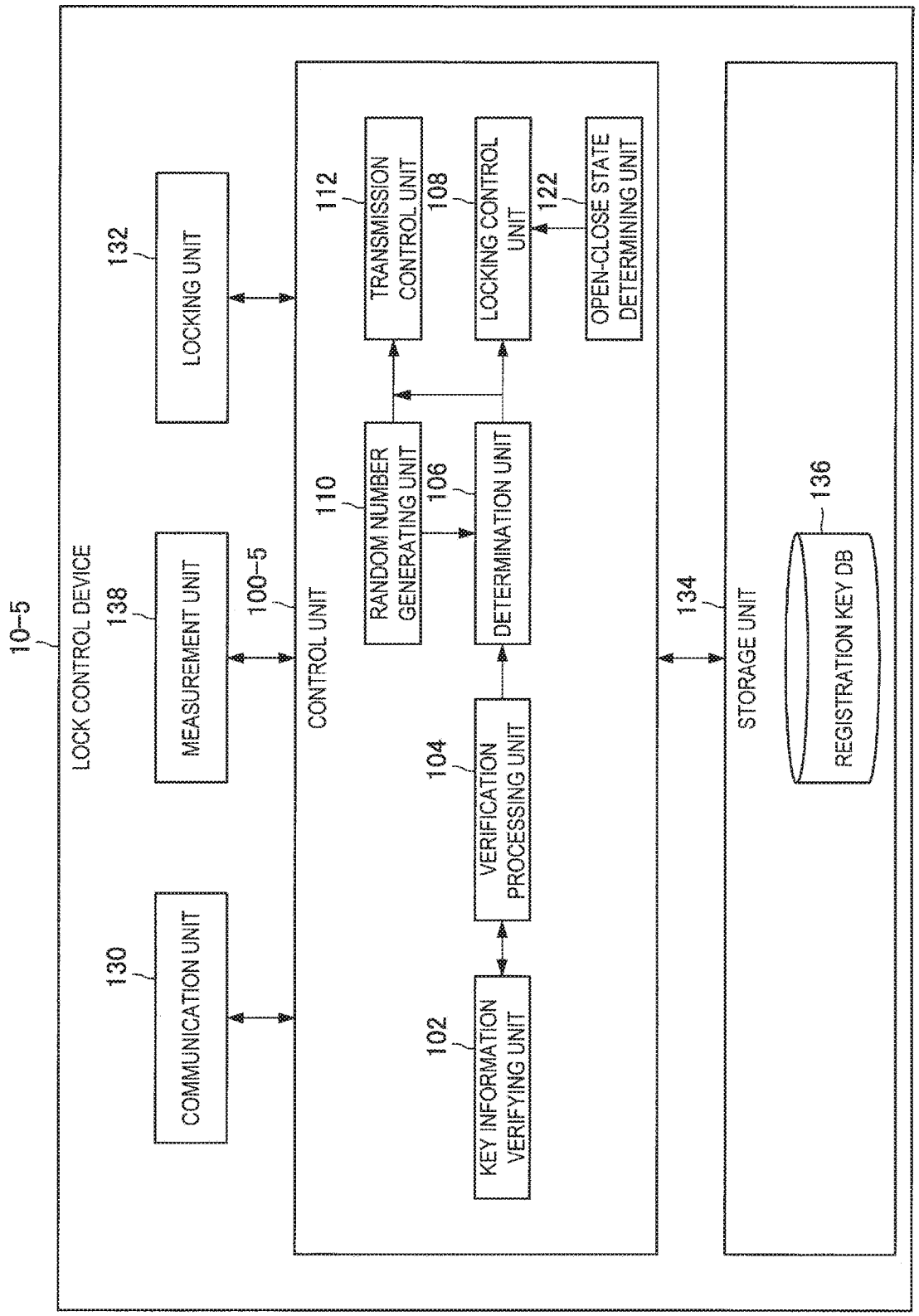
FIG. 40 is a functional block diagram illustrating an exemplary configuration of a lock control device 10-5 according to a fifth embodiment of the present disclosure.

Next, the configuration according to the fifth embodiment will be described in detail. FIG. 40 is a functional block diagram illustrating the configuration of the lock control device 10-5 according to the fifth embodiment. The lock control device 10-5 can have a movable lock interface that is removably coupleable external to, adjacent to, or over a movable component of the lock, such as a thumbturn, to unlock the lock. As illustrated in FIG. 40, the lock control device 10-5 according to the fifth embodiment includes the control unit 100-5, instead of the control unit 100-1, as compared with the lock control device 10-1 illustrated in FIG. 2. Also, the lock control device 10-5 further includes the measurement unit 138.

(5-3-1-1. Control Unit 100-5)

The control unit 100-5 further includes an open-close state determining unit 122, as compared with the control unit 100-1 according to the first embodiment.

(5-3-1-2. Open-Close State Determining Unit 122)

The open-close state determining unit 122 determines whether or not the door in which the lock control device 10-5 is installed is closed, on the basis of the measurement result measured by the measurement unit 138. For example, the open-close state determining unit 122 determines that the door is moving, when the acceleration measured by the measurement unit 138 is a value equal to or larger than a predetermined threshold value. Of course, as noted above, the lock control device 10-5 can be attached to or otherwise positioned so as to be operative with movable structures other than entrance doors, such as closet doors (sliding or rotating) or other internal doors, drawers, boxes, cabinets, windows, etc.

Also, the open-close state determining unit 122 determines whether or not the door is closed, by comparing a value of geomagnetism measured by the measurement unit 138 with a measured value of geomagnetism of a door closing state, which is store in the storage unit 134 for example. More specifically, the open-close state determining unit 122 determines that the door is closed, when the difference between the measured value of geomagnetism of the door closing state and the value of geomagnetism measured by the measurement unit 138 is within a predetermined range. Also, the open-close state determining unit 122 determines that the door is open when the above difference is out of the predetermined range.

Exemplary Variant

Note that, as an exemplary variant, the open-close state determining unit 122 is capable of determining whether or not the installation state of the lock control device 10-5 is abnormal, on the basis of the measurement result by the measurement unit 138. For example, when the measurement unit 138 measures an acceleration of a value within a predetermined range, the open-close state determining unit 122 may determine that the lock control device 10-5 is falling from the door installed. Also, the open-close state determining unit 122 is capable of determining the installation orientation of the lock control device 10-5 on the basis of the direction of the gravity force measured by the measurement unit 138. For example, when the lock control device 10-5 is installed on the door with a double-faced adhesive tape, the installation orientation of the lock control device 10-5 can change. Thus, when the determined installation orientation of the lock control device 10-5 is shifted from a predetermined direction, the open-close state determining unit 122 may determine that the installation state of the lock control device 10-5 is abnormal.

(5-3-1-3. Locking Control Unit 108)

The locking control unit 108 according to the fifth embodiment causes the locking unit 132 to lock, when a predetermined time has passed after causing the locking unit 132 to unlock for example, and the open-close state determining unit 122 determines that the door is closed.

(5-3-1-4. Transmission Control Unit 112)

When a predetermined time has passed since the open-close state determining unit 122 determines that the door is open, the transmission control unit 112 according to the fifth embodiment is capable of causing the communication unit 130 to transmit the notification of the warning to the user terminal 20. According to this transmission example, the user is warned that the door is kept open for a long time.

Note that the function of the measurement unit 138 is same as the fourth embodiment. Also, other components included in the lock control device 10-5 are substantially same as the first embodiment. Also, the configurations of the user terminal 20 and the server 30 are substantially same as the first embodiment.

5-4. Operation

In the above, the configuration according to the fifth embodiment has been described. Next, the operation according to the fifth embodiment will be described with reference to FIG. 41. Note that, here, the operation at the time unlocking and locking of the door will be described. Other types of operations are same as the first embodiment illustrated in FIGS. 6 to 17, and therefore the description will be omitted.

Figure 41:
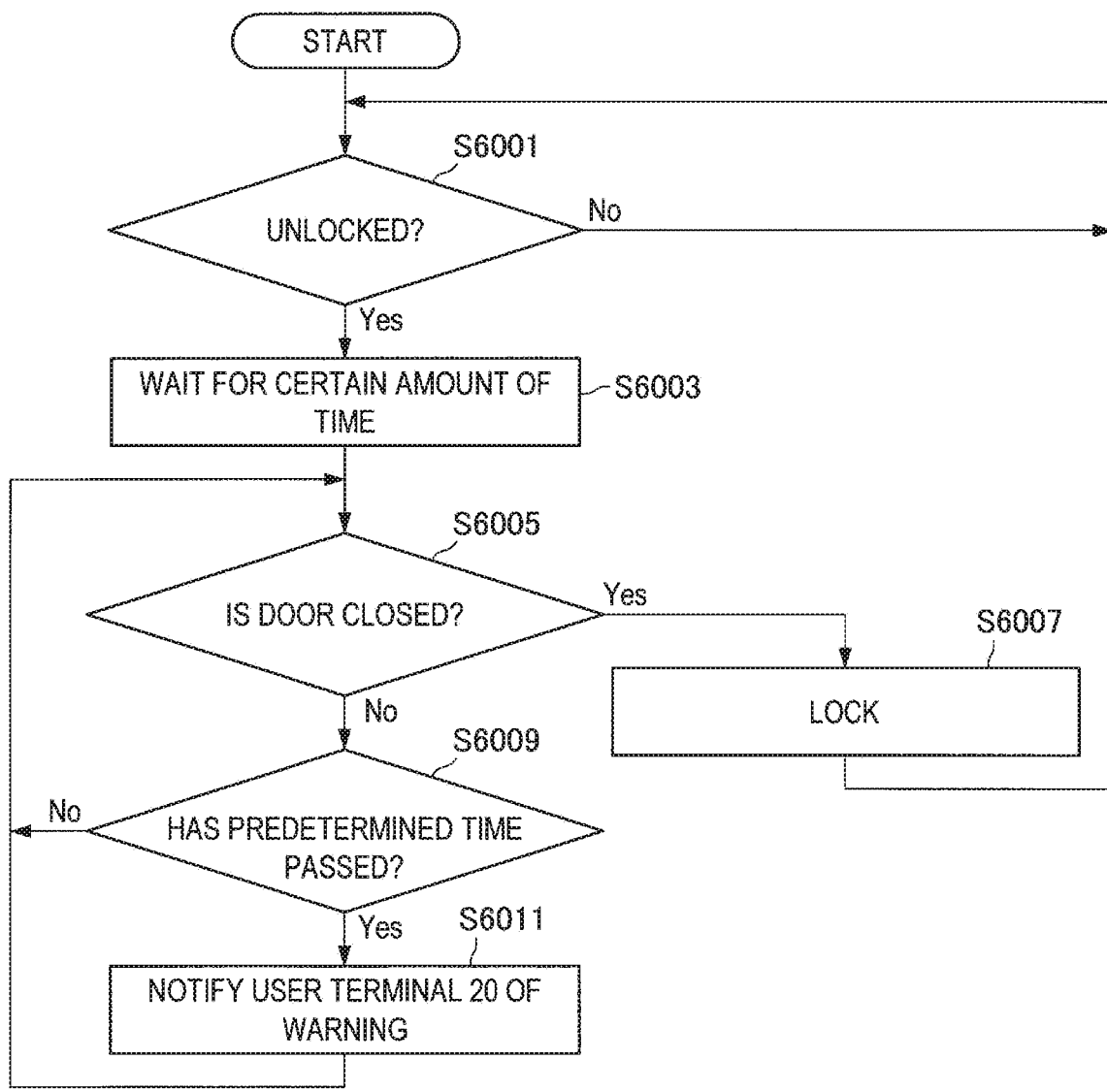
FIG. 41 is a flowchart illustrating an operation according to the same embodiment.

As illustrated in FIG. 41, first, the locking control unit 108 of the lock control device 10-5 waits until unlocked by the locking unit 132 (for example, until the operation of S1833 illustrated in FIG. 16 is performed) (S6001).

Then, if unlocked (S6001: Yes), the locking control unit 108 waits for a certain amount of time. Note that, during this, the open-close state determining unit 122 determines on a regular basis whether or not the door in which the lock control device 10-5 is installed is closed (S6003).

Subsequently, the locking control unit 108 confirms whether or not the open-close state determining unit 122 determines that the door is closed at present moment (S6005). If it is determined that the door is closed (S6005: Yes), the locking control unit 108 causes the locking unit 132 to lock (S6007). Thereafter, the lock control device 10-5 performs the operation of S6001 again.

On the other hand, if is determined the door is open (S6005: No), the locking control unit 108 repeats the operation of S6005, until a predetermined time passes.

Then, if the predetermined time passes (S6009: Yes), the transmission control unit 112 causes the communication unit 130 to transmit the notification of the warning to the user terminal 20 (S6011).

Thereafter, the lock control device 10-5 performs the operation of S6005 again.

5-5. Effect

In the above, as described with reference to FIGS. 40 and 41, the lock control device 10-5 according to the fifth embodiment automatically locks when a predetermined time has passed after unlocking for example, and it is determined that the door in which the lock control device 10-5 is installed is closed.

Hence, automatic lock is enabled only when the door is closed. Also, the door in an open state is prevented from being locked.

5-6. Exemplary Variant

Note that, as an exemplary variant of the fifth embodiment, a magnet may be installed on the wall adjacent to the lock control device 10-5. According to this exemplary variant, the difference between the measurement result of geomagnetism when the door is open and the measurement result of geomagnetism when the door is closed is considered to become larger. Thus, the lock control device 10-5 can determine the open-close state of the door more accurately.

Also, in the above description, an example in which, when it is determined that the door is open for a long time, the lock control device 10-5 transmits the notification of the warning to the user terminal 20 has been described, but is not limited to such an example. For example, in the above case, the lock control device 10-5 may sound a buzzer.

6. Sixth Embodiment

6-1. Background

In the above, the fifth embodiment has been described. Next, the sixth embodiment will be described. First, the background that has lead up to creating the sixth embodiment will be described.

In a situation where the lock control device 10-1 wirelessly communicates with the user terminal 20 and authenticates the user terminal 20 to execute the unlocking process, the user 2 of the user terminal 20 does not interact with the lock control device 10-1 physically at all. Hence, without notifying the user by some sort of mechanism that the lock control device 10-1 is reacting, the user 2 does not understand the situation of the lock control device 10-1, such as the lock control device 10-1 communicating with the user terminal 20, and the lock control device 10-1 malfunctioning, for example.

In the publicly known technology, there is proposed a method in which the lock control device is installed outside the door, to inform the user of the situation of the lock control device, by a display mechanism such as a light emitting diode (LED) or a display. However, when the lock control device is installed outside the door, there is a risk that the lock control device is stolen by a malicious person.

Also, as another method, there is a method in which the lock control device is installed inside the door, and a display device for informing the user of the situation of the lock control device is further installed outside the door. However, in this method, the cost for manufacturing and installing the device is large.

As described later, even when the lock control device 10-6 is installed inside the door, the lock control device 10-6 according to the sixth embodiment is capable of notifying the user of the situation of the process.

6-2. System Configuration

The system configuration according to the sixth embodiment is same as the first embodiment illustrated in FIG. 1 or FIG. 18.

6-3. Configuration (6-3-1. Lock Control Device 10-6)

Figure 42:
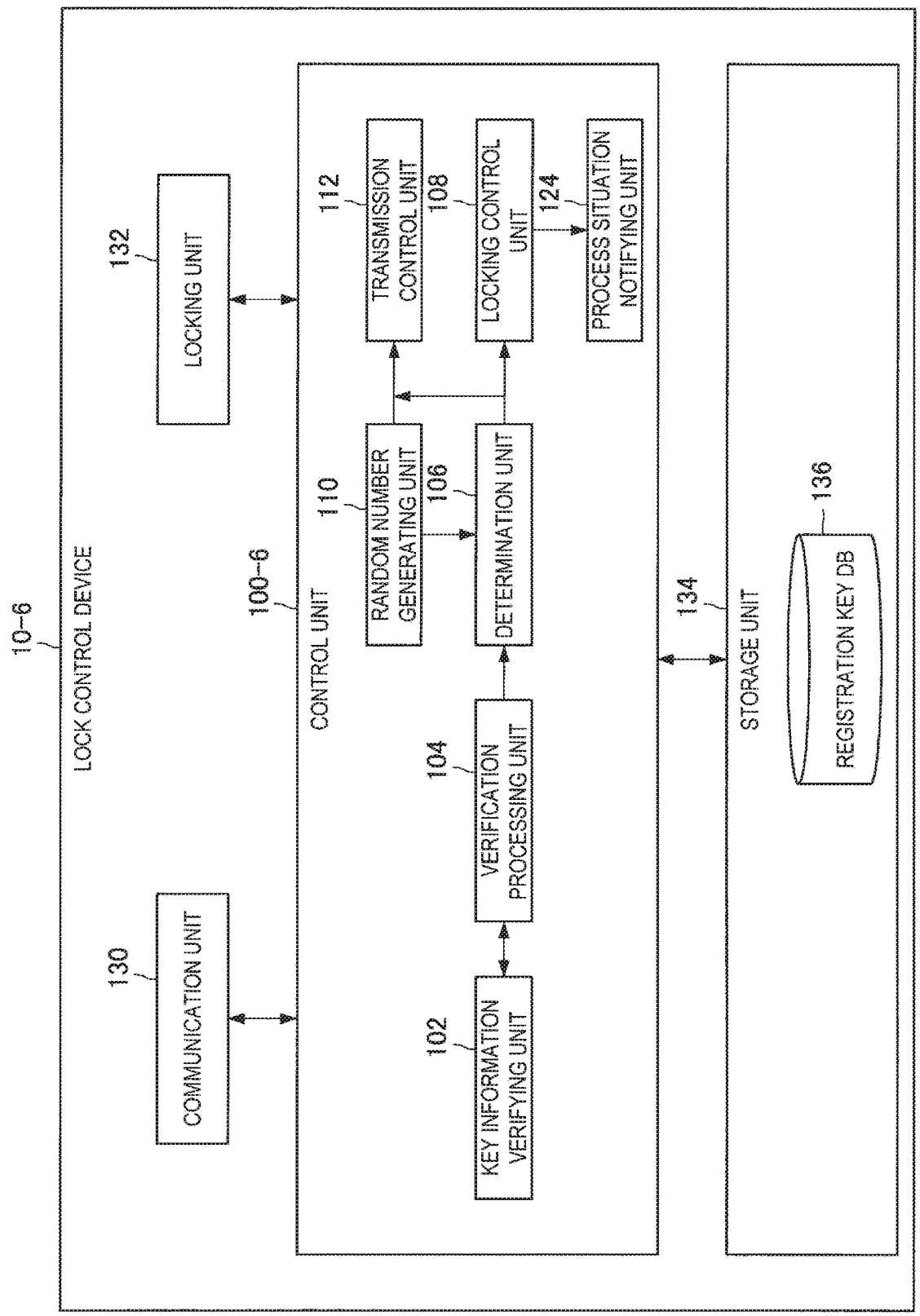
FIG. 42 is a functional block diagram illustrating an exemplary configuration of a lock control device 10-6 according to a sixth embodiment of the present disclosure.

Next, the configuration according to the sixth embodiment will be described in detail. FIG. 42 is a functional block diagram illustrating the configuration of the lock control device 10-6 according to the sixth embodiment. The lock control device 10-6 can have a movable lock interface that is removably coupleable to, adjacent to, or over a movable component of the lock, such as a thumbturn, to unlock the lock. As illustrated in FIG. 42, the lock control device 10-6 according to the sixth embodiment includes the control unit 100-6, instead of the control unit 100-1, as compared with the lock control device 10-1 illustrated in FIG. 2.

(6-3-1-1. Control Unit 100-6)

The control unit 100-6 further includes a process situation notifying unit 124, as compared with the control unit 100-1 according to the first embodiment.

(6-3-1-2. Process Situation Notifying Unit 124)

The process situation notifying unit 124 causes the communication unit 130 to transmit to the relevant user terminal 20 the process situation notification indicating the process situation by the locking control unit 108, at a predetermined time point. For example, each time a to-be-notified event occurs while the locking control unit 108 executes the process for unlocking, the process situation notifying unit 124 causes the communication unit 130 to transmit to the relevant user terminal 20 a process situation notification indicating the content of the to-be-notified event that has occurred.

Here, the process for unlocking is same as the fourth embodiment. Also, for example, the to-be-notified event may be "the lock control device 10-6 and the user terminal 20 becomes connectable to each other", "the lock control device 10-6 and the user terminal 20 have actually connected to each other", "the authentication processing of the user terminal 20 is ongoing", "the user terminal 20 of the authentication process is completed", or, "the unlocking is completed". Note that, "having actually connected" refers to execution of a bond process in BLE, for example.

Note that other components included in the lock control device 10-6 are substantially same as the first embodiment.

(6-3-2. User Terminal 20)

Next, the configuration of the user terminal 20 according to the sixth embodiment will be described.

(6-3-2-1. Control Unit 200)

On the basis of the process situation notification received from the lock control device 10-6, the control unit 200 according to the sixth embodiment outputs the received process situation notification. For example, the control unit 200 causes the user terminal 20 or the wearable device 50 to vibrate, when the received process situation notification is a predetermined notification. Also, the control unit 200 displays the content of the received process situation notification on the display screen, when the received process situation notification is other than the predetermined notification. Here, the predetermined notification may be a notification indicating "having actually connected" for example. According to such a configuration, the vibration of the user terminal 20 or the wearable device 50 prompts the user to confirm the display screen image. Also, the vibration event is only once, and therefore there is little risk that the user feels discomfort. Additionally or alternatively, the process situation notification may be in the form of vibration or sound of the lock control device 10-6, for instance, satisfying a predetermined condition of the lock control device 10-6 (e.g., as measured at the lock control device). As an alternative, the process situation notification may include a signal from the user terminal 20 when or in a case that the lock control device 10-6 detects vibration or sound thereof, for instance, satisfying a predetermined condition of the lock control device 10-6, or when or in a case that the lock control device 10-6 receives a signal from the user terminal 20 generated based on or in response to detection by the user terminal 20 of vibration or sound of the user terminal 20 satisfying a predetermined condition of the user terminal. Alternatively, the lock control device 10-6 may receive the process situation notification when a predetermined information is received from another user terminal, which may be the wearable device 50. Alternatively, the lock control device 10-6 may receive the process situation notification from the user terminal 20 based on a predetermined operation at another user terminal, which may be the wearable device 50.

Note that other components included in the user terminal 20 are substantially same as the first embodiment. Also, the configuration of the server 30 is substantially same as the first embodiment.

6-4. Operation

In the above, the configuration according to the sixth embodiment has been described. Next, the operation according to the sixth embodiment will be described with reference to FIG. 43. Note that, here, the operation at the time of the unlocking processing will be described. Other types of operations are same as the first embodiment illustrated in FIGS. 6 to 17, and therefore the description will be omitted. Also, the operation illustrated in FIG. 43 is assumed to be performed on a regular basis at predetermined time intervals.

Figure 43:
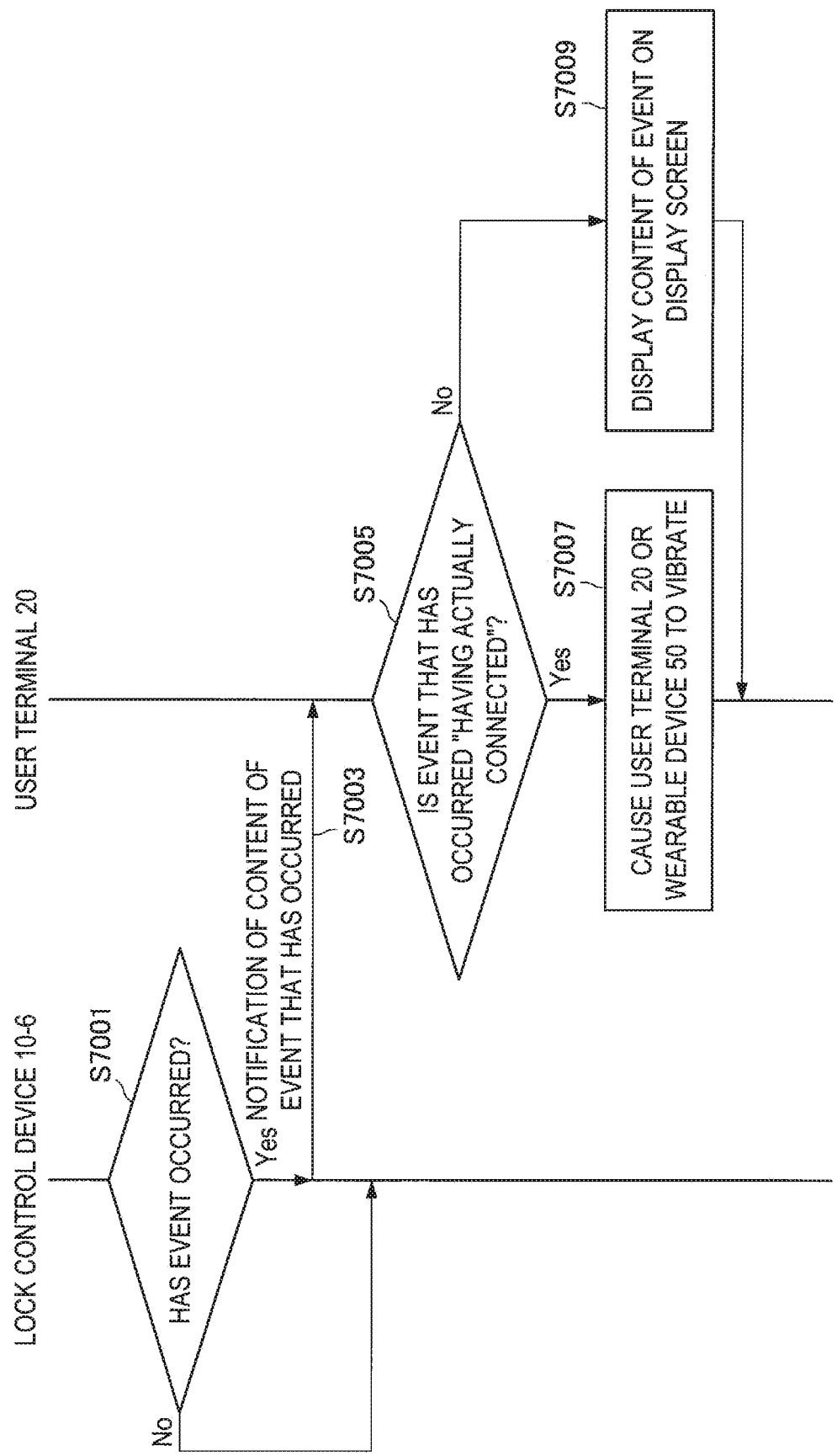
FIG. 43 is a sequence diagram illustrating an operation according to the same embodiment.

As illustrated in FIG. 43, first, the process situation notifying unit 124 of the lock control device 10-6 confirms the process situation of the lock control device 10-6, and confirms whether or not the to-be-notified event has occurred (S7001). If the to-be-notified event has occurred (S7001: Yes), the process situation notifying unit 124 causes the communication unit 130 to transmit to the relevant user terminal 20 a process situation notification indicating the content of the to-be-notified event (S7003).

Thereafter, the control unit 200 of the user terminal 20 determines whether or not the process situation notification received in S7003 is a predetermined notification (S7005). If the received process situation notification is the predetermined notification (S7005: Yes), the control unit 200 causes the user terminal 20 or the wearable device 50 (worn by the user 2 of the user terminal 20) to vibrate (S7007).

On the other hand, if the received process situation notification is other than the predetermined notification (S7005: No), the control unit 200 displays the content of the received process situation notification on the display screen (S7009).

6-5. Effect

In the above, as described with reference to FIGS. 42 and 43, each time the to-be-notified event occurs, the lock control device 10-6 according to the sixth embodiment transmits to the relevant user terminal 20 the process situation notification indicating the content of the to-be-notified event that has occurred. Hence, even when the lock control device 10-6 is installed inside the door (i.e., inside a room), the user is notified of the situation of the lock control device 10-6.

As a result, the lock control device 10-6 is needless to be installed outside the door, and therefore there is little risk that the lock control device 10-6 is stolen. Also, for example, a display device for informing the user of the situation of the lock control device 10-6 is needless to be installed, and therefore the cost for manufacturing and installing the device is reduced.

7. Seventh Embodiment 7-1. Background

In the above, the sixth embodiment has been described. Next, the seventh embodiment will be described. First, the background that has lead up to creating the seventh embodiment will be described.

Normal, a battery such as a dry cell battery and a secondary battery is utilized in many cases, as a power supply of the lock control device such as the lock control device 10-1. Hence, when the battery electric power remaining level becomes insufficient, the lock control device becomes unusable, and therefore it is desirable to notify the user of the appropriate battery exchange time point.

However, the consumption of the dry cell battery is affected largely by ambient temperature for example, and therefore, the battery lifetime of the dry cell battery is generally difficult to predict. Hence, there is a risk that the battery lifetime ends earlier than the predicted lifetime.

Also, with regard to the rechargeable dry cell battery, there is a problem that the lock control device is unusable without a substitute battery, while charging the battery.

Also, a method in which the lock control device includes a built-in rechargeable battery can be considered, but in this method, charging work is inconvenient for the user. For example, the user is to perform work such as wiring a charge cable between a lock control device and an electricity outlet.

As described later, the lock control device 10-7 according to the seventh embodiment is capable of notifying the user of an appropriate exchange time point of the battery.

7-2. System Configuration

The system configuration according to the seventh embodiment is same as the first embodiment illustrated in FIG. 1 or FIG. 18.

7-3. Configuration (7-3-1. Lock Control Device 10-7)

Figure 44:
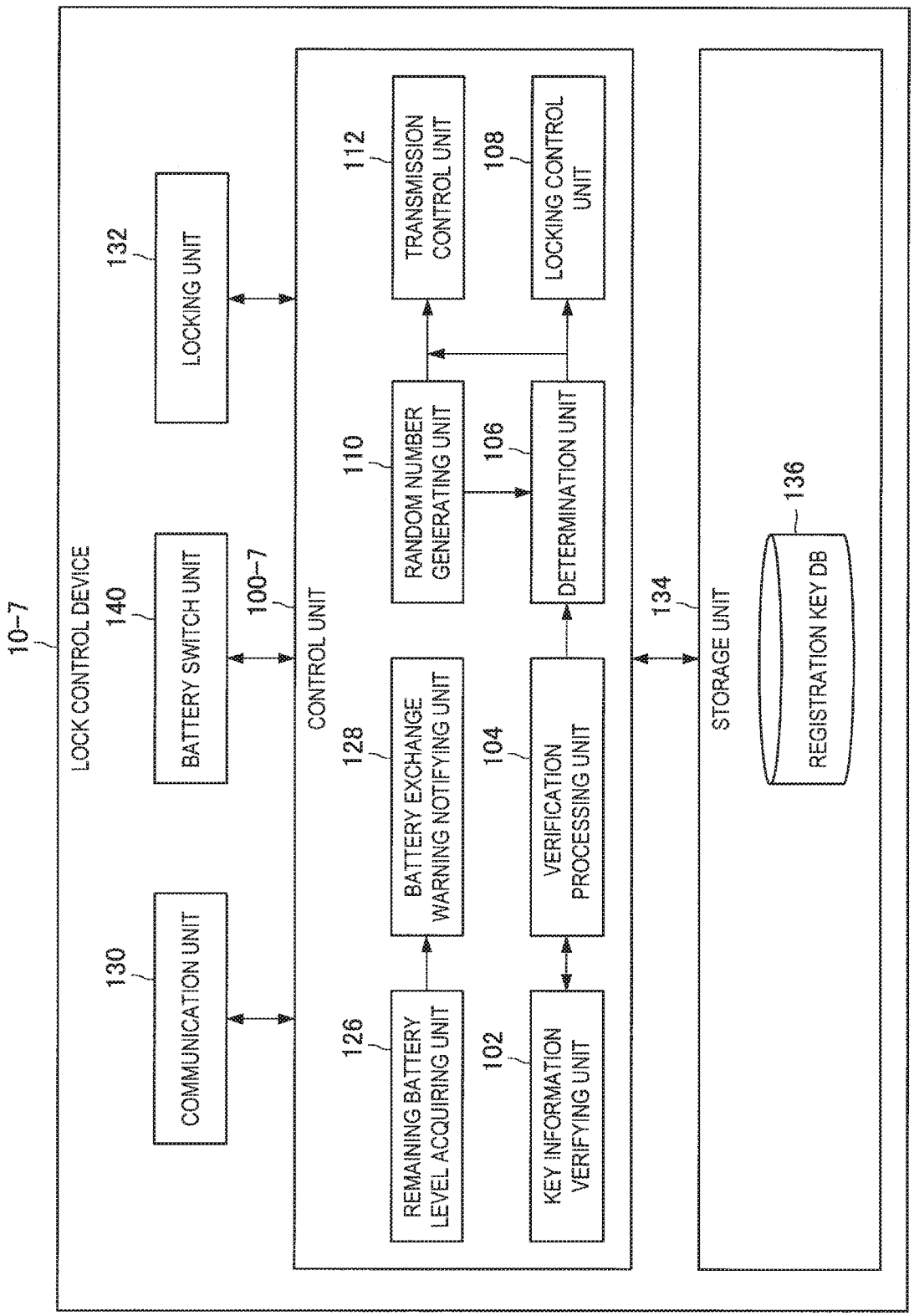
FIG. 44 is a functional block diagram illustrating an exemplary configuration of a lock control device 10-7 according to a seventh embodiment of the present disclosure.

Next, the configuration according to the seventh embodiment will be described in detail. FIG. 44 is a functional block diagram illustrating the configuration of the lock control device 10-7 according to the seventh embodiment. The lock control device 10-7 can have a movable lock interface that is removably coupleable external to, adjacent to, or over a movable component of the lock, such as a thumbturn, to unlock the lock. As illustrated in FIG. 44, the lock control device 10-7 according to the seventh embodiment includes the control unit 100-7, instead of the control unit 100-1, as compared with the lock control device 10-1 illustrated in FIG. 2. Also, the lock control device 10-7 further includes a battery switch unit 140.

Also, although not illustrated in FIG. 44, the lock control device 10-7 includes two types of batteries, which are a first battery and a second battery. Here, the first battery is a battery in use, and the second battery is an auxiliary battery for backup. Also, the first battery and the second battery can be batteries of the same type. Also, the first battery and the second battery may be a dry cell battery such as a lithium dry cell battery or a battery such as a secondary battery, for example.

(7-3-1-1. Control Unit 100-7)

The control unit 100-7 further includes a remaining battery level acquiring unit 126 and a battery exchange warning notifying unit 128, as compared with the control unit 100-1 according to the first embodiment.

(7-3-1-2. Remaining Battery Level Acquiring Unit 126)

The remaining battery level acquiring unit 126 acquires information indicating the remaining level of the first battery, from the first battery for example. Note that, when the first battery is the dry cell battery, the information indicating the above remaining level may be the information indicating whether or not the voltage equal to or larger than a threshold value is measured, for example.

(7-3-1-3. Battery Exchange Warning Notifying Unit 128)

When the information acquired by the remaining battery level acquiring unit 126 indicates that the remaining level of the first battery has become equal to or smaller than the predetermined threshold value, the battery exchange warning notifying unit 128 causes the communication unit 130 to transmit a warning notification for battery exchange to the user terminal 20. For example, in the above case, the battery exchange warning notifying unit 128 may cause the communication unit 130 to transmit the warning notification for battery exchange to the user terminal 20 on a regular basis, until the first battery is exchanged.

Here, the predetermined threshold value may be the minimum electric power level to activate the lock control device 10-7 normally, for example. Also, a predetermined threshold value may be "0".

(7-3-1-4. Battery Switch Unit 140)

When the information acquired by the remaining battery level acquiring unit 126 indicates that the remaining level of the first battery has become equal to or smaller than a predetermined threshold value, the battery switch unit 140 switches the battery to use, from the first battery to the second battery.

Note that other components included in the lock control device 10-7 are substantially same as the first embodiment.

(7-3-2. User Terminal 20)

Next, the configuration of the user terminal 20 according to the seventh embodiment will be described.

(7-3-2-1. Display Control Unit 210)

When the warning notification for battery exchange is received from the lock control device 10-7, the display control unit 210 according to the seventh embodiment causes the operation display unit 222 to display the received warning notification. For example, the display control unit 210 causes the operation display unit 222 to display the warning notification continuously in a pop-up manner, until selected by the user, for example.

Also, the display control unit 210 is capable of causing the operation display unit 222 to further display a menu screen image for the user 2 to order a battery, when the warning notification displayed on the display screen is selected by the user 2.

Note that other components included in the user terminal 20 are substantially same as the first embodiment. Also, the configuration of the server 30 is substantially same as the first embodiment.

7-4. Operation

In the above, the configuration according to the seventh embodiment has been described. Next, the operation according to the seventh embodiment will be described with reference to FIG. 45. Note that this operation is performed on a regular basis at predetermined time intervals, while the lock control device 10-7 is activated, for example. Also, other types of operations are same as the first embodiment illustrated in FIGS. 6 to 17, and therefore the description will be omitted.

Figure 45:
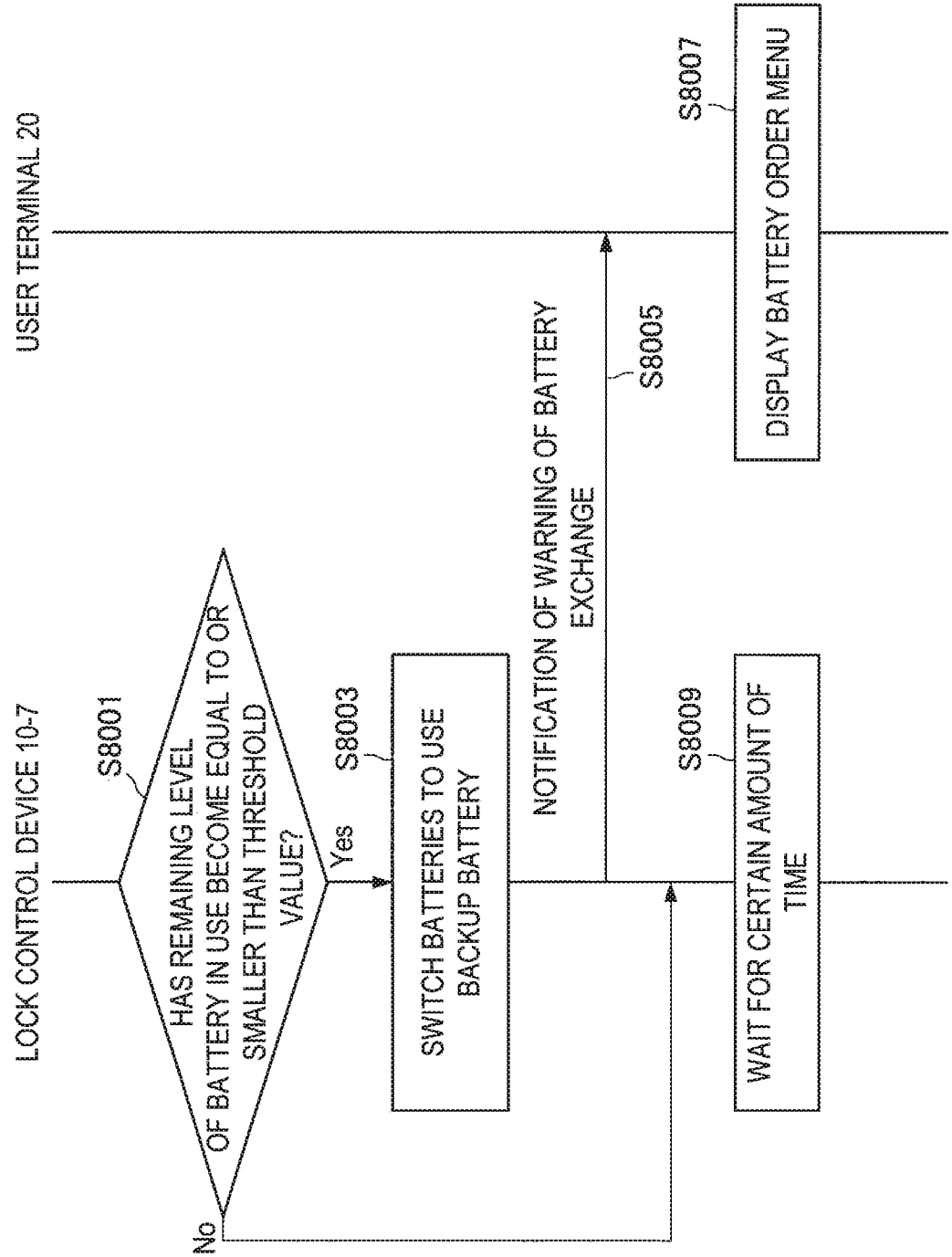
FIG. 45 is a sequence diagram illustrating an operation according to the same embodiment.

As illustrated in FIG. 45, first, the remaining battery level acquiring unit 126 of the lock control device 10-7 acquires the information indicating the remaining level of the first battery, from the first battery for example. Then, the battery switch unit 140 confirms whether or not the remaining level indicated by the acquired information is equal to or smaller than a predetermined threshold value (S8001). If the remaining level has not become equal to or smaller than the predetermined threshold value (S8001: No), the lock control device 10-7 performs the operation of S8009 described later.

On the other hand, if the remaining level is equal to or smaller than the predetermined threshold value (S8001: Yes), the battery switch unit 140 switches the battery to use, from the first battery to the second battery (S8003). Then, the battery exchange warning notifying unit 128 causes the communication unit 130 to transmit the warning notification for battery exchange to the user terminal 20 (S8005).

Thereafter, the display control unit 210 of the user terminal 20 causes the operation display unit 222 to display the warning notification received in S8005. Further, if the displayed warning notification is selected by the user, the display control unit 210 causes the operation display unit 222 to display a battery order menu (S8007).

Thereafter, the lock control device 10-7 waits for a certain amount of time (S8009). Thereafter, the lock control device 10-7 repeats the operation of S8001 again.

7-5. Effect (7-5-1. Effect 1)

In the above, as described with reference to FIGS. 44 and 45, when it is detected that the remaining level of the first battery has become equal to or smaller than a predetermined threshold value, the lock control device 10-7 according to the seventh embodiment automatically switches the battery to use, from the first battery to the auxiliary second battery. Hence, occurrence of remaining battery level insufficiency is prevented, and the lock control device 10-7 is activated for a long time in a stabilized manner.

(7-5-2. Effect 2)

Also, when it is detected that the remaining level of the first battery has become equal to or smaller than a predetermined threshold value, the lock control device 10-7 transmits the warning notification to the user terminal 20. Hence, the lock control device 10-7 can prompt the user to exchange the battery at an appropriate time point. As a result, for example, inefficient battery exchange by the user, such as user's exchange of a dry cell battery which is still usable, is avoided.

Also, the user terminal 20 is capable of causing the operation display unit 222 to display the battery order menu in association with the received warning notification. Hence, the user 2 can also perform order and payment of the battery in the relevant application, enhancing convenience for the user.

8. Modification Example

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

In above each embodiment, an example in which the lock control device 10-1 to the lock control device 10-7 are installed in a door at an entrance of a house has been described mainly, but embodiments are not limited to such examples. The lock control device 10-1 to the lock control device 10-7 can be installed in various types of doors, such as a door of a locker installed in an airport, a station, or the like, and a door of a car, for example. Also, it may be applied to a locking mechanism of a bicycle or the like. Additionally, the lock control device 10-1 to lock control device 10-7 can be attached to or otherwise positioned so as to be operative with other movable structures, such as drawers, boxes, cabinets, windows, etc.

Also, the steps in the operation of above each embodiment are needless to be executed in the described order. For example, the steps may be executed in the order changed as appropriate. Also, the steps may be executed in parallel or individually in part, instead of being executed in temporal sequence.

Also, according to above each embodiment, a computer program for causing a processor such as a CPU and hardware such as a RAM to exercise a function equivalent to each configuration of the above lock control device 10-1 may be provided. Also, a recording medium storing the computer program is provided.

Additionally, the present technology may also be configured as below.

(1)

An information processing apparatus including:
a locking control unit configured to execute a first process of processes for causing a locking unit to unlock, on the basis of detection of access of a first communication terminal; and
a detection unit configured to detect an unlocking request by a user of the first communication terminal,
wherein the locking control unit executes a second process of the processes for causing the locking unit to unlock, when the unlocking request is detected and the first process is completed.

(2)

The information processing apparatus according to (1), wherein
the detection unit detects the unlocking request, when a detection result of vibration or ambient sound of the information processing apparatus satisfies a predetermined condition.

(3)

The information processing apparatus according to (1) or (2), wherein
the detection unit detects the unlocking request on the basis of a reception from a second communication terminal worn by the user of the first communication terminal, and
the unlocking request is generated by the second communication terminal on the basis of touch operation of the user to the second communication terminal or an operating state detected by the second communication terminal.

(4)

The information processing apparatus according to any one of (1) to (3), wherein
the locking control unit executes, when an access of a third communication terminal is further detected, the first process corresponding to the third communication terminal, and
the locking control unit temporarily halts the first process corresponding to the third communication terminal, and executes the second process corresponding to the first communication terminal, when the unlocking request is detected in middle of the first process corresponding to the third communication terminal.

(5)

The information processing apparatus according to any one of (1) to (4), further including:
an open-close state determining unit configured to determine whether or not a door in which the locking unit is installed is closed,
wherein the locking control unit causes the locking unit to lock, when the open-close state determining unit determines that the door is closed after unlocked by the locking unit.

(6)

The information processing apparatus according to (5), further including:
a measurement unit configured to measure an acceleration or a geomagnetism of the information processing apparatus,
wherein the open-close state determining unit determines whether or not the door is closed on the basis of a measurement result by the measurement unit.

(7)

The information processing apparatus according to any one of (1) to (6), further including:
a process situation notifying unit configured to cause a transmitter unit to transmit to the first communication terminal a notification indicating a process situation of the first process or the second process.

(8)
The information processing apparatus according to any one of (1) to (7), further including:
a first battery; and
a battery warning notifying unit configured to cause a transmitter unit to transmit to the first communication terminal a warning notification, when it is detected that a remaining level of the first battery has become equal to or smaller than a predetermined threshold value.

(9)
The information processing apparatus according to (8), further including:
a second battery which is a backup of the first battery; and
a battery switch unit configured to switch a battery to use, from the first battery to the second battery, when it is detected that a remaining level of the first battery has become equal to or smaller than a predetermined threshold value.

(10)
The information processing apparatus according to (9), wherein
the second battery is a battery of a same type as the first battery.

(11)
The information processing apparatus according to any one of (1) to (10), further including:
a communication unit configured to receive first information generated by a first secret key, from the first communication terminal; and
a determination unit configured to determine whether or not to cause the locking unit to unlock, on the basis of a first public key corresponding to the first secret key and the generated first information.

(12)
The information processing apparatus according to (11), wherein
the locking control unit further executes the second process, when the determination unit has determined to cause the locking unit to unlock.

(13)
The information processing apparatus according to (11) or (12), further including:
a verification processing unit configured to verify the generated first information on the basis of the first public key,
wherein the determination unit determines whether or not to cause the locking unit to unlock, on the basis of a verification result of the generated first information.

(14)
The information processing apparatus according to any one of (11) to (13), wherein
the communication unit further receives first key information including the first public key and signature information for the first public key by a second communication terminal,
the information processing apparatus further includes a key verifying unit configured to verify rightfulness of the first public key on the basis of the signature information for the first public key, and
the determination unit further determines whether or not to cause the locking unit to unlock, on the basis of a verification result by the key verifying unit.

(15)
The information processing apparatus according to any one of (1) to (14), further including the locking unit.

(16)
An information processing method including:
executing a first process of processes for causing a locking unit to unlock, on the basis of detection of access of a first communication terminal;
detecting an unlocking request by a user of the first communication terminal; and
executing a second process of the processes for causing the locking unit to unlock, when the unlocking request is detected and the first process is completed.

(17)
A program for causing a computer to function as:
a locking control unit configured to execute a first process of processes for causing a locking unit to unlock, on the basis of detection of access of a first communication terminal; and
a detection unit configured to detect an unlocking request by a user of the first communication terminal,
wherein the locking control unit executes a second process of the processes for causing the locking unit to unlock, when the unlocking request is detected and the first process is completed.

(18)
A lock control device removably provided external to a lock comprising:
circuitry configured to
detect access of a first communication terminal,
detect an unlocking request while the first communication terminal has access, and
output a control signal to unlock the lock based on detection of the unlocking request.

(18) A lock control device removably provided external to a lock comprising: circuitry configured to
detect an unlocking request while a first communication terminal has access to the lock control device, and
output a control signal to unlock the lock based on detection of the unlocking request,
wherein the unlocking request is generated, while the first communication terminal has access to the lock control device, based on at least one of a vibration or sound satisfying a predetermined condition or a predetermined operation at a second communication terminal different from the first communication terminal.

(19)
The lock control device according to (18), wherein the circuitry is configured to detect as the unlocking request the vibration or sound satisfying the predetermined condition of the lock control device.

(20)
The lock control device according to either (18) or (19), wherein the unlocking request is generated by the first communication terminal, and wherein the circuitry is configured to detect the unlocking request in a case that the circuitry detects the vibration or sound satisfying the predetermined condition.

(21)
The lock control device according to any one of (18) to (20),
wherein the circuitry is configured to detect as the unlocking request a signal from a second communication terminal different from the first communication terminal, and wherein the unlocking request is generated by the second communication terminal based on the predetermined operation at the second communication terminal

(22)
The lock control device according to any one of (18) to (21),
wherein the circuitry is configured to detect as the unlocking request a signal from the first communication terminal, and
wherein the unlocking request is generated by the first communication terminal based on the predetermined operation at the second communication terminal.

(23)
The lock control device according to any one of (18) to (22), wherein the second communication terminal is a wearable device.

(24)
The lock control device according to any one of (18) to (23),
wherein the circuitry is configured to
execute, when access of a third communication terminal is further detected, a first process of processes to unlock the lock corresponding to the third communication terminal, and
temporarily halt the first process corresponding to the third communication terminal, and execute a second process to unlock the lock corresponding to the first communication terminal, when the unlocking request is detected during the first process corresponding to the third communication terminal,
wherein execution of the first process is based on detection of access of the third communication terminal, and
wherein execution of the second process is based on when the first communication terminal completes the first process of processes to unlock the lock.

(25)
The lock control device according to any one of (18) to (24), wherein the circuitry is configured to
determine whether or not a movable structure to which the lock control device is externally removably coupled is closed, and
output a control signal to lock the lock when the circuitry determines that the movable structure is closed after being unlocked.

(26)
The lock control device according to any one of (18) to (25), wherein the circuitry is configured to
determine whether or not the movable structure is closed based on a measurement result of a detected state change of the movable structure.

(27)
The lock control device according to any one of (18) to (26), wherein the circuitry is configured to
cause a transmitter to transmit to the first communication terminal a notification indicating a process situation of a first process of processes to output the control signal to unlock the lock or a second process to unlock the lock.

(28)
The lock control device according to any one of (18) to (27), wherein the circuitry is configured to
cause a transmitter to transmit to the first communication terminal a warning notification based on detection of a remaining level of a first battery being equal to or smaller than a predetermined threshold value.

(29)
The lock control device according to any one of (18) to (28), wherein the circuitry is configured to
switch a battery to use, from the first battery to a second battery based on detection of a remaining level of the first battery being one of equal to or smaller than a predetermined threshold value.

(30)
The lock control device according to any one of (18) to (29), wherein the circuitry is configured to
receive first information generated by a first secret key, from the first communication terminal, and
determine whether or not to cause the lock to unlock based on a first public key corresponding to the first secret key and the generated first information.

(31)
The lock control device according to any one of (18) to (30), wherein the circuitry is configured to execute a second process to unlock the lock when the circuitry determines to cause the lock to unlock.

(32)
The lock control device according to any one of (18) to (31), wherein the circuitry is configured to
verify the generated first information based on the first public key,
determine whether or not to cause the lock to unlock based on a verification result of the generated first information.

(33)
The lock control device according to any one of (18) to (32), wherein the circuitry is configured to
receive first key information including the first public key and signature information for the first public key from the second communication terminal,
verify rightfulness of the first public key based on the signature information for the first public key, and
determine whether or not to cause the lock to unlock based on a verification result of the verifying.

(34)
The lock control device according to any one of (18) to (33), further comprising a movable lock interface that is removably coupleable external to, adjacent to, or over a movable component of the lock to unlock the lock responsive to the control signal to unlock the lock.

(35)
The lock control device according to any one of (18) to (34), wherein the circuitry is configured to
execute a first process of processes to cause the lock to unlock based on detection of access of the first communication terminal, and
execute a second process of the processes to cause the lock to unlock upon detecting the unlocking request and the first process being completed.

(36)
The lock control device according to any one of (18) to (35), wherein the circuitry is configured to
detect as the unlocking request a signal from the first communication terminal,
wherein the unlocking request is generated by the first communication terminal based on the vibration or sound, which is of the first communication terminal, satisfying the predetermined condition.

(37)
The lock control device according to any one of (18) to (36), wherein the circuitry is configured to detect access of the first communication terminal.

(38)
The lock control device according to any one of (18) to (37), wherein the first communication terminal is configured to detect access of the lock control device.

(39)
A locking control method comprising:
  detecting, using circuitry, an unlocking request while a first communication terminal has access, the unlocking request being generated, while the first communication terminal has access to the lock control device, based on at least one of a vibration or sound satisfying a predetermined condition or a predetermined operation to a second communication terminal different from the first communication terminal; and
  outputting, using the circuitry, a control signal to unlock a lock based on said detecting the unlocking request.

(40)
A non-transitory computer-readable storage medium storing computer-readable instructions that, when executed by a computer, cause the computer to perform a method comprising:
  detecting an unlocking request while a first communication terminal has access, the unlocking request being generated, while the first communication terminal has access to the lock control device, based on at least one of a vibration or sound satisfying a predetermined condition or a predetermined operation to a second communication terminal different from the first communication terminal; and
  outputting a control signal to unlock a lock based on said detecting the unlocking request.

(41)
An information processing apparatus comprising:
  circuitry configured to
  detect access of a locking control device removably provided external to a lock,
  generate an unlocking request while the locking control device has access, and
  output a signal as the unlocking request to the locking control device.

REFERENCE SIGNS LIST 10-1 to 10-7 lock control device
20 user terminal
22 communication network
30 server
32 database
50 wearable device
100-1 to 100-7 control unit
102 key information verifying unit
104 verification processing unit
106 determination unit
108 locking control unit
110 random number generating unit
112 transmission control unit
114 algorithm switch unit
116 date and time information changing unit
118 access detecting unit
120 detection unit
122 open-close state determining unit
124 process situation notifying unit
126 remaining battery level acquiring unit
128 battery exchange warning notifying unit
130 communication unit
132 locking unit
134 storage unit
136 registration key DB
138 measurement unit
140 battery switch unit
200 control unit
202 cipher generating unit
204 key information issuing unit
206 transmission control unit
208 invitation e-mail generating unit
210 display control unit
220 communication unit
222 operation display unit
224 storage unit
300 control unit
302 key information issuance requesting unit
304 transmission control unit
306 random number generating unit
308 verification processing unit
310 verifying unit
320 communication unit
322 storage unit

The invention claimed is:

1. A lock control device removably provided external to a lock comprising:
  access detection circuitry configured to receive position information from a first communication terminal and to determine whether the first communication terminal is within a predetermined range from the lock control device;
  detection circuitry configured to detect an unlocking request when a signal is received from a second communication terminal different from the first communication terminal; and
  locking circuitry configured to:
  in response to the access detection circuitry determining that the first communication terminal is within the predetermined range from the lock control device, execute a preprocessing sequence for unlocking the lock;
  in response to the pre-processing sequence ending and the detection circuitry detecting the unlocking request, output a control signal to unlock the lock based on detection of the unlocking request;
  determine whether or not a movable structure to which the lock control device is externally removably coupled is close; and
  output a second control signal to lock the lock when the circuitry determines that the movable structure is closed after being unlocked.

2. The lock control device according to claim 1, wherein the unlocking request is generated by the second communication terminal based on a predetermined operation at the second communication terminal.

3. The lock control device according to claim 1, wherein the second communication terminal is a wearable device.

4. The lock control device according to claim 1, wherein the circuitry is configured to
  execute, when communication with a third communication terminal is further detected, a first process of processes to unlock the lock corresponding to the third communication terminal, and
  temporarily halt the first process corresponding to the third communication terminal, and execute a second process to unlock the lock corresponding to the first communication terminal, when the unlocking request is detected during the first process corresponding to the third communication terminal,
  wherein execution of the first process is based on detection of communication with the third communication terminal, and wherein execution of the second process is based on when the first communication terminal completes the first process of processes to unlock the lock.

5. The lock control device according to claim 1, wherein the circuitry is configured to
cause a transmitter to transmit to the first communication terminal a notification indicating a process situation of a first process of processes to output the control signal to unlock the lock or a second process to unlock the lock.

6. The lock control device according to claim 1, wherein the circuitry is configured to
cause a transmitter to transmit to the first communication terminal a warning notification based on detection of a remaining level of a first battery being equal to or smaller than a predetermined threshold value; and
switch a battery to use, from the first battery to a second battery based on detection of a remaining level of the first battery being one of equal to or smaller than a predetermined threshold value.

7. The lock control device according to claim 1, further comprising a movable lock interface that is removably coupleable external to, adjacent to, or over a movable component of the lock to unlock the lock responsive to the control signal to unlock the lock.

8. A lock control device removably provided external to a lock comprising:
access detection circuitry configured to receive position information from a first communication terminal and to determine whether the first communication terminal is within a predetermined range from the lock control device;
detection circuitry configured to detect an unlocking request when a signal is received from a second communication terminal different from the first communication terminal; and
locking circuitry configured to:
in response to the access detection circuitry determining that the first communication terminal is within the predetermined range from the lock control device, execute a preprocessing sequence for unlocking the lock;
in response to the pre-processing sequence ending and the detection circuitry detecting the unlocking request, output a control signal to unlock the lock based on detection of the unlocking request;
receive first information generated by a first secret key, from the first communication terminal; and
determine whether or not to cause the lock to unlock based on a first public key corresponding to the first secret key and the generated first information.

9. The lock control device according to claim 8, wherein the circuitry is configured to
receive first key information including the first public key and signature information for the first public key from the second communication terminal,
verify rightfulness of the first public key based on the signature information for the first public key, and
determine whether or not to cause the lock to unlock based on a verification result of the verifying.

10. A locking control method executed by a lock control device removably provided external to a lock, the method comprising:
receiving position information from a first communication terminal and determining whether the first communication terminal is within a predetermined range from the lock control device;
detecting an unlocking request when a signal is received from a second communication terminal different from the first communication terminal;
in response to determining that the first communication terminal is within the predetermined range from the lock control device, executing a pre-processing sequence for unlocking the lock;
in response to the pre-processing sequence ending and to detecting the unlocking request, outputting a control signal to unlock the lock based on detection of the unlocking request;
determining whether or not a movable structure to which the lock control device is externally removably coupled is closed; and
outputting a second control signal to lock the lock when the circuitry determines that the movable structure is closed after being unlocked.

11. A non-transitory computer-readable storage medium storing computer-readable instructions that, when executed by a computer, cause the computer to perform a method comprising:
receiving position information from a first communication terminal and determining whether the first communication terminal is within a predetermined range from a lock control device removably provided external to a lock;
detecting an unlocking request when a signal is received from a second communication terminal different from the first communication terminal;
in response to determining that the first communication terminal is within the predetermined range from the lock control device, executing a pre-processing sequence for unlocking the lock; and
in response to the pre-processing sequence ending and to detecting the unlocking request, outputting a control signal to unlock the lock based on detection of the unlocking request;
determining whether or not a movable structure to which the lock control device is externally removably coupled is closed; and
outputting a second control signal to lock the lock when the circuitry determines that the movable structure is closed after being unlocked.

* * * * *